(12) United States Patent
Park et al.

(10) Patent No.: US 11,240,780 B2
(45) Date of Patent: *Feb. 1, 2022

(54) BEAM PAGING ASSISTANCE

(71) Applicant: Comcast Cable Communications, LLC, Philadelphia, PA (US)

(72) Inventors: Kyungmin Park, Herndon, VA (US); Esmael Hejazi Dinan, McLean, VA (US); Hyoungsuk Jeon, Centreville, VA (US); Alireza Babaei, Fairfax, VA (US); Hua Zhou, Herndon, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/843,420

(22) Filed: Apr. 8, 2020

(65) Prior Publication Data

US 2020/0236648 A1 Jul. 23, 2020

Related U.S. Application Data

(63) Continuation of application No. 16/193,971, filed on Nov. 16, 2018, now Pat. No. 10,660,063.
(Continued)

(51) Int. Cl.
*H04W 68/00* (2009.01)
*H04W 68/02* (2009.01)
(Continued)

(52) U.S. Cl.
CPC ............ *H04W 68/005* (2013.01); *H04B 7/06* (2013.01); *H04L 1/0026* (2013.01);
(Continued)

(58) Field of Classification Search
CPC ... H04W 68/005; H04W 76/30; H04W 76/27; H04W 68/02; H04W 74/0808;
(Continued)

(56) References Cited

U.S. PATENT DOCUMENTS 9,125,218 B2 9/2015 Chang
9,736,795 B2 8/2017 Dinan
(Continued)

FOREIGN PATENT DOCUMENTS

CN 108809580 A 11/2018
EP 3397015 A1 10/2018
(Continued)

OTHER PUBLICATIONS

R2-1707001 3GPP TSG-RAN WG2 Meeting #AH, Qingdao, China, Jun. 27-29, 2017, Source: Lenovo, Motorola Mobility, Title: Random access procedure for beam recovery request.
(Continued)

*Primary Examiner* — Obaidul Huq
(74) *Attorney, Agent, or Firm* — Banner & Witcoff, Ltd.

(57) ABSTRACT

Wireless communications for paging assistance are described. Paging assistance information may comprise one or more beam parameters to provide beam-based paging for a wireless device. One or more devices may use beam-based paging to reduce usage of wireless resources.

42 Claims, 23 Drawing Sheets

Related U.S. Application Data

(60) Provisional application No. 62/587,255, filed on Nov. 16, 2017, provisional application No. 62/587,265, filed on Nov. 16, 2017.

(51) Int. Cl.
| | |
|---|---|
| *H04W 92/04* | (2009.01) |
| *H04W 76/30* | (2018.01) |
| *H04L 5/00* | (2006.01) |
| *H04W 80/02* | (2009.01) |
| *H04W 80/08* | (2009.01) |
| *H04W 74/08* | (2009.01) |
| *H04L 1/00* | (2006.01) |
| *H04W 76/27* | (2018.01) |
| *H04B 7/06* | (2006.01) |
| *H04W 72/04* | (2009.01) |

(52) U.S. Cl.
CPC ........... *H04L 5/0048* (2013.01); *H04W 68/02* (2013.01); *H04W 74/0808* (2013.01); *H04W 74/0833* (2013.01); *H04W 76/27* (2018.02); *H04W 76/30* (2018.02); *H04W 80/02* (2013.01); *H04W 80/08* (2013.01); *H04W 92/045* (2013.01); *H04W 72/046* (2013.01)

(58) Field of Classification Search
CPC . H04W 74/0833; H04W 80/02; H04W 80/08; H04W 92/045; H04W 72/046; H04B 7/06; H04L 1/0026; H04L 5/0048
USPC .......................................... 370/310, 328, 329
See application file for complete search history.

(56) References Cited

U.S. PATENT DOCUMENTS

| | | | |
|---|---|---|---|
| 9,949,298 | B1 | 4/2018 | Akoum et al. |
| 2010/0279700 | A1 | 11/2010 | Kim et al. |
| 2012/0093086 | A1* | 4/2012 | Yin .................. H04L 69/16 370/328 |
| 2013/0039345 | A1 | 2/2013 | Kim et al. |
| 2013/0188580 | A1 | 7/2013 | Dinan |
| 2013/0250828 | A1 | 9/2013 | Chou et al. |
| 2015/0189574 | A1 | 7/2015 | Ng et al. |
| 2015/0208462 | A1 | 7/2015 | Lee et al. |
| 2015/0365921 | A1 | 12/2015 | Wu |
| 2017/0195998 | A1 | 7/2017 | Zhang et al. |
| 2017/0207843 | A1 | 7/2017 | Jung et al. |
| 2017/0332406 | A1 | 11/2017 | Islam et al. |
| 2017/0339662 | A1 | 11/2017 | Lin et al. |
| 2017/0366236 | A1 | 12/2017 | Ryoo et al. |
| 2017/0373731 | A1 | 12/2017 | Guo et al. |
| 2018/0006770 | A1 | 1/2018 | Guo et al. |
| 2018/0054348 | A1 | 2/2018 | Luo et al. |
| 2018/0054382 | A1 | 2/2018 | Luo et al. |
| 2018/0054783 | A1 | 2/2018 | Luo et al. |
| 2018/0054811 | A1 | 2/2018 | Luo et al. |
| 2018/0054812 | A1 | 2/2018 | Luo et al. |
| 2018/0054832 | A1 | 2/2018 | Luo et al. |
| 2018/0083753 | A1 | 3/2018 | Nagaraja et al. |
| 2018/0098334 | A1 | 4/2018 | Tie et al. |
| 2018/0110066 | A1 | 4/2018 | Luo et al. |
| 2018/0115940 | A1 | 4/2018 | Abedini et al. |
| 2018/0115990 | A1 | 4/2018 | Abedini et al. |
| 2018/0124687 | A1 | 5/2018 | Park et al. |
| 2018/0132266 | A1 | 5/2018 | Chen et al. |
| 2018/0138962 | A1 | 5/2018 | Islam et al. |
| 2018/0176958 | A1 | 6/2018 | Islam et al. |
| 2018/0191422 | A1 | 7/2018 | Xia et al. |
| 2018/0198585 | A1 | 7/2018 | Lin et al. |
| 2018/0219604 | A1 | 8/2018 | Lu et al. |
| 2018/0220448 | A1 | 8/2018 | Akkarakaran et al. |
| 2018/0227899 | A1 | 8/2018 | Yu et al. |
| 2018/0234960 | A1 | 8/2018 | Nagaraja et al. |
| 2018/0241452 | A1 | 8/2018 | Akkarakaran et al. |
| 2018/0249453 | A1 | 8/2018 | Nagaraja et al. |
| 2018/0270698 | A1 | 9/2018 | Babaei et al. |
| 2018/0270699 | A1 | 9/2018 | Babaei et al. |
| 2018/0270700 | A1 | 9/2018 | Babaei et al. |
| 2018/0278310 | A1 | 9/2018 | Lee et al. |
| 2018/0279150 | A1 | 9/2018 | He et al. |
| 2018/0279193 | A1 | 9/2018 | Park et al. |
| 2018/0279229 | A1 | 9/2018 | Dinan et al. |
| 2018/0288756 | A1 | 10/2018 | Xia et al. |
| 2018/0302889 | A1 | 10/2018 | Guo et al. |
| 2018/0310321 | A1 | 10/2018 | Basu Mallick et al. |
| 2018/0317123 | A1 | 11/2018 | Chen et al. |
| 2018/0323856 | A1 | 11/2018 | Xiong et al. |
| 2018/0324723 | A1 | 11/2018 | Akkarakaran et al. |
| 2018/0324867 | A1 | 11/2018 | Basu Mallick et al. |
| 2018/0343653 | A1 | 11/2018 | Guo |
| 2018/0351611 | A1 | 12/2018 | Nagaraja et al. |
| 2018/0367374 | A1 | 12/2018 | Liu et al. |
| 2018/0368126 | A1 | 12/2018 | Islam et al. |
| 2018/0368142 | A1 | 12/2018 | Liou |
| 2019/0021058 | A1* | 1/2019 | Cheng ............... H04W 74/0833 |
| 2019/0028174 | A1 | 1/2019 | Chakraborty et al. |
| 2019/0037423 | A1 | 1/2019 | Yu et al. |
| 2019/0037498 | A1 | 1/2019 | Tseng et al. |
| 2019/0045481 | A1 | 2/2019 | Sang et al. |
| 2019/0059129 | A1 | 2/2019 | Luo et al. |
| 2019/0074882 | A1 | 3/2019 | Zhou et al. |
| 2019/0173740 | A1 | 6/2019 | Zhang et al. |
| 2019/0215800 | A1* | 7/2019 | Fujishiro ............... H04W 76/27 |
| 2019/0268893 | A1 | 8/2019 | Tsai et al. |
| 2020/0037285 | A1* | 1/2020 | Sivavakeesar ........ H04W 76/27 |
| 2020/0404617 | A1* | 12/2020 | Murray ............. H04W 52/0229 |

FOREIGN PATENT DOCUMENTS

| | | |
|---|---|---|
| EP | 3424152 A1 | 1/2019 |
| WO | 2013025142 A1 | 2/2013 |
| WO | 2017024516 A1 | 2/2017 |
| WO | 2017123060 A1 | 7/2017 |
| WO | 2017135803 A1 | 8/2017 |
| WO | 2017151876 A1 | 9/2017 |
| WO | 2017196612 A1 | 11/2017 |
| WO | 2017217898 A1 | 12/2017 |
| WO | 2018017840 A1 | 1/2018 |
| WO | 2018031327 A1 | 2/2018 |
| WO | 2018031799 A1 | 2/2018 |
| WO | 2018038859 A1 | 3/2018 |
| WO | 2018038860 A1 | 3/2018 |
| WO | 2018038861 A1 | 3/2018 |
| WO | 2018038862 A1 | 3/2018 |
| WO | 2018038864 A1 | 3/2018 |
| WO | 2018075985 A1 | 4/2018 |
| WO | 2018084544 A1 | 5/2018 |
| WO | 2018128426 A1 | 7/2018 |
| WO | 2018129300 A1 | 7/2018 |
| WO | 2018136300 A1 | 7/2018 |
| WO | 2018141303 A1 | 8/2018 |
| WO | 2018144592 A1 | 8/2018 |
| WO | 2018148552 A1 | 8/2018 |
| WO | 2018156299 A1 | 8/2018 |
| WO | 2018156696 A1 | 8/2018 |
| WO | 2018169848 A1 | 9/2018 |
| WO | 2018170481 A1 | 9/2018 |
| WO | 2018171476 A1 | 9/2018 |
| WO | 2018174667 A1 | 9/2018 |
| WO | 2018174800 A1 | 9/2018 |
| WO | 2018175303 A1 | 9/2018 |
| WO | 2018190617 A1 | 10/2018 |
| WO | 2018195975 A1 | 11/2018 |
| WO | 2018196520 A1 | 11/2018 |
| WO | 2018199074 A1 | 11/2018 |
| WO | 2018199079 A1 | 11/2018 |
| WO | 2018199100 A1 | 11/2018 |
| WO | 2018199162 A1 | 11/2018 |
| WO | 2018199243 A1 | 11/2018 |
| WO | 2018200579 A1 | 11/2018 |
| WO | 2018201450 A1 | 11/2018 |
| WO | 2018201990 A1 | 11/2018 |

(56) References Cited

FOREIGN PATENT DOCUMENTS

| | | | |
|---|---|---|---|
| WO | 2018203719 A1 | 11/2018 |
| WO | 2018203785 A1 | 11/2018 |
| WO | 2018204255 A1 | 11/2018 |
| WO | 2018204718 A1 | 11/2018 |
| WO | 2018204922 A1 | 11/2018 |
| WO | 2018222276 A1 | 12/2018 |
| WO | 2018227464 A1 | 12/2018 |
| WO | 2018227551 A1 | 12/2018 |
| WO | 2018228187 A1 | 12/2018 |
| WO | 2018230862 A1 | 12/2018 |
| WO | 2018231655 A1 | 12/2018 |
| WO | 2018232090 A1 | 12/2018 |
| WO | 2018232259 A1 | 12/2018 |
| WO | 2018237400 A1 | 12/2018 |
| WO | 2019004694 A1 | 1/2019 |
| WO | 2019032882 A1 | 2/2019 |

OTHER PUBLICATIONS

R1-17111617 3GPP TSG RAN WG1 NR AH#2, Qingdao, China, Jun. 27-30, 2017, Source: CATT, Title: RACH power control and power ramping procedure (revision of R1-1710034).

R1-1711161 3GPP TSG RAN WG1 NR#2, Qingdao, China, Jun. 27-30, 2017, Source: Qualcomm Incorporated, Title: Beam recovery procedures.

International Search Report and Written Opinion for PCT/US2018/046368 dated Dec. 13, 2018.

Apr. 15, 2019—Extented European Search Report—EP 19150964.5.

R1-1708678 3GPP TSG-RAN WG1 #89, Hangzhou, China, May 15-19, 2017, Source: Ericsson, Title: Beam failure recovery mechanism.

May 22, 2019—Extended European Search Report—19156175.2.

R2-1800560 3GPP TSG-RAN WG2 NR, Vancouver, Canada, Jan. 22-26, 2018, Source: Sharp, Title: Remaining issues on beam failure recovery.

R2-1800632 3GPP TSG-RAN WG2 AH, Vancouver, Canada, Jan. 22-26, 2018, Source: Huawei, HiSilicon, Title: Remaining issue for beam failure recovery.

R2-1801049 3GPP TSG-RAN WG2 AH, Vancouver, Canada, Jan. 22-26, 2018, Source: Huawei, HiSilicon, Title: Non-contention based random access for beam failure recovery in CA.

3GPP TS 38.321 V15.0.0 (Dec. 2017); Technical Specification; 3rd Generation Partnership Project; Technical Specification Group Radio Access Network; NR; Medium Access Control (MAC) protocol specification (Release 15).

3GPP TS 38.213 V15.0.1 (Feb. 2018); Technical Specification; 3rd Generation Partnership Project; Technical Specification Group Radio Access Network; NR; Physical layer procedures for control (Release 15).

R2-1804475 3GPP TSG-RAN WG2 Meeting #101 bis, Sanya, China, Apr. 16-20, 2018, Source: Spreadtrum Communications, Title: Beam Failure recovery on SCell.

May 14, 2019—European Extended Search Report—19157460.7.

R2-1710562 3GPP TSG-RAN WG2 #99bis, Prague, Czech Republic, Oct. 9-13, 2017, Source: Huawei, HiSilicon, Title: RAN2 aspects of DL beam management (revision of R2-1708695).

3GPP TS 36.211 V14.3.0 (Jun. 2017); Technical Specification; 3rd Generation Partnership Project; Technical Specification Group Radio Access Network; Evolved Universal Terrestrial Radio Access (E-UTRA); Physical channels and modulation (Release 14).

3GPP TS 36.213 V14.3.0 (Jun. 2017); Technical Specification; 3rd Generation Partnership Project; Technical Specification Group Radio Access Network; Evolved Universal Terrestrial Radio Access (E-UTRA); Physical layer procedures (Release 14).

3GPP TS 36.321 V.14.3.0 (Jun. 2017); Technical Specification; 3rd Generation Partnership Project; Technical Specification Group Radio Access Network; Evolved Universal Terrestrial Radio Access (E-UTRA); Medium Access Control (MAC) protocol specification (Release 14).

3GPP TS 36.331 V.14.3.0 (Jun. 2017); Technical Specification; 3rd Generation Partnership Project; Technical Specification Group Radio Access Network; Evolved Universal Terrestrial Radio Access (E-UTRA); Radio Resource Control (RRC); Protocol specification (Release 14).

3GPP TR 38.802 V14.1.0 (Jun. 2017), Technical Report, 3rd Generation Partnership Project; Technical Specification Group Radio Access Network; Study on New Radio Access Technology Physical Layer Aspects (Release 14).

3GPP TR 38.912 V14.0.0 (Mar. 2017), Technical Report, 3rd Generation Partnership Project; Technical Specification Group Radio Access Network; Study on New Radio (NR) Access Technology (Release 14).

R1-171xxxx 3GPP TSG RAN WG1 Meeting #90, Prague, Czech Republic, Aug. 21-25, 2017, Source: MCC Support, Title: Draft Report of 3GPP TSG RAN WG1 #89 v0.2.0 (Hangzhou, China, May 15-19, 2017).

R1-171xxxx 3GPP TSG RAN WG1 Meeting #90, Prague, Czech Republic, Aug. 21-25, 2017, Source: MCC Support, Title: Draft Report of 3GPP TSG RAN WG1 #AH NR2 v0.1.0 (Qingdao, China, Jun. 27-30, 2017).

R1-1708890 3GPP TSG RAN WG1 Meeting #89, Hangzhou, China, May 15-19, 2017, Source: MCC Support, Title: Final Report of 3GPP TSG RAN WG1 #88bis v1.0.0 (Spokane, Washington, Apr. 3-7, 2017).

R1-1709907 3GPP TSG RAN WG1 NR Ad-Hoc#2, Qingdao, China, Jun. 27-30, 2017, Source: Xinwei, Title: Discussion on Beam Failure Recovery.

R1-1709929 3GPP TSG RAN WG1 NR Ad Hoc Meeting, Qingdao, China, Jun. 27-30, 2017, Source: Huawei, HiSilicon, Title: General views on beam failure recovery.

R1-1710058 3GPP TSG RAN WG1 NR Ad-Hoc#2, Qingdao, China, Jun. 27-30, 2017, Source: CATT, Title: Considerations on DL beam failure and recovery.

R1-1710283 3GPP TSG RAN WG1 NR Ad-Hoc#2, Qingdao, China, Jun. 27-30, 2017, Source: LG Electronics, Title: Discussion on beam failure recovery.

R1-1710400 3GPP TSG RAN WG1 NR Ad-Hoc#2, Qingdao, China, Jun. 27-30, 2017, Source: Vivo, Title: Beam failure recovery procedure.

R1-1710596 3GPP TSG RAN WG1 NR Ad-Hoc#2, Qingdao, China, Jun. 27-30, 2017, Source: Lenovo, Motorola Mobility, Title: Discussion of beam recovery procedure.

R1-1710810 3GPP TSG RAN WG1 AH_NR Meeting, Qingdao, China, Jun. 27-30, 2017, Source: MediaTek Inc., Title: Mechanism for flexible beam failure recovery.

R1-1710926 3GPP TSG RAN WG1 NR Ad-Hoc#2, Qingdao, China, Jun. 27-30, 2017, Source: InterDigital, Inc., Title: On Remaining Details of Beam Failure Recovery.

R1-1711017 3GPP TSG RAN WG1 #89ah-NR, Qingdao, China, Jun. 27-30, 2017, Source: Ericsson, Title: Mechanism to recover from beam failure.

R1-1711291 3GPP TSG RAN WG1 NR Ad-Hoc#2, Qingdao, China, Jun. 27-30, 2017, Source: Nokia, Alcatel-Lucent Shanghai Bell, Title: Beam Recovery.

R2-1706680 3GPP TSG-RAN WG2 NR-Adhoc, Qingdao, China, Jun. 27-29, 2017, Source: AT&T, Title: Beam Failure Recovery Mechanism and RLF.

3GPP TSG-RAN WG2 NR Ad Hoc, Qingdao, China, Jun. 27-29, 2017, Source: RAN2 Chairman (Intel), Object: Chairman Notes.

Prach—Preamble Detection and Timing Advance Estimation for multi-UE in 3GPP LTE, 3GPP LTE Solutions, from www.mymowireless.com.

Jul. 16, 2019—European Extended Search Report—EP 19166184.2.

R1-1702078 3GPP TSG RAN WG1 Meeting #88, Athens, Greece, Feb. 13-17, 2017, Source: CATT, Title: Considerations on beam recovery mechanism.

R1-1707121 3GPP TSG RAN WG1 Meeting #89, Hangzhou, China, May 15-19, 2017, Source: ZTE, Title: Discussion on beam recovery mechanism.

(56) References Cited

OTHER PUBLICATIONS

3GPP TS 38.213 V15.0.0 (Dec. 2017); Technical Specification; 3rd Generation Partnership Project; Technical Specification Group Radio Access Network; NR; Physical layer procedures for control (Release 15).
3GPP TS 38.213 V15.1.0 (Mar. 2018); Technical Specification; 3rd Generation Partnership Project; Technical Specification Group Radio Access Network; NR; Physical layer procedures for control (Release 15).
3GPP TS 38.321 V15.1.0 (Mar. 2018); Technical Specification; 3rd Generation Partnership Project; Technical Specification Group Radio Access Network; NR; Medium Access Control (MAC) protocol specification (Release 15).
3GPP TS 38.331 V15.1.0 (Mar. 2018); Technical Specification; 3rd Generation Partnership Project; Technical Specification Group Radio Access Network; NR; Radio Resource Control (RRC) protocol specification (Release 15).
R1-180xxxx 3GPP TSG RAN WG1 Meeting #93 Busan, South Korea, May 21-25, 2018, Source: Ericsson, Title: Feature lead summary for beam measurement and reporting.
R1-180xxxx 3GPP TSG RAN WG1 Meeting #92bis, Sanya, China, Apr. 16-20, 2018, Source: MediaTek, Inc., Title: Summary 1 on Remaining issues on Beam Failure Recovery.
R1-1803362 3GPP TSG RAN WG1 Meeting #92, Athens, Greece, Feb. 26-Mar. 2, 2018, Source:MediaTek, Inc., Title: Summary on remaining issues on Beam Failure Recovery.
R1-180xxxx 3GPP TSG RAN WG1 Meeting #93 Busan, South Korea, May 21-25, 2018, Source: MediaTek Inc., Title: Summary on Remaining issues on Beam Failure Recovery.
R1-1704400 3GPP TSG RAN WG1 Meeting #88bis, Spokane, USA, Apr. 3-7, 2017, Source: ZTE, ZTE Microelectronics, Title: Discussion on beam recovery mechanism.
R1-1704465 3GPP TSG RAN WG1 Meeting #88bis, Spokane, USA, Apr. 3-7, 2017, Source: MediaTek, Inc., Title: Discussion on beam recovery mechanism.
R1-1719423 3GPP TSG RAN WG1 Meeting #91, Reno, USA, Nov. 27-Dec. 1, 2017, Source: Huawei, HiSilicon, Title: Remaining details on beam failure recovery.
R1-1719619 3GPP TSG RAN WG1 Meeting #91, Reno, USA, Nov. 27-Dec. 1, 2017, Source: Fujitsu, Title: Discussion on beam failure recovery.
R1-1719633 3GPP TSG RAN WG1 Meeting #91, Reno, USA, Nov. 27-Dec. 1, 2017, Source: AT&T, Title: Remaining Details on Mechanisms to Recover from Beam Failure.
R1-1719695 3GPP TSG RAN WG1 Meeting #91, Reno, USA, Nov. 27-Dec. 1, 2017, Source: Spreadtrum Communications, Title: Remaining issues on beam failure recovery mechanism.
R1-1719770 3GPP TSG RAN WG1 Meeting #91, Reno, USA, Nov. 27-Dec. 1, 2017, Source: vivo, Title: Remaining details on mechanism to recover from beam failure.
R1-1719809 3GPP TSG RAN WG1 Meeting #91, Reno, USA, Nov. 27-Dec. 1, 2017, Source: Huawei, HiSilicon, Title: Design of PUCCH-based Beam Failure Recovery.
R1-1719908 3GPP TSG RAN WG1 Meeting #91, Reno, USA, Nov. 27-Dec. 1, 2017, Source: LG Electronics, Title: Discussion on beam failure recovery.
R1-1719988 3GPP TSG RAN WG1 Meeting #91, Reno, USA, Nov. 27-Dec. 1, 2017, Source: Discussion on Beam Recovery Mechanism.
R1-1720072 3GPP TSG RAN WG1 Meeting #91, Reno, USA, Nov. 27-Dec. 1, 2017, Source: Intel Corporation, Title: Remaining Issues on Beam Failure Recovery.
R1-1720291 3GPP TSG RAN WG1 Meeting #91, Reno, USA, Nov. 27-Dec. 1, 2017, Source Samsung, Title: Beam failure recovery.
R1-1720305 3GPP TSG RAN WG1 Meeting #91, Reno, USA, Nov. 27-Dec. 1, 2017, Source: Samsung, Title: Discussion on cross-carrier beam management.
R1-1720574 3GPP TSG RAN WG1 Meeting #91, Reno, USA, Nov. 27-Dec. 1, 2017, Source: NEC, Title: On Partial Beam Failure Recovery.

R1-1720631 3GPP TSG RAN WG1 Meeting #91, Reno, USA, Nov. 27-Dec. 1, 2017, Source: InterDigital, Inc., Title: Remaining issues on beam recovery.
R1-1720804 3GPP TSG RAN WG1 Meeting #91, Reno, USA, Nov. 27-Dec. 1, 2017, Source: NTT DOCOMO, Title: Remaining issue on beam recovery.
R1-1720891 3GPP TSG RAN WG1 Meeting #91, Reno, USA, Nov. 27-Dec. 1, 2017, Source: Nokia, Nokia Shanghai Bell, Title: Beam Recovery in NR.
R1-1721523 3GPP TSG RAN WG1 Meeting #91, Reno, USA, Nov. 27-Dec. 1, 2017, Source: NTT DOCOMO, Samsung, Mediatek, AT&T, ZTE, Intel, Huawei, CATT, Qualcomm, Fujitsu, Spreadtrum, Title: WF for handling partial beam failure.
R1-1721673 3GPP TSG RAN WG1 Meeting #91, Reno, USA, Nov. 27-Dec. 1, 2017, Source: NTT DOCOMO, Intel, Huawei, NEC, Spreadtrum, Mediatek, China Telecom, AT&T, Samsung, ZTE, CATT, Qualcomm, Fujitsu, Nokia, Title: WF for handling partial beam failure.
R1-1800100 3GPP TSG RAN WG1 Meeting Ad Hoc, Vancouver, Canada, Jan. 22-26, 2018, Source: Huawei, HiSilicon, Title: Summary of remaining issues of beam measurement, reporting and indication.
R1-1800101 3GPP TSG RAN WG1 Meeting Ad Hoc, Vancouver, Canada, Jan. 22-26, 2018, Source: Huawei, HiSilicon, Title: Summary of remaining issues on beam failure recovery.
R1-1800110 3GPP TSG RAN WG1 Meeting Ad Hoc, Vancouver, Canada, Jan. 22-26, 2018, Source: ZTE, Sanechips, Title: Remaining details on bean management.
R1-1800111 3GPP TSG RAN WG1 Meeting Ad Hoc, Vancouver, Canada, Jan. 22-26, 2018, Source: ZTE, Sanechips, Title: Remaining details on mean management.
R1-1800312 3GPP TSG RAN WG1 Meeting Ad Hoc, Vancouver, Canada, Jan. 22-26, 2018, Source: Intel Corporation, Title: Remaining Issues on Beam Failure Recovery.
R1-1800526 3GPP TSG RAN WG1 Meeting Ad Hoc, Vancouver, Canada, Jan. 22-26, 2018, Source: Huawei, HiSilicon, Title: Remaining details of PHR.
R1-1800542 3GPP TSG RAN WG1 Meeting Ad Hoc, Vancouver, Canada, Jan. 22-26, 2018, Source: CMCC, Title: Discussion on remaining issues for beam indication.
R1-1800543 3GPP TSG RAN WG1 Meeting Ad Hoc, Vancouver, Canada, Jan. 22-26, 2018, Source: CMCC, Title: Discussion on beam recovery mechanism.
R1-1800582 3GPP TSG RAN WG1 Meeting Ad Hoc, Vancouver, Canada, Jan. 22-26, 2018, Source: AT&T, Title: TCI states configuration design to support dynamic BWP switching.
R1-1800583 3GPP TSG RAN WG1 Meeting Ad Hoc, Vancouver, Canada, Jan. 22-26, 2018, Source: AT&T, Title: In support of partial beam failure.
R1-1800622 3GPP TSG RAN WG1 Meeting Ad Hoc, Vancouver, Canada, Jan. 22-26, 2018, Source: ASUSTeK, Title: Remaining Issues for Beam Failure Recovery Procedure.
R1-1800629 3GPP TSG RAN WG1 Meeting Ad Hoc, Vancouver, Canada, Jan. 22-26, 2018, Source: InterDigital, Inc., Title: Remaining details on beam failure recovery.
R1-1800642 3GPP TSG RAN WG1 Meeting Ad Hoc, Vancouver, Canada, Jan. 22-26, 2018, Source: ITRI, Title: Discussion on timer for beam failure recovery.
R1-1800660 3GPP TSG RAN WG1 Meeting Ad Hoc, Vancouver, Canada, Jan. 22-26, 2018, Source: NTT DOCOMO, Title: Remaining Issue on Beam Indication.
R1-1800661 3GPP TSG RAN WG1 Meeting Ad Hoc, Vancouver, Canada, Jan. 22-26, 2018, Source: NTT DOCOMO, Title: Remaining issue on beam recovery.
R1-1800682 3GPP TSG RAN WG1 Meeting Ad Hoc, Vancouver, Canada, Jan. 22-26, 2018, Source: NTT DOCOMO, Inc., Title: Remaining issues on PHR.
R1-1800699 3GPP TSG RAN WG1 Meeting Ad Hoc, Vancouver, Canada, Jan. 22-26, 2018, Source: Ericsson, Title: Remaining details on beam management.
R1-1800700 3GPP TSG RAN WG1 Meeting Ad Hoc, Vancouver, Canada, Jan. 22-26, 2018, Source: Ericsson, Title: Remaining details and corrections for beam recovery.

(56) References Cited

OTHER PUBLICATIONS

R1-1800734 3GPP TSG RAN WG1 Meeting Ad Hoc, Vancouver, Canada, Jan. 22-26, 2018, Source: InterDigital, Inc., Title: Remaining issues on beam management.
R1-1800751 3GPP TSG RAN WG1 Meeting Ad Hoc, Vancouver, Canada, Jan. 22-26, 2018, Source: Nokia, Nokia Shanghai Bell, Title: Remaining details on beam indication, measurement and reporting.
R1-1800752 3GPP TSG RAN WG1 Meeting Ad Hoc, Vancouver, Canada, Jan. 22-26, 2018, Source: Nokia, Nokia Shanghai Bell, Title: Remaining Details on Beam Recovery.
R1-1800859 3GPP TSG RAN WG1 Meeting Ad Hoc, Vancouver, Canada, Jan. 22-26, 2018, Source: Qualcomm, Title: Beam management for NR.
R1-1800860 3GPP TSG RAN WG1 Meeting Ad Hoc, Vancouver, Canada, Jan. 22-26, 2018, Source: Qualcomm Incorporated, Title: Remaining details on beam recovery procedure.
R1-1801006 3GPP TSG RAN WG1 Meeting Ad Hoc, Vancouver, Canada, Jan. 22-26, 2018, Source: Ericsson, Title; Feature lead summary 1 of beam measurement and reporting.
R1-1801089 3GPP TSG RAN WG1 Meeting Ad Hoc, Vancouver, Canada, Jan. 22-26, 2018, Source: Media Tec Inc., Title: Summary for Remaining issue on Beam Failure Recovery.
R1-1801143 3GPP TSG RAN WG1 Meeting Ad Hoc, Vancouver, Canada, Jan. 22-26, 2018, Source: Ericsson, Title: Feature lead summary 2 of beam measurement and reporting.
R1-1801160 3GPP TSG RAN WG1 Meeting Ad Hoc, Vancouver, Canada, Jan. 22-26, 2018, Source: NTT DOCOMO, Qualcomm, Huawei, HiSilicon, ZTE, Sanechips, Fujitsu, Title: Updated offline proposal on PHR.
R1-1801187 3GPP TSG RAN WG1 Meeting Ad Hoc, Vancouver, Canada, Jan. 22-26, 2018, Source: Ericsson, Title: Feature lead summary 3 of beam measurement and reporting.
R1-1801197 3GPP TSG RAN WG1 Meeting Ad Hoc, Vancouver, Canada, Jan. 22-26, 2018, Source: MediaTek Inc., Title: Offline Summary for Remaining issues on Beam Failure Recovery.
R1-1801223 3GPP TSG RAN WG1 Meeting Ad Hoc, Vancouver, Canada, Jan. 22-26, 2018, Source: MediaTek Inc., Title: Offline Discussion Summary for Beam Failure Recovery.
R1-1801228 3GPP TSG RAN WG1 Meeting Ad Hoc, Vancouver, Canada, Jan. 22-26, 2018, Source: Ericsson, Title: Text proposal on source QCL for semi-persistent CSI-RS.
R1-1801229 3GPP TSG RAN WG1 Meeting Ad Hoc, Vancouver, Canada, Jan. 22-26, 2018, Source: Ericsson, Title: Text proposal for source spatial relation for semi-persistent SRS.
R1-1801230 3GPP TSG RAN WG1 Meeting Ad Hoc, Vancouver, Canada, Jan. 22-26, 2018, Source: Ericsson, Title: Text proposal on priority rules for PUCCH carrying RSRP reports and SRS.
R2-1806120 3GPP TSG-RAN WG2 Meeting #101, Sanya, China, Apr. 16-20, 2018, Source: ITL, Title: Beam Failure Recovery on SCell.
R2-1806166 3GPP TSG-RAN WG2 Meeting #101, Sanya, China, Apr. 16-20, 2018, Source: MediaTek, Inc., Title: On switching between CFRA and CBRA.
R2-1806774 3GPP TSG-RAN WG2 Meeting #102, Sanya, China, Apr. 16-20, 2018, Source: Nokia, Nokia Shanghai Bell, Title: Finalization of dormant SCell state.
R2-1806819 3GPP TSG-RAN WG2 Meeting #102, Busan, Korea, May 21-25, 2018, Source: Samsung, Title: MAC Impacts: Beam Failure Recovery for SCell.
R2-1806924 3GPP TSG-RAN WG2 Meeting #102, Busan, Korea, May 21-25, 2018, Source: Qualcomm, Inc., Title: SCell Dormant State Transitions based on New Timers & MAC-CEs.
R2-1806998 3GPP TSG-RAN WG2 Meeting #102, Busan, Korea, May 21-25, 2018, Source: CATT, Title: The validity of CFRA resources for BFR.
R2-1807160 3GPP TSG-RAN WG2 Meeting #102, Busan, Korea, May 21-25, 2018, Source: Panasonic, Title: Timer associated with the dedicated BFR PRACH resource.
R2-1807405 3GPP TSG-RAN WG2 Meeting #102, Busan, Korea, May 21-25, 2018, Source: ZTE, Title: Discussion on the beam failure recovery timer.
R2-1807415 3GPP TSG-RAN WG2 Meeting #102, Busan, Korea, May 21-25, 2018, Source: OPPO, Title: MAC impacts on supporting BFR procedure on SCell.
R2-1807444 3GPP TSG-RAN WG2 Meeting #102, Busan, Korea, May 21-25, 2018, Source: Huawei, HiSilicon, Title: BWP switch for BFR.
R2-1807481 3GPP TSG-RAN WG2 Meeting #102, Busan, Korea, May 21-25, 2018, Source: Huawei, HiSilicon, Title: Remaining issues of temporary CQI reporting.
R2-1807584 3GPP TSG-RAN WG2 Meeting #102, Busan, Korea, May 21-25, 2018, Source: vivo, Title: Discussion on the SCell BFR.
R2-1807961 3GPP TSG-RAN WG2 Meeting #102, Busan, Korea, May 21-25, 2018, Source: Huawei, HiSilicon, Title: Discussion on BFR-config for SCell BFR.
R2-1807975 3GPP TSG-RAN WG2 Meeting #102, Busan, Korea, May 21-25, 2018, Source: Huawei, HiSilicon, Title: Discussion on beam failure recovery for SCell.
R2-1808024 3GPP TSG-RAN WG2 Meeting #102, Busan, Korea, May 21-25, 2018, Source: Nokia, Nokia Shanghai Bell, Title: SCell Beam Failure Recovery.
R2-1808570 3GPP TSG-RAN WG2 Meeting #102, Busan, Korea, May 21-25, 2018, Source: Qualcomm Incorporated, Title: Dormant BWP for fast SCell activation.
R2-1808658 3GPP TSG-RAN WG2 Meeting #102, Busan, Korea, May 21-25, 2018, Source: ITL, Title: Beam failure recovery on SCell.
R2-1808809 3GPP TSG-RAN WG2 Meeting #102, Busan, Korea, May 21-25, 2018, Source: Ericsson, Title: CR on Dormat SCell state transition MAC CE.
R2-1809515 3GPP TSG RAN WG2 AH-1807, Montreal, Canada, Jul. 2-6, 2018, Source: CATT, Title: Further issues with DL BWP switching for CFRA.
R2-1809523 3GPP TSG RAN WG2 AH-1807, Montreal, Canada, Jul. 2-6, 2018, Source: CATT, Title: Further discussion on BFR termination criterion.
R2-1809721 3GPP TSG RAN WG2 AH-1807, Montreal, Canada, Jul. 2-6, 2018, Source: InterDigital, Title: BWP switching for RA-BFR.
R2-1809872 3GPP TSG RAN WG2 AH-1807, Montreal, Canada, Jul. 2-6, 2018, Source: vivo, Title: Remaining configuration issues for BFR.
R2-1809894 3GPP TSG RAN WG2 AH-1807, Montreal, Canada, Jul. 2-6, 2018, Source: vivo, Title: Preamble Selection when CFRA Resource Available.
R2-1809925 3GPP TSG RAN WG2 AH-1807, Montreal, Canada, Jul. 2-6, 2018, Source: OPPO, Title: The issue of BWP switching for BFR RACH.
R2-1810008 3GPP TSG RAN WG2 AH-1807, Montreal, Canada, Jul. 2-6, 2018, Source: Sharp, Title: Remaining issues on DL BWP switching upon RACH procedure initiation.
R2-1810063 3GPP TSG RAN WG2 AH-1807, Montreal, Canada, Jul. 2-6, 2018, Source: Ericsson, Title: Dormant SCell state in NR.
R2-1810091 3GPP TSG RAN WG2 AH-1807, Montreal, Canada, Jul. 2-6, 2018, Source: Huawei, HiSilicon, Title: BWP switch for BFR.
R2-1810424 3GPP TSG RAN WG2 AH-1807, Montreal, Canada, Jul. 2-6, 2018, Source: Qualcomm Inc., Title: BFD procedure in DRX mode.
R2-1810513 3GPP TSG RAN WG2 AH-1807, Montreal, Canada, Jul. 2-6, 2018, Source: Huawei, HiSilicon, Title: Clarification on RA procedure for BFR on BWPs without CBRA occasions.
R2-1810641 3GPP TSG RAN WG2 AH-1807, Montreal, Canada, Jul. 2-6, 2018, Source: Huawei, HiSilicon, Title: Issues on BWP switch and search space configuration for BFR.
R2-1810643 3GPP TSG RAN WG2 AH-1807, Montreal, Canada, Jul. 2-6, 2018, Source: Huawei, HiSilicon, Title: RACH configuration on BWPs.
R2-1810797 3GPP TSG RAN WG2 AH-1807, Montreal, Canada, Jul. 2-6, 2018, Source: CATT, Title: Offline discussion #100 on DL-UL linking for CFRA.

(56) References Cited

OTHER PUBLICATIONS

R2-1811482 3GPP TSG RAN WG2 Meeting #103, Gothenburg, Sweden, Aug. 20-24, 2018, Source: ZTE, Sanechips, Title: Consideration on implicit configuration of RS for BFD.
R2-1811896 3GPP TSG-RAN WG2 Meeting #103, Gothenburg, Sweden, Aug. 20-24, 2018, Source: Huawei, HiSilicon, Title: BWP switch for BFR.
R2-1812639 3GPP TSG-RAN WG2 Meeting #103, Gothenburg, Sweden, Aug. 20-24, 2018, Source: LG Electronics Inc., Title: BWP operation for BFR RA.
R2-1814198 3GPP TSG-RAN WG2 Meeting #103bis, Chengdu, China, Oct. 8-12, 2018, Source: vivo, Title: Clarification on the beam change during BFR.
RP-181344 3GPP TSG RAN Meeting #80, La Jolla, USA, Jun. 11-14, 2018, Source: Ericsson, Nokia, Nokia Shanghai Bell, Huawei, Title: New WID on MR-DC enhancements (NR_MRDC_Enh).
Dec. 16, 2019—European Extended Search Report—EP 19191018.1.
Dec. 20, 2019—European Extended Search Report—EP 19199208.0.
R2-1811208 3GPP TSG-RAN WG2 Meeting #103, Gothenburg, Sweden, Aug. 20-24, 2018, Source: CATT, Title: UL/DL BWP linkage for PDCCH order initiated CFRA.
R1-1807210 3GPP TSG RAN WG1 Meeting #93, Busan, Korea, May 21-25, 2018, Source: ASUSTeK, Title: Remaining issues on beam management.
R1-1804788 3GPP TSG RAN WG1 Meeting #92b, Sanya, China, Apr. 16-20, 2018, Source: Qualcomm, Title: Beam failure recovery procedure.
Jan. 24, 2020—European Extended Search Report—EP 19199658.6.
R2-1815644 3GPP TSG-RAN WG2 Meeting #103bis, Chengdu, PR China, Oct. 8-12, 2018, Source: Ericsson, Samsung, Title: Correction for Reconfiguration of CFRA during ongoing RA.
R2-1811325 3GPP TSG-RAN WG2 Meeting #103, Gothenburg, Sweden, Aug. 20-24, 2018, Source: Samsung Electronics, Title: Handling Beam Failure Recovery Configuration Update.
3GPP TS 38.321 V15.2.0 (Jun. 2018), Technical Specification, 3rd Generation Partnership Project; Technical Specification Group Radio Access Network; NR; Medium Access Control (MAC) protocol specification (Release 15).
R2-1811149 3GPP TSG-RAN WG2 Meeting #103, Gothenburg, Sweden, Aug. 20-24, 2018, Source: OPPO, Title: CR on beam failure recovery configuration.
R2-1811593 3GPP TSG-RAN WG2 Meeting #103, Gothenburg, Sweden, Aug. 20-24, 2018, Source: ZTE Corporation, Sanechips, Title: CR for the configuration of BeamFailureRecoveryConfig.
3GPP TS 38.331 V15.2.1 (Jun. 2018), Technical Specification, 3rd Generation Partnership Project; Technical Specification Group Radio Access Network; NR; Radio Resource Control (RRC) protocol specification (Release 15).
R1-180XXXX 3GPP TSG-RAN WG1 Meeting #94, Gothenburg, Sweden, Aug. 20-24, 2018, Source: Ericsson, Title: Feature lead summary beam management v2.
R2-1804763 3GPP TSG-RAN WG2 Meeting #101bis, Sanya, China, Apr. 16-20, 2018, Source: Nokia, Nokia Shanghai Bell, Title: Running Mac CR for euCA.
R1-180XXXX 3GPP TSG-RAN WG1 Meeting #94, Gothenburg, Sweden, Aug. 20-24, 2018, Source: NTT DOCOMO, Inc., Title: Offline summary for PDCCH structure and search space.
R1-180XXXX 3GPP TSG-RAN WG1 Meeting #94, Gothenburg, Sweden, Aug. 20-24, 2018, Source: MediaTek Inc., Title: Summary #1 on Remaining Issues on Beam Failure Recovery.
R1-1712153 3GPP TSG RAN WG1 Meeting #90, Prague, Czech Republic, Aug. 21-25, 2017, Source: Huawei, HiSilicon, Title: Overview of bandwidth part.
R1-1713204 3GPP TSG RAN WG1 Meeting #90, Prague, Czech Republic, Aug. 21-25, 2017, Source: LG Electronics, Title: Further remaining details on wider bandwidth operation.
R1-1713978 3GPP TSG RAN WG1 Meeting #90, Prague, Czech Republic, Aug. 21-25, 2017, Source: MediaTek Inc., Title: Further Details on Bandwidth Part Operation in NR.
R1-1719650 3GPP TSG RAN WG1 Meeting #91, Reno, USA, Nov. 27-Dec. 1, 2017, Source: AT&T, Title: Remaining details on bandwidth parts.
R1-1719651 3GPP TSG RAN WG1 Meeting #91, Reno, USA, Nov. 27-Dec. 1, 2017, Source: AT&T, Title: Remaining details on carrier aggregation.
R1-1721027 3GPP TSG RAN WG1 Meeting #91, Reno, USA, Nov. 27-Dec. 1, 2017, Source: Ericsson, Title: On Carrier aggregation related aspects.
R1-1800879 3GPP TSG RAN WG1 NR Ad Hoc, Vancouver, Canada, Jan. 22-26, 2018, Source: Qualcomm Incorporated, Title: Remaining Issues on BWP.
R1-1803622 3GPP TSG RAN WG1 Meeting #92, Sanya, China, Apr. 16-20, 2018, Source: NEC, Title: Remaining issues on beam failure recovery.
R1-1804211 3GPP TSG-RAN WG1 Meeting #92bis, Sanya, China, Apr. 16-20, 2018, Source: Lenovo, Motorola Mobility, Title: Discussion of beam failure recovery for Carrier Aggregation.
R1-1806281 3GPP TSG-RAN WG1 #93, Busan, Korea, May 21-25, 2018, Source: CATT, Title: Remaining issues on beam failure recovery.
R1-1806508 3GPP TSG-RAN WG1 #93, Busan, Korea, May 21-25, 2018, Source: Intel Corporation, Title: Remaining issues on beam failure recovery.
R1-1806789 3GPP TSG-RAN WG1 #93, Busan, Korea, May 21-25, 2018, Source: MediaTek Inc., Title: Remaining issues on beam failure recovery.
R1-1807796 3GPP TSG-RAN WG1 #93, Busan, Korea, May 21-25, 2018, Source: MediaTek Inc., Title: Summary 2 on Remaining issues on beam failure recovery.
R1-1808720 3GPP TSG-RAN WG1 Meeting #94, Gothenburg, Sweden, Aug. 20-24, 2018, Source: Intel Corporation, Title: On SCell Beam Failure Recovery.
R1-1810020 3GPP TSG-RAN WG1 Meeting #94, Gothenburg, Sweden, Aug. 20-24, 2018, Source: Samsung, Title: CR to 38.213 capturing the RAN1#94 meeting agreements.
R2-1713170 3GPP TSG RAN WG2 Meeting #100, Reno, USA, Nov. 27-Dec. 1, 2017, Source: Nokia (rapporteur), Title: Report of [99bis#32][LTE/euCA] Faster activation for Scells (Nokia).
R2-1714289 3GPP TSG RAN WG2 Meeting #100, Reno, USA, Nov. 27-Dec. 1, 2017, Source: Nokia, Nokia Shanghai Bell, Title: Running CR for euCA Stage-2.
R2-1800866 3GPP TSG-RAN WG2 AH, Vancouver, Canada, Jan. 22-26, 2018, Source: vivo, Title: RACH configuration for beam recovery.
R2-1800895 3GPP TSG-RAN WG2 AH, Vancouver, Canada, Jan. 22-26, 2018, Source: vivo, Title: Discussion on the impact on beam failure recovery.
R2-1801432 3GPP TSG RAN WG2 NR Ad Hoc, Vancouver, Canada, Jan. 22-26, 2018, Source: Qualcomm Incorporated, Title: Dormant BWP for fast SCell activation.
R2-1801926 3GPP TSG-RAN WG2 #101, Athens, Greece, Feb. 26-Mar. 2, 2018, Source: ZTE, Sanechips, Title: Remaining considerations on RACH procedure for BFR.
R2-1802143 3GPP TSG-RAN WG2 #101, Athens, Greece, Feb. 26-Mar. 2, 2018, Source: CATT, Title: RACH reattempt considering beam selection.
R2-1802151 3GPP TSG-RAN WG2 #101, Athens, Greece, Feb. 26-Mar. 2, 2018, Source: CATT, Title: Beam failure recovery.
R2-1802756 3GPP TSG RAN WG2 Meeting #101, Athens, Greece, Feb. 26-Mar. 2, 2018, Source: Nokia, Nokia Shanghai Bell, Title: Remaining details on temporary CQI reporting during activation.
R2-1803229 3GPP TSG-RAN WG2 #101, Athens, Greece, Feb. 26-Mar. 2, 2018, Source: Nokia, Nokia Shanghai Bell, Title: BWP switch interaction with contention free BFR preamble.
R2-1803564 3GPP TSG RAN WG2 Meeting #101, Athens, Greece, Feb. 26-Mar. 2, 2018, Source: Qualcomm Incorporated, Title: Dormant BWP for fast SCell activation.

(56) References Cited

OTHER PUBLICATIONS

R2-1804279 3GPP TSG-RAN WG2 Meeting #101, Sanya, China, Apr. 16-20, 2018, Source: ASUSTeK, Title: UE behaviours upon beam failure and recovery.
R2-1804303 3GPP TSG-RAN WG2 Meeting #101, Sanya, China, Apr. 16-20, 2018, Source: Samsung, Title: MAC Impacts: Beam Failure Recovery for SCell.
R2-1804407 3GPP TSG-RAN WG2 Meeting #101, Sanya, China, Apr. 16-20, 2018, Source: ZTE, Sanechips, Title: Consideration on beam failure recovery for SCell.
R2-1804410 3GPP TSG-RAN WG2 Meeting #101, Sanya, China, Apr. 16-20, 2018, Source: Huawei, HiSilicon, Title: Beam failure recovery using MAC CE.
R2-1804411 3GPP TSG-RAN WG2 Meeting #101, Sanya, China, Apr. 16-20, 2018, Source: Huawei, HiSilicon, Title: BWP issues for BFR.
R2-1804434 3GPP TSG-RAN WG2 Meeting #101, Sanya, China, Apr. 16-20, 2018, Source: OPPO, Title: Issues on supporting SCell BFR RACH.
R2-1804481 3GPP TSG-RAN WG2 Meeting #101, Sanya, China, Apr. 16-20, 2018, Source: CATT, Title: Leftover issues for BFR.
R2-1804482 3GPP TSG-RAN WG2 Meeting #101, Sanya, China, Apr. 16-20, 2018, Source: CATT, Title: BFR configurations and fallback options.
R2-1804483 3GPP TSG-RAN WG2 Meeting #101, Sanya, China, Apr. 16-20, 2018, Source: CATT, Title: BFR on SCell.
R2-1804696 3GPP TSG-RAN WG2 Meeting #101, Sanya, China, Apr. 16-20, 2018, Source: vivo, Title: Discussion on the SCell BFR.
R2-1805204 3GPP TSG-RAN WG2 Meeting #101, Sanya, China, Apr. 16-20, 2018, Source: Lenovo, Motorola Mobility, Title: Dedicated PRACH resource for beam failure recovery.
R2-1805414 3GPP TSG-RAN WG2 Meeting #101, Sanya, China, Apr. 16-20, 2018, Source: Ericsson, Title: Beam Failure Recovery in SCell and contention-based BFR on SpCell.
R2-1805896 3GPP TSG-RAN WG2 Meeting #101, Sanya, China, Apr. 16-20, 2018, Source: Huawei, HiSilicon, Title: ASN.1 for Beam Failure Recovery.
R2-1805905 3GPP TSG-RAN WG2 Meeting #101, Sanya, China, Apr. 16-20, 2018, Source: Huawei, HiSilicon, Title: Discussions on RA for SCells BFR.
R1-1704478 3GPP TSG RAN WG1 Meeting #88bis, Spokane, USA, Apr. 3-7, 2017, Source: Fujitsu, Title: Discussion on beam failure recovery procedure.
R1-1704723 3GPP TSG RAN WG1 Meeting #88bis, Spokane, USA, Apr. 3-7, 2017, Source: Intel Corporation, Title: Details for UL Beam Management.
R1-1704725 3GPP TSG RAN WG1 Meeting #88bis, Spokane, USA, Apr. 3-7, 2017, Source: Intel Corporation, Title: On UE Initiated Beam Recovery.
R1-1705582 3GPP TSG RAN WG1 Meeting #88bis, Spokane, USA, Apr. 3-7, 2017, Source: Qualcomm Incorporated, Title: Beam recovery procedures.
R1-1705893 3GPP TSG RAN WG1 Meeting #88bis, Spokane, USA, Apr. 3-7, 2017, Source: Ericsson, Title: Beam failure detection and beam recovery actions.
R1-1705961 3GPP TSG RAN WG1 Meeting #88bis, Spokane, USA, Apr. 3-7, 2017, Source: Nokia, Alcatel-Lucent Shanghai Bell, Title: Beam Recovery in NR.
R1-1706928 3GPP TSG RAN WG1 Meeting #89, Hangzhou, China, May 15-19, 2017, Source: Huawei, HiSilicon, Title: Beam management across multiple carriers.
R1-1707255 3GPP TSG RAN WG1 Meeting #89, Hangzhou, China, May 15-19, 2017, Source: Fujitsu, Title: Discussion on beam failure recovery procedure.
R1-1707356 3GPP TSG RAN WG1 Meeting #89, Hangzhou, China, May 15-19, 2017, Source: Intel Corporation, Title: Discussion for Mechanism to Recover from Beam Failure.
R1-1707477 3GPP TSG RAN WG1 Meeting #89, Hangzhou, China, May 15-19, 2017, Source: CATT, Title: Discussion on DL beam recovery.
R1-1707698 3GPP TSG RAN WG1 Meeting #89, Hangzhou, China, May 15-19, 2017, Source: Guangdong OPPO Mobile Telecom, Title: On Beam Recovery Mechanism.
R1-1707782 3GPP TSG RAN WG1 Meeting #89, Hangzhou, China, May 15-19, 2017, Source: Spreadtrum Communications, Title: Discussion on UE initiated recovery from beam failure.
R1-1707814 3GPP TSG RAN WG1 Meeting #89, Hangzhou, China, May 15-19, 2017, Source: NEC, Title: Low latency beam failure recovery by PRACH/PRACH-like.
R1-1707954 3GPP TSG RAN WG1 Meeting #89, Hangzhou, China, May 15-19, 2017, Source: Samsung, Title: Discussion on beam recovery procedure.
R1-1708678 3GPP TSG RAN WG1 Meeting #89, Hangzhou, China, May 15-19, 2017, Source: Ericsson, Title: Beam failure recovery mechanism.
R1-1708905 3GPP TSG RAN WG1 Meeting #89, Hangzhou, China, May 15-19, 2017, Source: Nokia, Alcatel-Lucent Shanghai Bell, Title: Beam Recovery.
R1-1710144 3GPP TSG RAN WG1 NR Ad-Hoc #2, Qingdao, China, Jun. 27-30, 2017, Source: Guangdong OPPO Mobile Telecom, Title: On Beam Recovery Mechanism.
R1-1710185 3GPP TSG RAN WG1 NR Ad-Hoc #2, Qingdao, China, Jun. 27-30, 2017, Source: ZTE, Title: Discussion on beam recovery mechanism.
R1-1710527 3GPP TSG RAN WG1 NR Ad-Hoc #2, Qingdao, China, Jun. 27-30, 2017, Source: Intel Corporation, Title: Discussion for mechanism to recover from beam failure.
R1-1710655 3GPP TSG RAN WG1 NR Ad-Hoc #2, Qingdao, China, Jun. 27-30, 2017, Source: Samsung, Title: Beam failure recovery.
R1-1714251 3GPP TSG RAN WG1 Meeting #90, Prague, Czech Republic, Aug. 21-25, 2017, Source: Nokia, Nokia Shanghai Bell, Title: Beam recovery in NR.
R1-1715468 3GPP TSG RAN WG1 Meeting NR#3, Nagoya, Japan, Sep. 18-21, 2017, Source: Huawei, HiSilicon, Title: Beam Failure Recovery Design Details.
R1-1715860 3GPP TSG RAN WG1 Meeting NR#3, Nagoya, Japan, Sep. 18-21, 2017, Source: LG Electronics, Title: Discussion on beam failure recovery.
R1-1800362 3GPP TSG RAN WG1 Meeting AH 1801, Vancouver, Canada, Jan. 22-26, 2018, Source: LG Electronics, Title: Clarification on PDCCH beam indication by higher-layers.
R1-1800363 3GPP TSG RAN WG1 Meeting AH 1801, Vancouver, Canada, Jan. 22-26, 2018, Source: LG Electronics, Title: Text proposals on UL beam management.
R1-1800364 3GPP TSG RAN WG1 Meeting AH 1801, Vancouver, Canada, Jan. 22-26, 2018, Source: LG Electronics, Title: Discussion on PHY and MAC operation for beam failure recovery.
R1-1800401 3GPP TSG RAN WG1 Meeting AH 1801, Vancouver, Canada, Jan. 22-26, 2018, Source: Lenovo, Motorola Mobility, Title: Corrections on beam management.
R1-1800402 3GPP TSG RAN WG1 Meeting AH 1801, Vancouver, Canada, Jan. 22-26, 2018, Source: Lenovo, Motorola Mobility, Title: Corrections on beam failure recovery.
R1-1800432 3GPP TSG RAN WG1 Meeting AH 1801, Vancouver, Canada, Jan. 22-26, 2018, Source: Samsung, Title: Issues on beam management.
R1-1800433 3GPP TSG RAN WG1 Meeting AH 1801, Vancouver, Canada, Jan. 22-26, 2018, Source: Samsung, Title: Aperiodic beam reporting.
R1-1800434 3GPP TSG RAN WG1 Meeting AH 1801, Vancouver, Canada, Jan. 22-26, 2018, Source: Samsung, Title: Issues on beam failure recovery.
R1-1800472 3GPP TSG RAN WG1 Meeting AH 1801, Vancouver, Canada, Jan. 22-26, 2018, Source: Samsung, Title: PHR for CA.
R1-1800498 3GPP TSG RAN WG1 Meeting AH 1801, Vancouver, Canada, Jan. 22-26, 2018, Source: OPPO, Title: Text Proposal for Beam Management.
R1-1800499 3GPP TSG RAN WG1 Meeting AH 1801, Vancouver, Canada, Jan. 22-26, 2018, Source: OPPO, Title: Text Proposal for Beam Failure Recovery.
R1-1715941 3GPP TSG RAN WG1 Meeting NR#3, Nagoya Japan, Sep. 18-21, 2017, Source: Samsung, Title: Beam Failure recovery.

(56) References Cited

OTHER PUBLICATIONS

R1-1716295 3GPP TSG RAN WG1 Meeting NR#3, Nagoya, Japan, Sep. 18-21, 2017, Source: Intel Corporation, Title: Remaining Issues on Beam Failure Recovery.
R1-1716397 3GPP TSG RAN WG1 Meeting NR#3, Nagoya, Japan, Sep. 18-21, 2017, Source: Qualcomm Incorporated, Title: Beam recovery procedure.
R1-1716500 3GPP TSG RAN WG1 Meeting NR#3, Nagoya, Japan, Sep. 18-21, 2017, Source: Nokia, Nokia Shanghai Bell, Title Beam Recovery in NR.
R1-1716469 3GPP TSG RAN WG1 Meeting NR#3, Nagoya, Japan, Sep. 18-21, 2017: Source: InterDigital, Inc., Title: Remaining issues on beam recovery.
R1-1717302 3GPP TSG RAN WG1 Meeting #90bis, Prague, Czech Republic, Oct. 9-13, 2017, Source: Huawei, HiSilicon Title: Beam failure recovery design details.
R1-1717369 3GPP TSG RAN WG1 Meeting #90bis, Prague, Czech Republic, Oct. 9-13, 2017, Source: Intel Corporation, Title: Remaining Issues on Beam Failure Recovery.
R1-1717473 3GPP TSG RAN WG1 Meeting #90bis, Prague, Czech Republic, Oct. 9-13, 2017, Source: vivo, Title: Discussion on beam failure recovery.
R1-1717606 3GPP TSG RAN WG1 Meeting #90bis, Prague, Czech Republic, Oct. 9-13, 2017, Source: Samsung, Title: Beam failure recovery.
R1-1717942 3GPP TSG RAN WG1 Meeting #90bis, Prague, Czech Republic, Oct. 9-13, 2017, Source: LG Electronics, Title: Discussion on beam failure recovery.
R1-1718010 3GPP TSG RAN WG1 Meeting #90bis, Prague, Czech Republic, Oct. 9-13, 2017, Source: NEC, Title: Discussion on Beam Failure Recovery.
R1-1718055 3GPP TSG RAN WG1 Meeting #90bis, Prague, Czech Republic, Oct. 9-13, 2017, Source: OPPO, Title: Discussion on Beam Recovery Mechanism.
R1-1718193 3GPP TSG RAN WG1 Meeting #90bis, Prague, Czech Republic, Oct. 9-13, 2017, Source: NTT DOCOMO, Title: Views on beam recovery.
R1-1718389 3GPP TSG RAN WG1 Meeting #90bis, Prague, Czech Republic, Oct. 9-13, 2017, Source: AT&T, Title: Beam Recovery for Full and Partial Control Channel Failure.
R1-1718512 3GPP TSG RAN WG1 Meeting #90bis, Prague, Czech Republic, Oct. 9-13, 2017, Source: Nokia, Nokia Shanghai Bell, Title: Beam Recovery in NR.
R1-1718542 3GPP TSG RAN WG1 Meeting #90bis, Prague Czech Republic, Oct. 9-13, 2017, Source: Qualcomm Incorpated, Title: Beam recovery procedure.
R1-1801454 3GPP TSG RAN WG1 Meeting #92, Athens, Greece, Feb. 26-Mar. 2, 2018, Source: Huawei, HiSilicon, Title: Remaining issues on beam failure recovery.
R1-1801722 3GPP TSG RAN WG1 Meeting #92, Athens, Greece, Feb. 26-Mar. 2, 2018, Source: CATT, Title: Remaining issues on DL beam failure recovery.
R1-1802393 3GPP TSG RAN WG1 Meeting #92, Athens, Greece, Feb. 26-Mar. 2, 2018, Source: Intel Corporation, Title: On beam management issues for mutli-CC operation.
R1-1802397 3GPP TSG RAN WG1 Meeting #92, Athens, Greece, Feb. 26-Mar. 2, 2018, Source: Intel Corporation, Title: Remaining Issues on Beam Failure Recovery.
R1-1802472 3GPP TSG RAN WG1 Meeting #92, Athens, Greece, Feb. 26-Mar. 2, 2018, Source: NTT DOCOMO, Title: Remaining issues on beam recovery.
R1-1802557 3GPP TSG RAN WG1 Meeting #92, Athens, Greece, Feb. 26-Mar. 2, 2018, Source: Nokia, Nokia Shanghai Bell, Title: Remaining Details on Beam Recovery.
R1-1802593 3GPP TSG RAN WG1 Meeting #92, Athens, Greece, Feb. 26-Mar. 2, 2018, Source: AT&T, Title: In support of partial beam failure.
R1-1802744 3GPP TSG RAN WG1 Meeting #92, Athens, Greece, Feb. 26-Mar. 2, 2018, Source: Ericsson, Title: Remaining details on beam recovery.
R1-1802824 3GPP TSG RAN WG1 Meeting #92, Athens, Greece, Feb. 26-Mar. 2, 2018, Source: Qualcomm Incorporated, Title: Beam recovery procedures.
R1-1803397 3GPP TSG RAN WG1 Meeting #92, Athens, Greece, Feb. 26-Mar. 2, 2018, Source: CATT, Title: Summary of Email Discussion on Beam Failure Recovery on Scell.
R1-1803745 3GPP TSG-RAN WG1 Meeting #92bis, Sanya, China, Apr. 16-20, 2018, Source: CATT, Title: Remaining Details on Beam Failure Recovery.
R1-1804210 3GPP TSG-RAN WG1 Meeting #92bis, Sanya, China, Apr. 16-20, 2018, Source: Lenovo, Motorola Mobility, Title: Discussion of Beam Measurement for Carrier Aggregation.
R1-1804363 3GPP TSG-RAN WG1 Meeting #92bis, Sanya, China, Apr. 16-20, 2018, Source: Samsung, Title: Simultaneous Reception of Physical Channels and Reference Signals.
R1-1804789 3GPP TSG-RAN WG1 Meeting #92bis, Sanya, China, Apr. 16-20, 2018, Source: Qualcomm Incorporated, Title: Details on Simultaneous Reception/Transmission of PHY Channels and RS in FR2.
R1-1804975 3GPP TSG-RAN WG1 Meeting #92bis, Sanya, China, Apr. 16-20, 2018, Source: Ericsson, Title: Remaining Issues on Beam Recovery.
R1-1804977 3GPP TSG-RAN WG1 Meeting #92bis, Sanya, China, Apr. 16-20, 2018, Source: Ericsson, Title: On Simultaneous Reception of Physical and Reference Signals Across CCs.
R1-1805538 3GPP TSG-RAN WG1 Meeting #92bis, Sanya, China, Apr. 16-20, 2018, Source: NTT DOCOMO, Inc., Title: Offline Summary for AI 7.1.3.1.2 Search Space.
R1-1806616 3GPP TSG-RAN WG1 #93, Busan, Korea, May 21-25, 2018, Source: LG Electronics, Title: Remaining Issues on Search Space.
R1-1806729 3GPP TSG-RAN WG1 #93, Busan, Korea, May 21-25, 2018, Source: Samsung, Title: Corrections on Search Space Design.
R2-1707999 3GPP TSG-RAN WG2 #99, Berlin, Germany, Aug. 21-25, 2017, Source: MediaTek Inc., Title: Beam Management and Beam Recovery in MAC.
R2-1708677 3GPP TSG RAN WG2 #99, Berlin, Germany, Aug. 21-25, 2017, Source: Nokia, Nokia Shanghai Bell, Title: Beam Recovery in NR.
R2-1708697 3GPP TSG RAN WG2 #99, Berlin, Germany, Aug. 21-25, 2017, Source: Huawei, HiSilicon, Title: Handling of Resources for Beam Failure Recovery.
R2-1709085 3GPP TSG-RAN WG2 #99, Berlin, Germany, Aug. 21-25, 2017, Source: Qualcomm Incorporated, Title: Beam Recovery Request.
R2-1709320 3GPP TSG-RAN WG2 #99, Berlin, Germany, Aug. 21-25, 2017, Source: ASUSTeK, Title: Discussion on Beam Recover Request in NR.
R2-1800042 3GPP TSG-RAN WG2 AH, Vancouver, Canada, Jan. 22-26, 2018, Source: ASUSTeK, Title: Discussion on Beam Failure Recovery Request in NR.
R2-1800049 3GPP TSG-RAN WG2 AH, Vancouver, Canada, Jan. 22-26, 2018, Source: ASUSTeK, Title: UE Behaviours Upon Beam Failure and Recovery.
R2-1800168 3GPP TSG-RAN WG2 AH, Vancouver, Canada, Jan. 22-26, 2018, Source: CATT, Title: Solution for PH Type Inconsistency Between RAN1 and RAN2.
R2-1800169 3GPP TSG-RAN WG2 AH, Vancouver, Canada, Jan. 22-26, 2018, Source: CATT, Title: PHR MAC CE for EN-DC.
R2-1800231 3GPP TSG-RAN WG2 #100, Reno, USA, Nov. 27-Dec. 1, 2017, Source: Xiaomi, Title: Consideration on PHR Trigger Condition for Supporting SUL.
R2-1800253 3GPP TSG-RAN WG2 AH, Vancouver, Canada, Jan. 22-26, 2018, Source: ASUSTeK, Title: Pathloss Change for Triggering PHR.
R2-1800254 3GPP TSG-RAN WG2 AH, Vancouver, Canada, Jan. 22-26, 2018, Source: CATT, Title: RA Procedure and Parameters for BFR.
R2-1800343 3GPP TSG-RAN WG2 AH, Vancouver, Canada, Jan. 22-26, 2018, Source: Ericsson, Title: PHR Format for SUL.
R2-1800614 3GPP TSG-RAN WG2 AH, Vancouver, Canada, Jan. 22-26, 2018, Source: Samsung, Title: Support for Type 2 PH in NR.

(56) References Cited

OTHER PUBLICATIONS

R2-1800619 3GPP TSG-RAN WG2 AH, Vancouver, Canada, Jan. 22-26, 2018, Source: Samsung, Title: SUL and PHR.
R2-1800642 3GPP TSG-RAN WG2 AH, Vancouver, Canada, Jan. 22-26, 2018, Source: Huawei, HiSilicon, Title: PHR Alignment Between RAN1 and RAN2.
R2-1800680 3GPP TSG-RAN WG2 AH, Vancouver, Canada, Jan. 22-26, 2018, Source: Lenovo, Motorola Mobility, Title: PHR for NR CA.
R2-1800822 3GPP TSG-RAN WG2 AH, Vancouver, Canada, Jan. 22-26, 2018, Source: Spreadtrum Communications, Title: Beam Failure Recovery Clarification.
R2-1801008 3GPP TSG-RAN WG2 AH, Vancouver, Canada, Jan. 22-26, 2018, Source: Huawei, HiSilicon, Title: Discussion on Power Sharing and its Impact on PHR for EN-DC.
R2-1801009 3GPP TSG-RAN WG2 AH, Vancouver, Canada, Jan. 22-26, 2018, Source: Huawei, HiSilicon, Title: General Consideration on RA Procedure for Beam Failure Recovery.
R2-1801041 3GPP TSG-RAN WG2 AH, Vancouver, Canada, Jan. 22-26, 2018, Source: Huawei, HiSilicon, Title: Remaining Issue of Power Management in NR.
R2-1801043 3GPP TSG-RAN WG2 AH, Vancouver, Canada, Jan. 22-26, 2018, Source: Huawei, HiSilicon, Title: Consideration of PHR with Multi-Beam Operation.
R2-1801404 3GPP TSG-RAN WG2 AH, Vancouver, Canada, Jan. 22-26, 2018, Source: NTT DOCOMO, Inc., Title: Discussion on Beam Failure Recovery.
R2-1801406 3GPP TSG-RAN WG2 AH, Vancouver, Canada, Jan. 22-26, 2018, Source: NTT DOCOMO, Inc., Title: Remaining Issue on PHR.
R2-1801539 3GPP TSG-RAN WG2 AH, Vancouver, Canada, Jan. 22-26, 2018, Source: CATT, Title: PHR MAC CE for EN-DC.
R2-1801540 3GPP TSG-RAN WG2 AH, Vancouver, Canada, Jan. 22-26, 2018, Source: CATT, Title: Correction on PHR MAC CE in EN-DC in TS38.321.
R2-1801564 3GPP TSG-RAN WG2 AH, Vancouver, Canada, Jan. 22-26, 2018, Source: NTT DOCOMO, Inc., Title: LS on PHR.
R2-1801568 3GPP TSG-RAN WG2 AH, Vancouver, Canada, Jan. 22-26, 2018, Source: RAN WG2, Title: LS on PHR.
R2-1801814 3GPP TSG-RAN WG2 #101, Athens, Greece, Feb. 26-Mar. 2, 2018, Source: Huawei, HiSilicon, Title: Beam Failure Recovery on SCell.
R2-1802490 3GPP TSG-RAN WG2 #101, Athens, Greece, Feb. 26-Mar. 2, 2018, Source: CATT, Huawei, HiSilicon, Title: Discussion on Beam Failure Recovery for CA.
R2-1802554 3GPP TSG-RAN WG2 #101, Athens, Greece, Feb. 26-Mar. 2, 2018, Source: ASUSTeK, Title: Discussion on Beam Failure Recovery Request in NR.
R2-1803195 3GPP TSG-RAN WG2 #101, Athens, Greece, Feb. 26-Mar. 2, 2018, Source: Ericsson, Title: Beam Failure Recovery in Scell.
R2-1804877 3GPP TSG-RAN WG2 Meeting #101bis, Sanya, China, Apr. 16-20, 2018, Source: Xiaomi, Title: Consideration on SR Transmission Occasion Overlap with a UL-SCH Resource.
R2-18006164 3GPP TSG-RAN WG2 Meeting #101bis, Sanya, China, Apr. 16-20, 2018, Source: Media Tek Inc., Title: On Parallel SR and RACH Procedure in NR.
R1-170xxxx 3GPP TSG RAN WG1 Meeting #88b, Spokane, USA, Apr. 3-7, 2017, Source: Huawei, HiSilicon, Title: WF on Beam Failure Recovery.
R1-171xxxx 3GPP TSG RAN WG1 Meeting #90, Prague, Czech Republic, Aug. 21-25, 2017, Source: MediaTek Inc. Title: Offline Discussion on Beam Recovery Mechanism.
R1-1704230 3GPP TSG RAN WG1 Meeting #88b, Spokane, USA, Apr. 3-7, 2017, Source: Huawei, HiSilicon, Title: Link recovery procedure for beam failure.
3GPP TS 36.212 V14.3.0 (Jun. 2017); Technical Specification; 3rd Generation Partnership Project; Technical Specification Group Radio Access Network; Evolved Universal Terrestrial Radio Access (E-UTRA); Multiplexing and channel coding (Release 14).

3GPP TSG RAN WG1 Meeting #90, Prague, Czech Republic, Aug. 21-25, 2017, Title: RAN1 Chairman's Notes.
R1-1705719 3GPP TSG RAN WG1 Meeting #88bis, Spokane, USA, Apr. 3-7, 2017, Source: NTT DOCOMO, Inc., Title: Further views on mechanism to recover from beam failure.
R1-1711016 3GPP TSG RAN WG1 #89AH-NR, Qingdao, China, Jun. 27-30, 2017, Source: Ericsson, Title: UL beam management details.
R1-1712223 3GPP TSG RAN WG1 Meeting #90, Prague, Czech Republic, Aug. 21-25, 2017, Source: Huawei, HiSilicon, Title: UL beam management.
R1-1712224 3GPP TSG RAN WG1 Meeting #90, Prague, Czech Republic, Aug. 21-25, 2017, Source: Huawei, HiSilicon, Title: Procedure details for beam failure recovery.
R1-1712268 3GPP TSG RAN WG1 Meeting #90, Prague, Czech Republic, Aug. 21-25, 2017, Source: Xinwei, Title: Discussion on beam failure recovery.
R1-1712299 3GPP TSG RAN WG1 Meeting #90, Prague, Czech Republic, Aug. 21-25, 2017, Source: ZTE, Title: UL beam management for NR MIMO.
R1-1712378 3GPP TSG RAN WG1 Meeting #90, Prague, Czech Republic, Aug. 21-25, 2017, Source: CATT, Title: Considerations on UL beam management.
R1-1712379 3GPP TSG RAN WG1 Meeting #90, Prague, Czech Republic, Aug. 21-25, 2017, Source: CATT, Title: Beam failure detection and recovery.
R1-1712551 3GPP TSG RAN WG1 Meeting #90, Prague, Czech Republic, Aug. 21-25, 2017, Source: Intel Corporation, Title: Details for UL beam management.
R1-1712552 3GPP TSG RAN WG1 Meeting #90, Prague, Czech Republic, Aug. 21-25, 2017, Source: Intel Corporation, Title: Discussion for mechanism to recover from beam failure.
R1-1721672 3GPP TSG RAN WG1 Meeting #90, Prague, Czech Republic, Aug. 21-25, 2017, Source: Lenovo, Motorola Mobility, Title: Discussion of beam failure recovery.
R1-1712713 3GPP TSG RAN WG1 Meeting #90, Prague, Czech Republic, Aug. 21-25, 2017, Source: AT&T, Title: Mechanisms to recover from beam failure.
R1-1712838 3GPP TSG RAN WG1 Meeting #90, Prague, Czech Republic, Aug. 21-25, 2017, Source: Vivo, Title: Discussion on uplink beam management.
R1-1712966 3GPP TSG RAN WG1 Meeting #90, Prague, Czech Republic, Aug. 21-25, 2017, Source: Sony, Title: Considerations on UL beam management.
R1-1713287 3GPP TSG RAN WG1 Meeting #90, Prague, Czech Republic, Aug. 21-25, 2017, Source: Guangdong OPPO Mobile Telecom, Title: Discussion on the UL beam management.
R1-1713596 3GPP TSG RAN WG1 Meeting #90, Prague, Czech Republic, Aug. 21-25, 2017, Source: Samsung, Title: Discussion on UL beam management.
R1-1714143 3GPP TSG RAN WG1 Meeting #90, Prague, Czech Republic, Aug. 21-25, 2017, Source: InterDigital, Inc., Title: On efficient UL beam management.
R1-1714250 3GPP TSG RAN WG1 Meeting #90, Prague, Czech Republic, Aug. 21-25, 2017, Source: Nokia, Nokia Shanghai Bell, Title: SRS transmission for beam management.
R1-1714292 3GPP TSG RAN WG1 Meeting #90, Prague, Czech Republic, Aug. 21-25, 2017, Source: Ericsson, Title: On UL beam management.
R1-1714383 3GPP TSG RAN WG1 Meeting #90, Prague, Czech Republic, Aug. 21-25, 2017, Source: ASUSTeK, Title: Considerations on UE Beamforming Management.
3GPP TSG RAN WG1 Meeting NR#3, Nagoya, Japan, Sep. 18-21, 2017, Title: RAN1 Chairman's Notes.
R1-1715441 3GPP TSG RAN WG1 Meeting NR#3, Nagoya, Japan, Sep. 18-21, 2017, Source: ZTE, Sanechips, Title: Discussion on beam recovery.
R1-1715620 3GPP TSG RAN WG1 Meeting NR#3, Nagoya, Japan, Sep. 18-21, 2017, Source: Vivo, Title: Discussion on beam failure recovery procedure.
R1-1715802 3GPP TSG RAN WG1 Meeting NR#3, Nagoya, Japan, Sep. 18-21, 2017, Source: CATT, Title: Beam failure detection and recovery.

(56) References Cited

OTHER PUBLICATIONS

R2-1708696 3GPP TSG RAN WG2 #99, Berlin, Germany, Aug. 21-25, 2017, Source: Huawei, HiSilicon, Title: Consideration on DRX with beam management.
R2-1708755 3GPP TSG RAN WG2 #99, Berlin, Germany, Aug. 21-25, 2017, Source: LG Electronics, Title: DRX related timers in NR (Revision of R2-1706750).
R2-1708791 3GPP TSG RAN WG2 #99, Berlin, Germany, Aug. 21-25, 2017, Source: Intel Corporation, Title: C-DRX enhancement in NR (Revision of R2-1707026).
R2-1709223 3GPP TSG RAN WG2 #99, Berlin, Germany, Aug. 21-25, 2017, Source: Qualcomm Incorporated, Title: Beam management in C-DRX.
R2-1709588 3GPP TSG RAN WG2 #99, Berlin, Germany, Aug. 21-25, 2017, Source: Samsung, Title: NR beamformed C-DRX operation (updated resubmission of R2-1705734).
R2-1709652 3GPP TSG RAN WG2 #99, Berlin, Germany, Aug. 21-25, 2017, Source: Qualcomm Incorporated, Apple, OPPO, Title: Wake-Up Signaling for C-DRX Mode.
R2-1709916 3GPP TSG RAN WG2 #99, Berlin, Germany, Aug. 21-25, 2017, Source: Ericsson, Title: Reply LS to SA2 on 5QIs for URLLC.
Aug. 27, 2019—European Extended Search Report—EP 19173892.1.
3GPP TSG-RAN WG1 #89: "Beam failure recovery mechanism", May 15, 2017.
3GPP TSG-RAN WG2 Meeting#AH: "Random access procedure for beam recovery request", Jun. 27, 2017.
Sep. 25, 2019—European Extended Search Report—EP 19166863.1.
R1-1803368 3GPP TSG RAN WG1 Meeting #92, Athens, Greece, Feb. 26- Mar. 2, 2018, Source: [RAN1], Title: Draft LS reply to RAN2 on beam failure recovery.
R1-1803441 3GPP TSG RAN WG1 Meeting #92, Athens, Greece, Feb. 26-Mar. 2, 2018, Source: MediaTek Inc., Title: Summary 2 on Remaing issues on Beam Failure Recovery.
R2-1811483 3GPP TSG-RAN WG2 Meeting #103, Gothenburg, Sweden, Aug. 20-24, 2018, Source: ZTE, Sanechips, Title: CR for the reset of BFD in 38.321.
R2-1812108 3GPP TSG-RAN WG2 Meeting #103, Gothenburg, Sweden, Aug. 20-24, 2018, Source: Nokia, Nokia Shanghai Bell, Title: Reset of BFD.
3GPP TS 38.213 V15.2.0 (Jun. 2018), Technical Specification, 3rd Generation Partnership Project; Technical Specification Group Radio Access Network; NR; Physical layer procedures for control (Release 15).
R2-1806229 3GPP TSG-RAN WG2 Meeting #101 bis, Sanya, China, April 16-20, 2018, Source: Samsung, Title: Miscellaneous corrections.

* cited by examiner

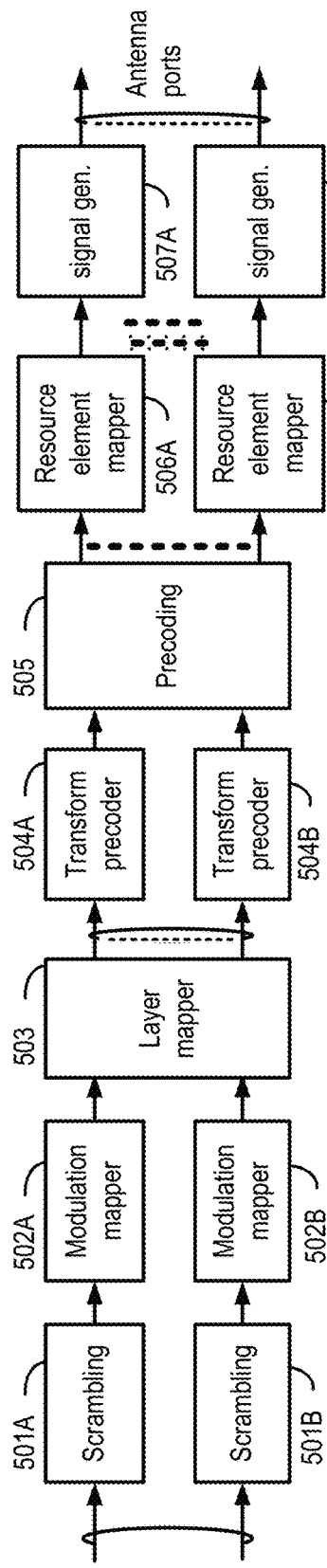
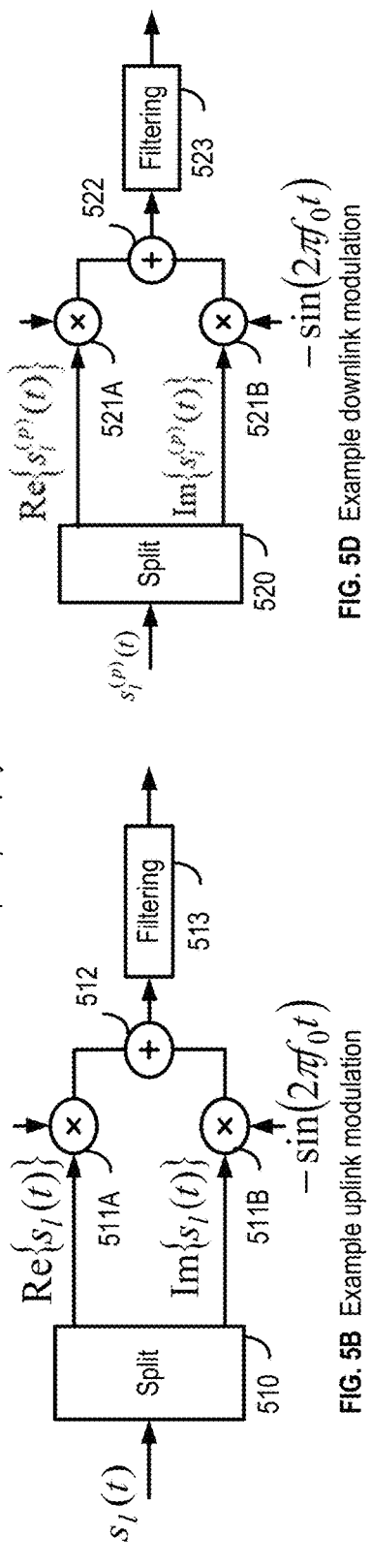
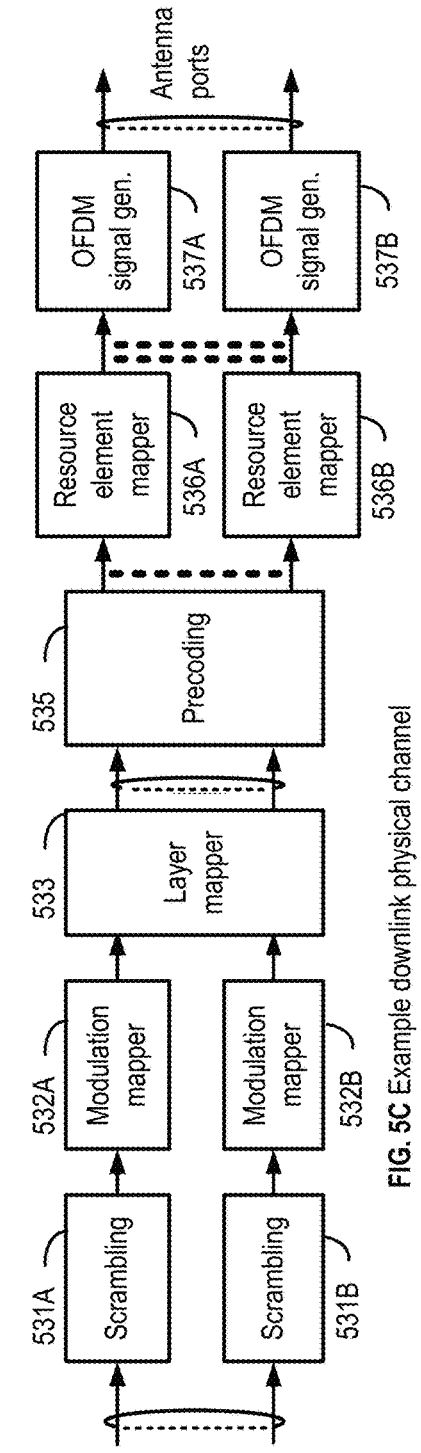
FIG. 5A Example uplink physical channel
FIG. 5B Example uplink modulation
FIG. 5C Example downlink physical channel
FIG. 5D Example downlink modulation Example 1: 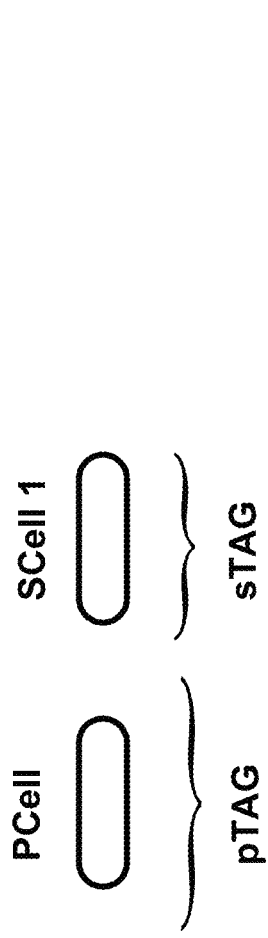
Example 2: 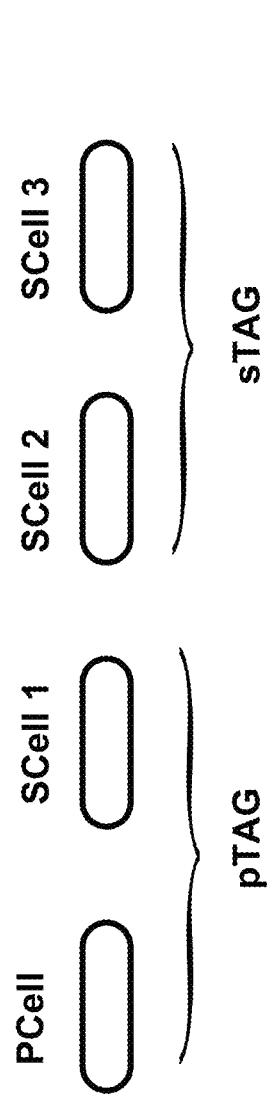
Example 3: 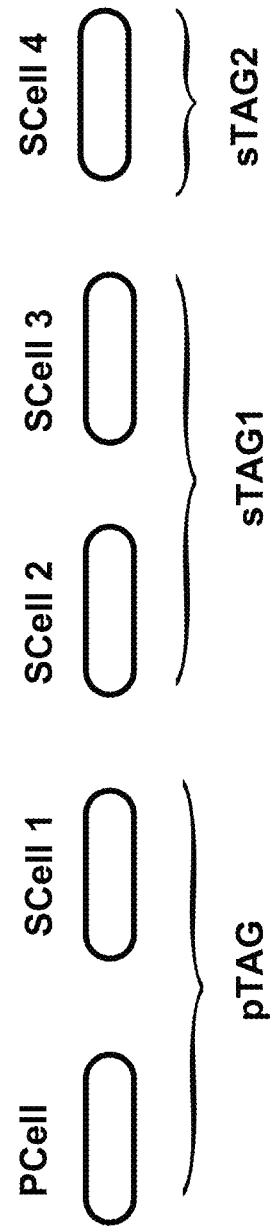
FIG. 8

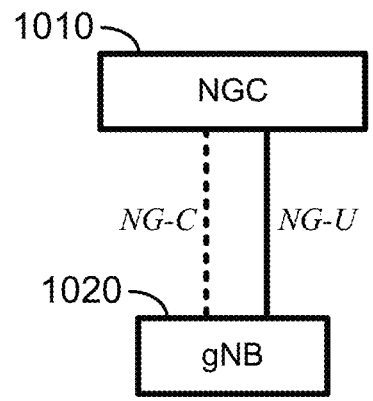
FIG. 10A gNB connected to NGC
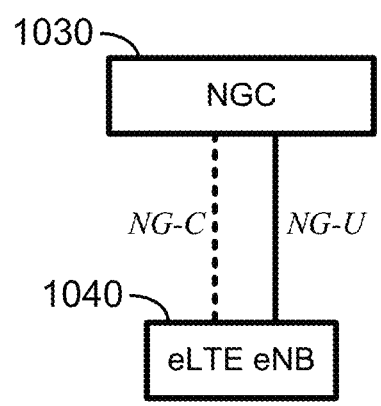
FIG. 10B eLTE eNB connected to NGC

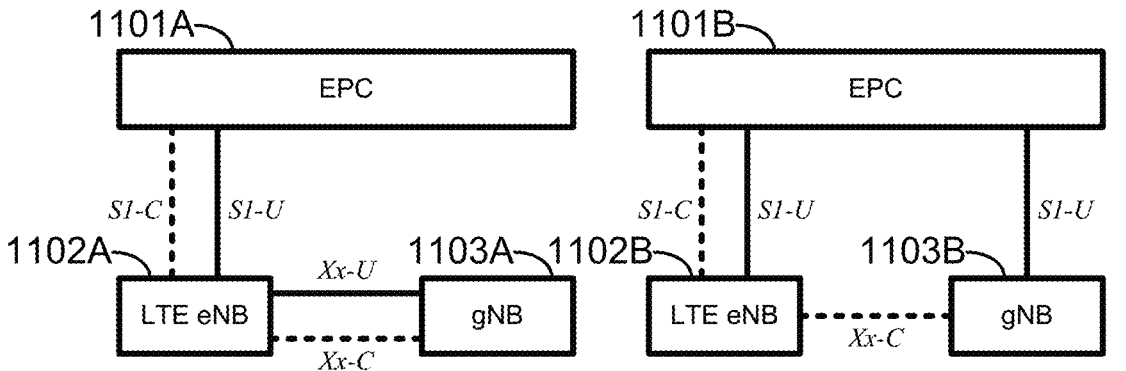

FIG. 11A LTE eNB connected to EPC with non-standalone gNB. gNB user plane connected to EPC via LTE eNB.

FIG. 11B LTE eNB connected to EPC with non-standalone gNB. gNB user plane connected to EPC directly.

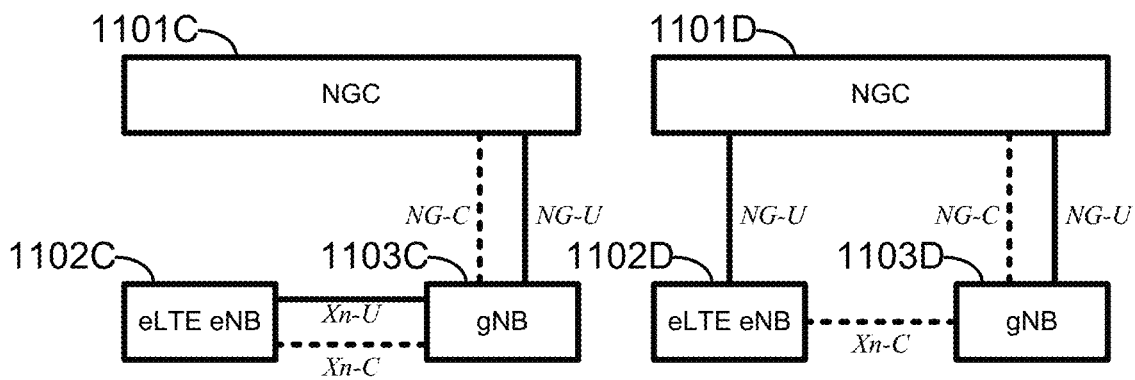

FIG. 11C gNB connected to NGC with non-standalone eLTE eNB. eLTE eNB user plane connected to NGC via gNB.

FIG. 11D gNB connected to NGC with non-standalone eLTE eNB. eLTE eNB user plane connected to NGC directly.

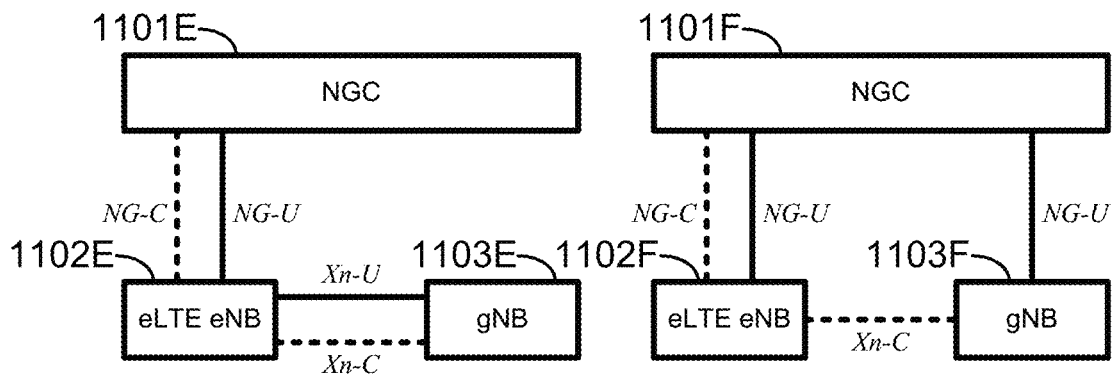

FIG. 11E eLTE eNB connected to NGC with non-standalone gNB. gNB user plane connected to NGC via eLTE eNB.

FIG. 11F eLTE eNB connected to NGC with non-standalone gNB. gNB user plane connected to NGC directly.

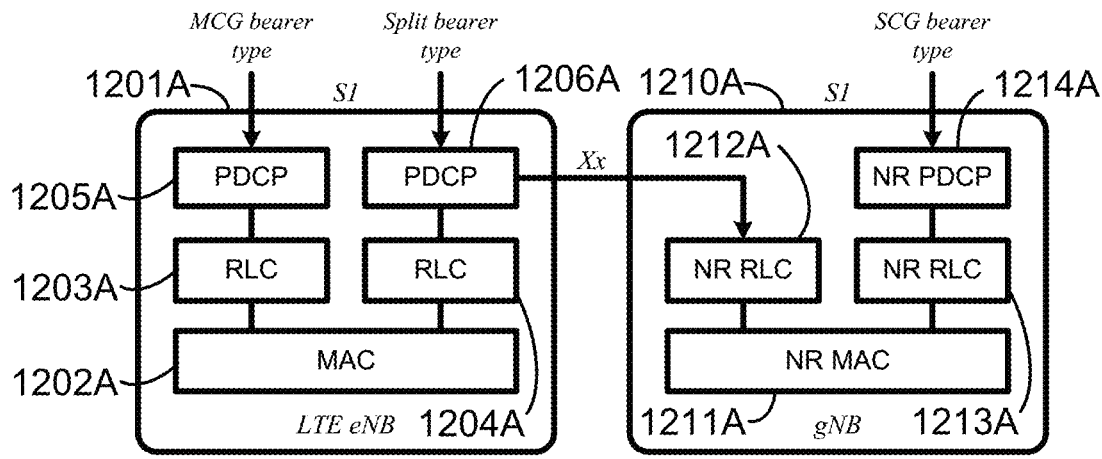
FIG. 12A Radio protocol architecture for split bearer and SCG bearer. LTE eNB connected to EPC with non-standalone gNB.
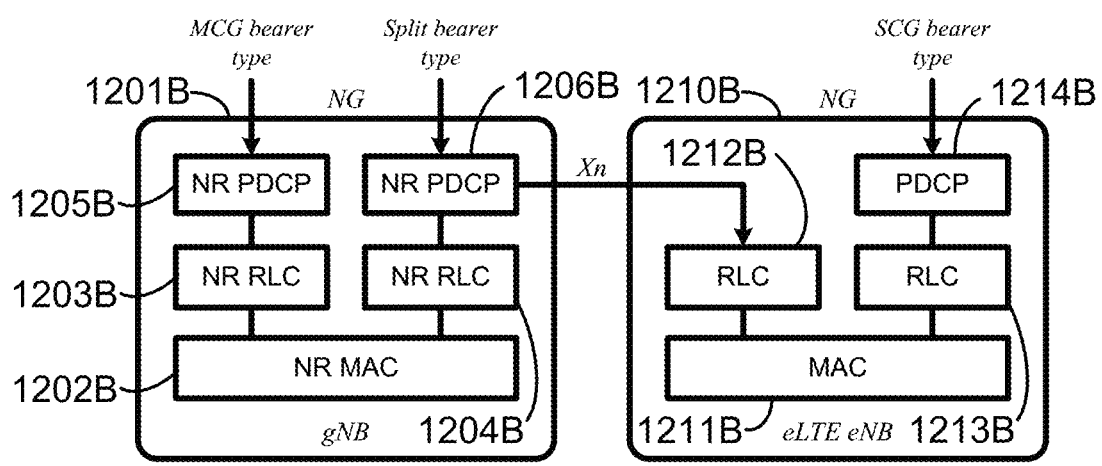
FIG. 12B Radio protocol architecture for split bearer and SCG bearer. gNB connected to NGC with non-standalone eLTE eNB.
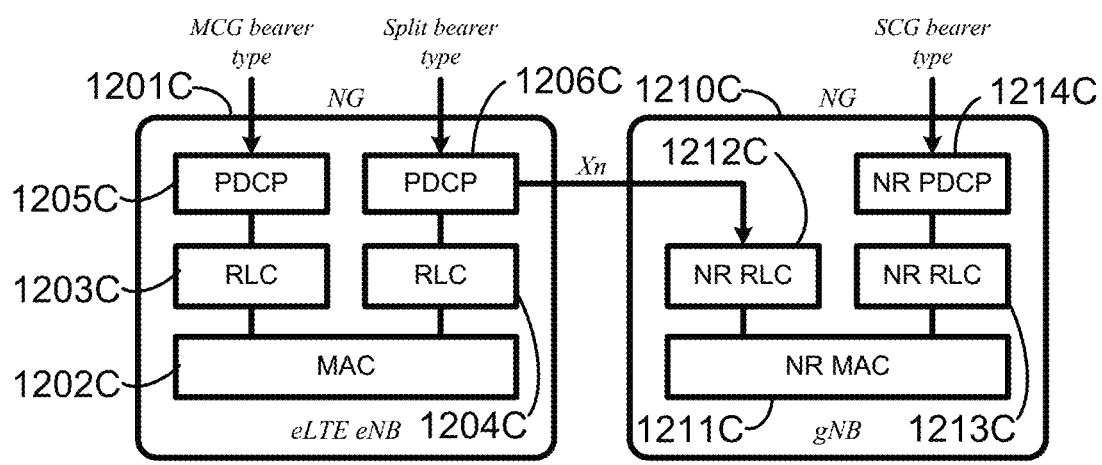
FIG. 12C Radio protocol architecture for split bearer and SCG bearer. eLTE eNB connected to NGC with non-standalone gNB.

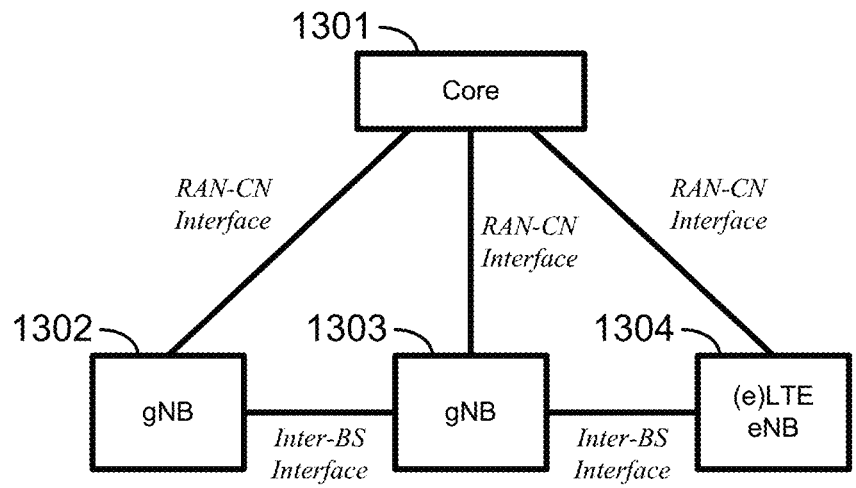
FIG. 13A Non-centralized deployment
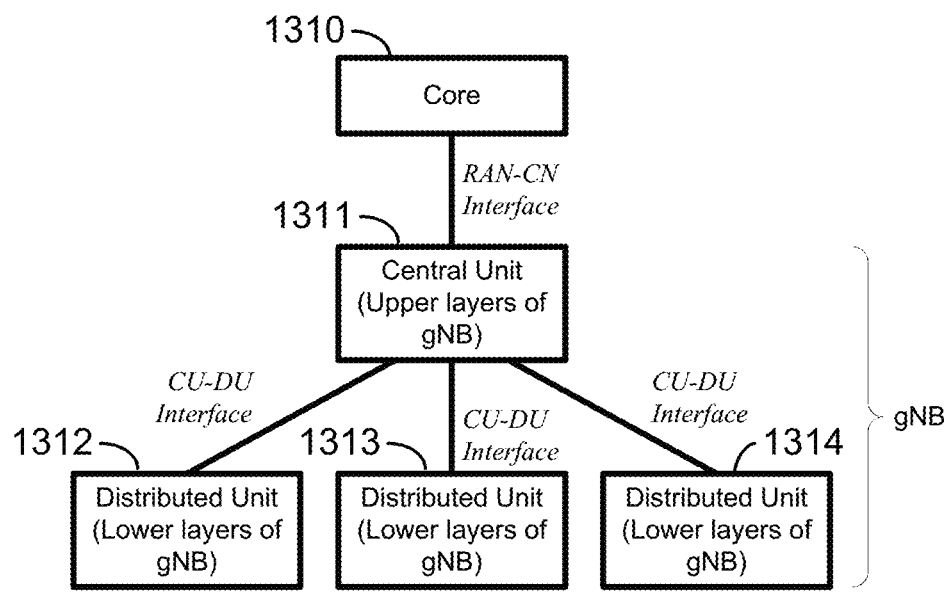
FIG. 13B Centralized deployment

BEAM PAGING ASSISTANCE

CROSS-REFERENCE TO RELATED APPLICATIONS

This application is a continuation of U.S. application Ser. No. 16/193,971, titled "Beam Paging Assistance" and filed on Nov. 16, 2018, now allowed, which claims the benefit of U.S. Provisional Patent Application No. 62/587,255, titled "Beam Paging Assistance Information of Base Station" and filed on Nov. 16, 2017, and U.S. Provisional Patent Application No. 62/587,265, titled "Paging Message with Beam Information" and filed Nov. 16, 2017, the disclosures of which are hereby incorporated by reference in their entirety.

BACKGROUND

In wireless communications, various beam procedures may be performed such as uplink beam management, downlink beam failure recovery, or downlink beam management. It is desired to improve wireless communications by performing various beam procedures in a more timely and efficient manner.

SUMMARY

The following summary presents a simplified summary of certain features. The summary is not an extensive overview and is not intended to identify key or critical elements.

Systems, apparatuses, and methods are described for communications associated with beam paging in wireless networks. A base station may send, to a core network entity (CNE), a message indicating a context release of the wireless device including paging assistance elements, such as cell ID and beam identifiers. The base station may receive, from the CNE, a first paging message including a wireless device ID and the paging assistance information elements. The CNE may utilize the one or more beam identifiers for an efficient paging procedure for paging the wireless device. If a paging message is transmitted via one or more selected beams, the base station may be able to save radio resources for a paging procedure and reduce overhead as compared to transmitting paging messages multiple times via all beams. An immediate response from the CNE may not be required based on the transmission of the paging message. A base station may send paging assistance information elements to the CNE because the base station may release the paging assistance information from memory. The CNE may send the same paging assistance information back to the base station which may conserve resources.

These and other features and advantages are described in greater detail below.

BRIEF DESCRIPTION OF THE SEVERAL VIEWS OF THE DRAWINGS

Examples of several of the various embodiments of the present invention are described herein with reference to the drawings.

Some features are shown by way of example, and not by limitation, in the accompanying drawings. In the drawings, like numerals reference similar elements.

FIG. 5A, FIG. 5B, FIG. 5C and FIG. 5D show examples for uplink and downlink signal transmission.

FIG. 8 shows example timing advance group (TAG) configurations.

FIG. 10A and FIG. 10B show examples for interfaces between a 5G core network and base stations.

FIG. 11A, FIG. 11B, FIG. 11C, FIG. 11D, FIG. 11E, and FIG. 11F show examples for architectures of tight interworking between a 5G RAN and a long term evolution (LTE) radio access network (RAN).

FIG. 12A, FIG. 12B, and FIG. 12C show examples for radio protocol structures of tight interworking bearers.

FIG. 13A and FIG. 13B show examples for gNodeB (gNB) deployment.

DETAILED DESCRIPTION OF EMBODIMENTS

Figure 1:
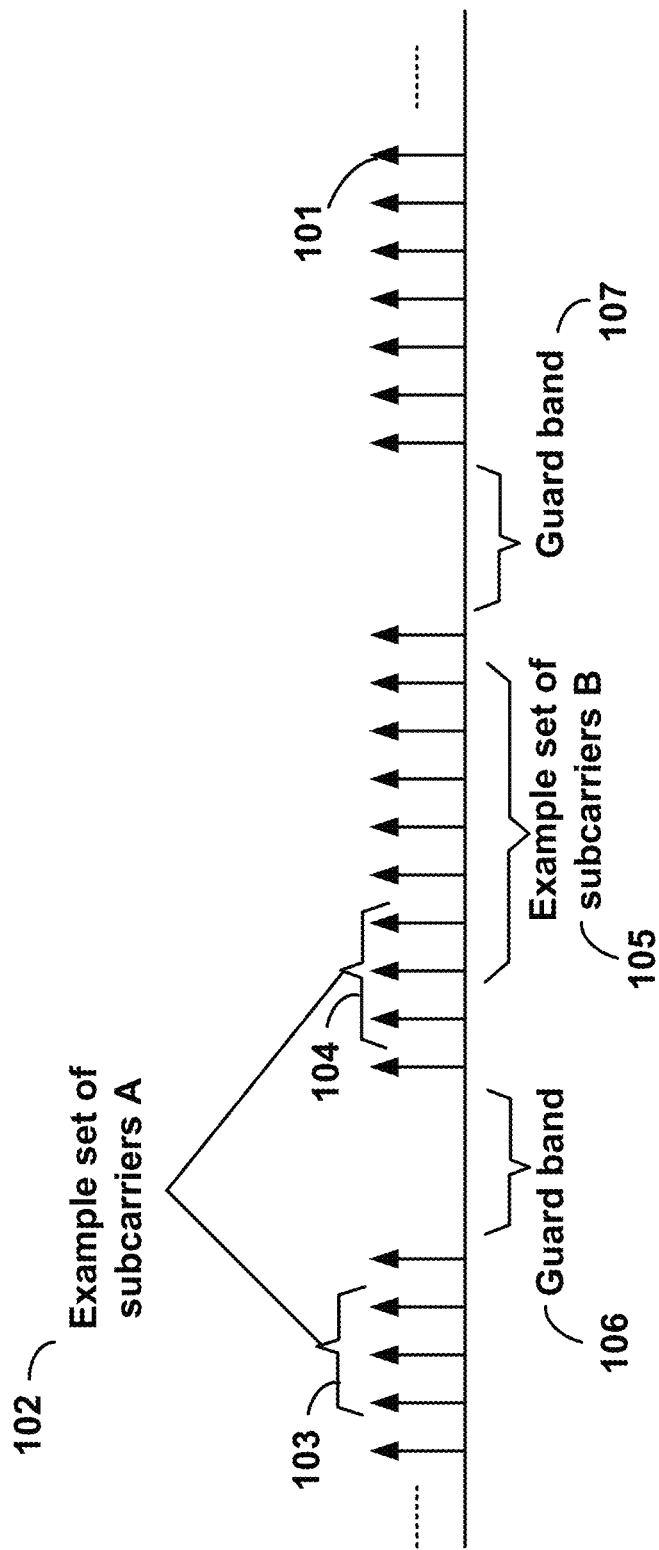
FIG. 1 shows example sets of orthogonal frequency division multiplexing (OFDM) subcarriers.

The accompanying drawings, which form a part hereof, show examples of the disclosure. It is to be understood that the examples shown in the drawings and/or discussed herein are non-exclusive and that there are other examples of how the disclosure may be practiced.

Examples may relate to beam paging in multicarrier communication systems.

The following acronyms are used throughout the present disclosure, provided below for convenience although other acronyms may be introduced in the detailed description:
3GPP 3rd Generation Partnership Project
5G 5th generation wireless systems
5GC 5G Core Network
ACK Acknowledgement
AMF Access and Mobility Management Function
ASIC application-specific integrated circuit
BPSK binary phase shift keying
CA carrier aggregation
CC component carrier
CDMA code division multiple access
CP cyclic prefix
CPLD complex programmable logic devices
CSI channel state information
CSS common search space
CU central unit
DC dual connectivity
DCI downlink control information DFTS-OFDM discrete Fourier transform spreading OFDM
DL downlink
DU distributed unit
eLTE enhanced LTE
eMBB enhanced mobile broadband
eNB evolved Node B
EPC evolved packet core
E-UTRAN evolved-universal terrestrial radio access network
FDD frequency division multiplexing
FPGA field programmable gate arrays
Fs-C Fs-control plane
Fs-U Fs-user plane
gNB next generation node B
HARQ hybrid automatic repeat request
HDL hardware description languages
ID identifier
IE information element
LTE long term evolution
MAC media access control
MCG master cell group
MeNB master evolved node B
MIB master information block
MME mobility management entity
mMTC massive machine type communications
NACK Negative Acknowledgement
NAS non-access stratum
NG CP next generation control plane core
NGC next generation core
NG-C NG-control plane
NG-U NG-user plane
NR MAC new radio MAC
NR PDCP new radio PDCP
NR PHY new radio physical
NR RLC new radio RLC
NR RRC new radio RRC
NR new radio
NSSAI network slice selection assistance information
OFDM orthogonal frequency division multiplexing
PCC primary component carrier
PCell primary cell
PDCCH physical downlink control channel
PDCP packet data convergence protocol
PDU packet data unit
PHICH physical HARQ indicator channel
PHY physical
PLMN public land mobile network
PSCell primary secondary cell
pTAG primary timing advance group
PUCCH physical uplink control channel
PUSCH physical uplink shared channel
QAM quadrature amplitude modulation
QPSK quadrature phase shift keying
RA random access
RACH random access channel
RAN radio access network
RAP random access preamble
RAR random access response
RB resource blocks
RBG resource block groups
RLC radio link control
RRC radio resource control
RRM radio resource management
RV redundancy version
SCC secondary component carrier
SCell secondary cell
SCG secondary cell group
SC-OFDM single carrier-OFDM
SDU service data unit
SeNB secondary evolved node B
SFN system frame number
S-GW serving gateway
SIB system information block
SC-OFDM single carrier orthogonal frequency division multiplexing
SRB signaling radio bearer
sTAG(s) secondary timing advance group(s)
TA timing advance
TAG timing advance group
TAI tracking area identifier
TAT time alignment timer
TDD time division duplexing
TDMA time division multiple access
TTI transmission time interval
TB transport block
UE user equipment
UL uplink
UPGW user plane gateway
URLLC ultra-reliable low-latency communications
VHDL VHSIC hardware description language
Xn-C Xn-control plane
Xn-U Xn-user plane
Xx-C Xx-control plane
Xx-U Xx-user plane Examples may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be used for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 shows example sets of OFDM subcarriers. As shown in this example, arrow(s) in the diagram may depict a subcarrier in a multicarrier OFDM system. The OFDM system may use technology such as OFDM technology, DFTS-OFDM, SC-OFDM technology, or the like. For example, arrow 101 shows a subcarrier transmitting information symbols. FIG. 1 is shown as an example, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As shown in FIG. 1, guard band 106 is between subcarriers 103 and subcarriers 104. The example set of subcarriers A 102 includes subcarriers 103 and subcarriers 104. FIG. 1 also shows an example set of subcarriers B 105. As shown, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
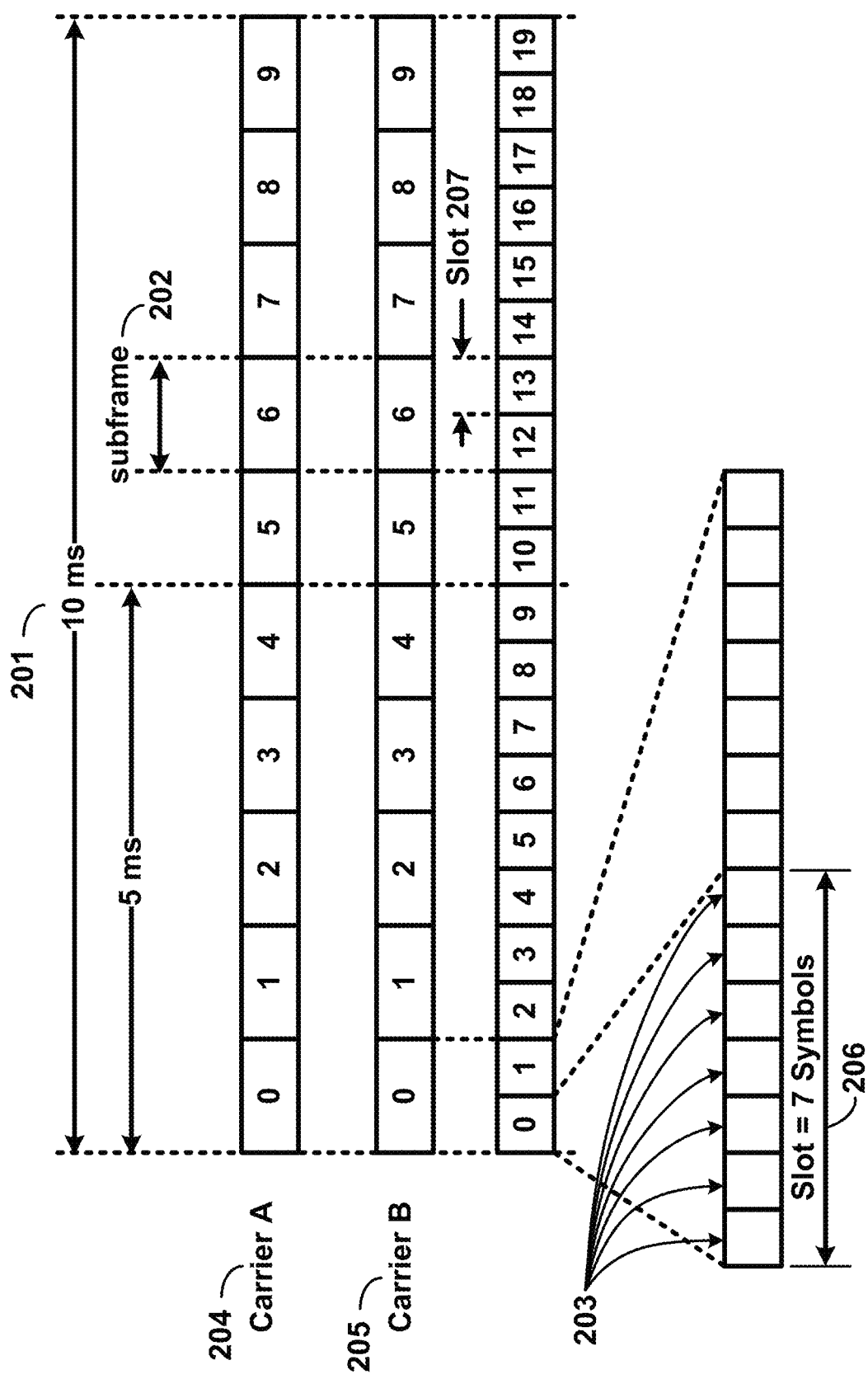
FIG. 2 shows example transmission time and reception time for two carriers in a carrier group.

FIG. 2 shows an example timing arrangement with transmission time and reception time for two carriers. A multicarrier OFDM communication system may include one or more carriers, for example, ranging from 1 to 10 carriers.

Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, radio frame duration is 10 milliseconds (msec). Other frame durations, for example, in the range of 1 to 100 msec may also be supported. In this example, each 10 msec radio frame 201 may be divided into ten equally sized subframes 202. Other subframe durations such as including 0.5 msec, 1 msec, 2 msec, and 5 msec may also be supported. Subframe(s) may include two or more slots (e.g., slots 206 and 207). For the example of FDD, 10 subframes may be available for downlink transmission and 10 subframes may be available for uplink transmissions in each 10 msec interval. Uplink and downlink transmissions may be separated in the frequency domain. A slot may be 7 or 14 OFDM symbols for the same subcarrier spacing of up to 60 kHz with normal CP. A slot may be 14 OFDM symbols for the same subcarrier spacing higher than 60 kHz with normal CP. A slot may include all downlink, all uplink, or a downlink part and an uplink part, and/or alike. Slot aggregation may be supported, for example, data transmission may be scheduled to span one or multiple slots. For example, a mini-slot may start at an OFDM symbol in a subframe. A mini-slot may have a duration of one or more OFDM symbols. Slot(s) may include a plurality of OFDM symbols 203. The number of OFDM symbols 203 in a slot 206 may depend on the cyclic prefix length and subcarrier spacing.

Figure 3:
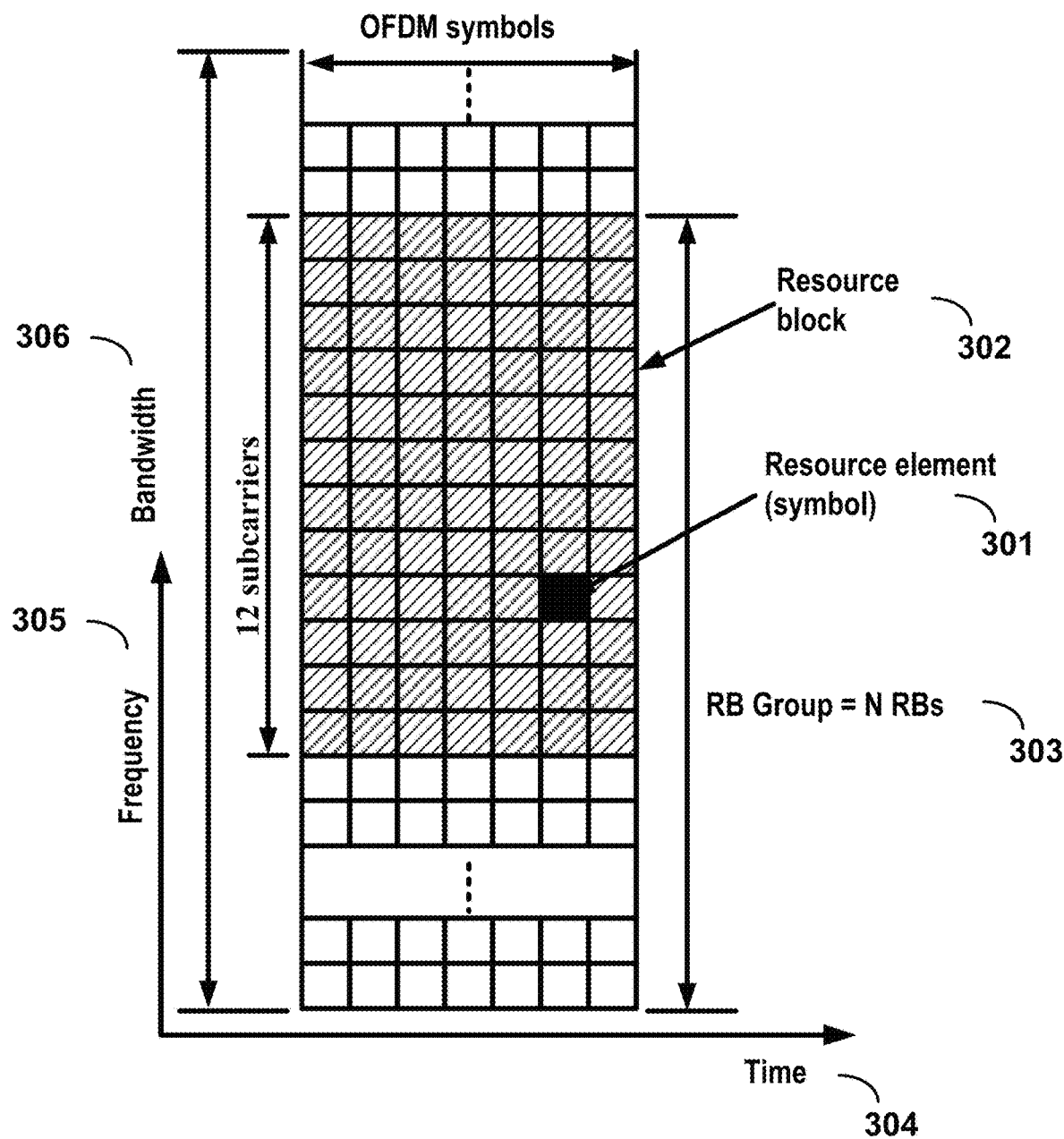
FIG. 3 shows example OFDM radio resources.

FIG. 3 shows an example of OFDM radio resources. The resource grid structure in time 304 and frequency 305 is shown in FIG. 3. The quantity of downlink subcarriers or RBs may depend, at least in part, on the downlink transmission bandwidth 306 configured in the cell. The smallest radio resource unit may be called a resource element (e.g., 301). Resource elements may be grouped into resource blocks (e.g., 302). Resource blocks may be grouped into larger radio resources called Resource Block Groups (RBG) (e.g., 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. A resource block may correspond to one slot in the time domain and 180 kHz in the frequency domain (for 15 kHz subcarrier bandwidth and 12 subcarriers).

Multiple numerologies may be supported. A numerology may be derived by scaling a basic subcarrier spacing by an integer N. Scalable numerology may allow at least from 15 kHz to 480 kHz subcarrier spacing. The numerology with 15 kHz and scaled numerology with different subcarrier spacing with the same CP overhead may align at a symbol boundary every 1 msec in a NR carrier.

Figure 4:
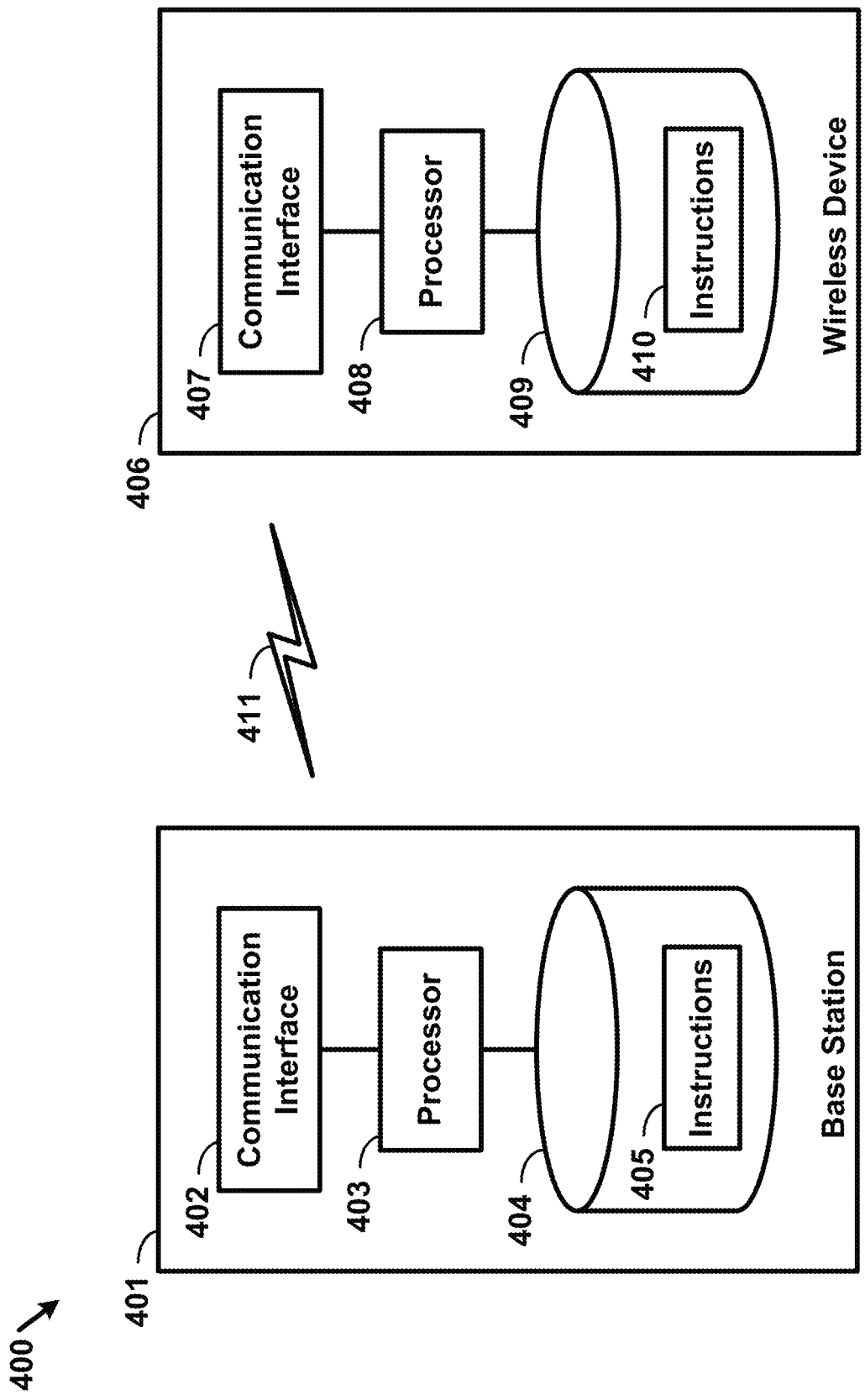
FIG. 4 shows hardware elements of a base station and a wireless device.

FIG. 4 shows hardware elements of a base station 401 and a wireless device 406. A communication network 400 may include at least one base station 401 and at least one wireless device 406. The base station 401 may include at least one communication interface 402, one or more processors 403, and at least one set of program code instructions 405 stored in non-transitory memory 404 and executable by the one or more processors 403. The wireless device 406 may include at least one communication interface 407, one or more processors 408, and at least one set of program code instructions 410 stored in non-transitory memory 409 and executable by the one or more processors 408. A communication interface 402 in the base station 401 may be configured to engage in communication with a communication interface 407 in the wireless device 406, such as via a communication path that includes at least one wireless link 411. The wireless link 411 may be a bi-directional link. The communication interface 407 in the wireless device 406 may also be configured to engage in communication with the communication interface 402 in the base station 401. The base station 401 and the wireless device 406 may be configured to send and receive data over the wireless link 411 using multiple frequency carriers. Base stations, wireless devices, and other communication devices may include structure and operations of transceiver(s). A transceiver is a device that includes both a transmitter and receiver. Transceivers may be employed in devices such as wireless devices, base stations, relay nodes, and/or the like. Examples for radio technology implemented in the communication interfaces 402, 407 and the wireless link 411 are shown in FIG. 1, FIG. 2, FIG. 3, FIG. 5, and associated text. The communication network 400 may comprise any number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network 400, and any other network referenced herein, may comprise an LTE network, a 5G network, or any other network for wireless communications. Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network. As used throughout, the term "base station" may comprise one or more of: a base station, a node, a Node B, a gNB, an eNB, an ng-eNB, a relay node (e.g., an integrated access and backhaul (IAB) node), a donor node (e.g., a donor eNB, a donor gNB, etc.), an access point (e.g., a WiFi access point), a computing device, a device capable of wirelessly communicating, or any other device capable of sending and/or receiving signals. As used throughout, the term "wireless device" may comprise one or more of: a UE, a handset, a mobile device, a computing device, a node, a device capable of wirelessly communicating, or any other device capable of sending and/or receiving signals. Any reference to one or more of these terms/devices also considers use of any other term/device mentioned above.

The communications network 400 may comprise Radio Access Network (RAN) architecture. The RAN architecture may comprise one or more RAN nodes that may be a next generation Node B (gNB) (e.g., 401) providing New Radio (NR) user plane and control plane protocol terminations towards a first wireless device (e.g. 406). A RAN node may be a next generation evolved Node B (ng-eNB), providing Evolved UMTS Terrestrial Radio Access (E-UTRA) user plane and control plane protocol terminations towards a second wireless device. The first wireless device may communicate with a gNB over a Uu interface. The second wireless device may communicate with a ng-eNB over a Uu interface. Base station 401 may comprise one or more of a gNB, ng-eNB, and/or the like.

A gNB or an ng-eNB may host functions such as: radio resource management and scheduling, IP header compression, encryption and integrity protection of data, selection of Access and Mobility Management Function (AMF) at User Equipment (UE) attachment, routing of user plane and control plane data, connection setup and release, scheduling and transmission of paging messages (originated from the AMF), scheduling and transmission of system broadcast information (originated from the AMF or Operation and Maintenance (O&M)), measurement and measurement reporting configuration, transport level packet marking in the uplink, session management, support of network slicing, Quality of Service (QoS) flow management and mapping to data radio bearers, support of wireless devices in RRC_INACTIVE state, distribution function for Non-Access Stratum (NAS) messages, RAN sharing, and dual connectivity or tight interworking between NR and E-UTRA.

One or more gNBs and/or one or more ng-eNBs may be interconnected with each other by means of Xn interface. A gNB or an ng-eNB may be connected by means of NG interfaces to 5G Core Network (5GC). 5GC may comprise one or more AMF/User Plane Function (UPF) functions. A gNB or an ng-eNB may be connected to a UPF by means of an NG-User plane (NG-U) interface. The NG-U interface may provide delivery (e.g., non-guaranteed delivery) of user plane Protocol Data Units (PDUs) between a RAN node and the UPF. A gNB or an ng-eNB may be connected to an AMF by means of an NG-Control plane (e.g., NG-C) interface. The NG-C interface may provide functions such as NG interface management, UE context management, UE mobility management, transport of NAS messages, paging, PDU session management, configuration transfer or warning message transmission.

A UPF may host functions such as anchor point for intra-/inter-Radio Access Technology (RAT) mobility (if applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, QoS handling for user plane, for example, packet filtering, gating, Uplink (UL)/Downlink (DL) rate enforcement, uplink traffic verification (e.g. Service Data Flow (SDF) to QoS flow mapping), downlink packet buffering and/or downlink data notification triggering.

An AMF may host functions such as NAS signaling termination, NAS signaling security, Access Stratum (AS) security control, inter Core Network (CN) node signaling for mobility between $3^{rd}$ Generation Partnership Project (3GPP) access networks, idle mode UE reachability (e.g., control and execution of paging retransmission), registration area management, support of intra-system and inter-system mobility, access authentication, access authorization including check of roaming rights, mobility management control (subscription and policies), support of network slicing and/or Session Management Function (SMF) selection An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or a non-operational state. Configured may also refer to specific settings in a device that effect the operational characteristics of the device whether the device is in an operational or a non-operational state. In other words, the hardware, software, firmware, registers, memory values, and/or the like may be "configured" within a device, whether the device is in an operational or a nonoperational state, to provide the device with specific characteristics. Terms such as "a control message to cause in a device" may mean that a control message has parameters that may be used to configure specific characteristics in the device, whether the device is in an operational or a non-operational state.

A network may include a multitude of base stations, providing a user plane NR PDCP/NR RLC/NR MAC/NR PHY and control plane (e.g., NR RRC) protocol terminations towards the wireless device. The base station(s) may be interconnected with other base station(s) (e.g., employing an Xn interface). The base stations may also be connected employing, for example, an NG interface to an NGC. FIG. 10A and FIG. 10B show examples for interfaces between a 5G core network (e.g., NGC) and base stations (e.g., gNB and eLTE eNB). For example, the base stations may be interconnected to the NGC control plane (e.g., NG CP) employing the NG-C interface and to the NGC user plane (e.g., UPGW) employing the NG-U interface. The NG interface may support a many-to-many relation between 5G core networks and base stations.

A base station may include many sectors, for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g., TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC); in the uplink, the carrier corresponding to the PCell may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC); in the uplink, the carrier corresponding to an SCell may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or cell index may also identify the downlink carrier or uplink carrier of the cell (depending on the context in which it is used). The cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, reference to a first physical cell ID for a first downlink carrier may indicate that the first physical cell ID is for a cell comprising the first downlink carrier. The same concept may apply to, for example, carrier activation. Reference to a first carrier that is activated may indicate that the cell comprising the first carrier is activated.

A device may be configured to operate as needed by freely combining any of the examples. The disclosed mechanisms may be performed if certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. One or more criteria may be satisfied. It may be possible to implement examples that selectively implement disclosed protocols.

A base station may communicate with a variety of wireless devices. Wireless devices may support multiple technologies, and/or multiple releases of the same technology. Wireless devices may have some specific capability(ies) depending on its wireless device category and/or capability(ies). A base station may comprise multiple sectors. Reference to a base station communicating with a plurality of wireless devices may indicate that a base station may communicate with a subset of the total wireless devices in a coverage area. A plurality of wireless devices of a given LTE or 5G release, with a given capability and in a given sector of the base station, may be used. The plurality of wireless devices may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE or 5G technology.

A base station may transmit (e.g., to a wireless device) one or more messages (e.g. RRC messages) that may comprise a plurality of configuration parameters for one or more cells. One or more cells may comprise at least one primary cell and at least one secondary cell. An RRC message may be broadcasted or unicasted to the wireless device. Configuration parameters may comprise common parameters and dedicated parameters.

Services and/or functions of an RRC sublayer may comprise at least one of: broadcast of system information related to AS and NAS; paging initiated by 5GC and/or NG-RAN; establishment, maintenance, and/or release of an RRC connection between a wireless device and NG-RAN, which may comprise at least one of addition, modification and release of carrier aggregation; or addition, modification, and/or release of dual connectivity in NR or between E-UTRA and NR. Services and/or functions of an RRC sublayer may further comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g. intra NR mobility or inter-RAT mobility) and a context transfer; or a wireless device cell selection and reselection and control of cell selection and reselection. Services and/or functions of an RRC sublayer may further comprise at least one of QoS management functions; a wireless device measurement configuration/reporting; detection of and/or recovery from radio link failure; or NAS message transfer to/from a core network entity (e.g. AMF, Mobility Management Entity (MME)) from/to the wireless device.

An RRC sublayer may support an RRC_Idle state, an RRC_Inactive state and/or an RRC_Connected state for a wireless device. In an RRC_Idle state, a wireless device may perform at least one of: Public Land Mobile Network (PLMN) selection; receiving broadcasted system information; cell selection/re-selection; monitoring/receiving a paging for mobile terminated data initiated by 5GC; paging for mobile terminated data area managed by 5GC; or DRx for CN paging configured via NAS. In an RRC_Inactive state, a wireless device may perform at least one of: receiving broadcasted system information; cell selection/re-selection; monitoring/receiving a RAN/CN paging initiated by NG-RAN/5GC; RAN-based notification area (RNA) managed by NG-RAN; or DRx for RAN/CN paging configured by NG-RAN/NAS. In an RRC_Idle state of a wireless device, a base station (e.g. NG-RAN) may keep a 5GC-NG-RAN connection (both C/U-planes) for the wireless device; and/or store a UE AS context for the wireless device. In an RRC_Connected state of a wireless device, a base station (e.g. NG-RAN) may perform at least one of: establishment of 5GC-NG-RAN connection (both C/U-planes) for the wireless device; storing a UE AS context for the wireless device; transmit/receive of unicast data to/from the wireless device; or network-controlled mobility based on measurement results received from the wireless device. In an RRC_Connected state of a wireless device, an NG-RAN may know a cell that the wireless device belongs to.

System information (SI) may be divided into minimum SI and other SI. The minimum SI may be periodically broadcast. The minimum SI may comprise basic information required for initial access and information for acquiring any other SI broadcast periodically or provisioned on-demand, e.g. scheduling information. The other SI may either be broadcast, or be provisioned in a dedicated manner, either triggered by a network or upon request from a wireless device. A minimum SI may be transmitted via two different downlink channels using different messages (e.g. MasterInformationBlock and SystemInformationBlockType1). The other SI may be transmitted via SystemInformationBlockType2. For a wireless device in an RRC_Connected state, dedicated RRC signaling may be employed for the request and delivery of the other SI. For the wireless device in the RRC_Idle state and/or the RRC_Inactive state, the request may trigger a random-access procedure.

A wireless device may send its radio access capability information which may be static. A base station may request what capabilities for a wireless device to report based on band information. If allowed by a network, a temporary capability restriction request may be sent by the wireless device to signal the limited availability of some capabilities (e.g. due to hardware sharing, interference or overheating) to the base station. The base station may confirm or reject the request. The temporary capability restriction may be transparent to 5GC (e.g., static capabilities may be stored in 5GC).

If CA is configured, a wireless device may have an RRC connection with a network. At RRC connection establishment/re-establishment/handover procedure, one serving cell may provide NAS mobility information, and at RRC connection re-establishment/handover, one serving cell may provide a security input. This cell may be referred to as the PCell. Depending on the capabilities of the wireless device, SCells may be configured to form together with the PCell a set of serving cells. The configured set of serving cells for the wireless device may comprise one PCell and one or more SCells.

The reconfiguration, addition and removal of SCells may be performed by RRC. At intra-NR handover, RRC may also add, remove, or reconfigure SCells for usage with the target PCell. If adding a new SCell, dedicated RRC signaling may be employed to send all required system information of the SCell. In connected mode, wireless devices may not need to acquire broadcasted system information directly from the SCells.

An RRC connection reconfiguration procedure may be used to modify an RRC connection, (e.g. to establish, modify and/or release RBs, to perform handover, to setup, modify, and/or release measurements, to add, modify, and/or release SCells and cell groups). As part of the RRC connection reconfiguration procedure, NAS dedicated information may be transferred from the network to the wireless device. The RRCConnectionReconfiguration message may be a command to modify an RRC connection. It may convey information for measurement configuration, mobility control, radio resource configuration (e.g. RBs, MAC main configuration and physical channel configuration) comprising any associated dedicated NAS information and security configuration. If the received RRC Connection Reconfiguration message includes the sCellToReleaseList, the wireless device may perform an SCell release. If the received RRC Connection Reconfiguration message includes the sCellToAddModList, the wireless device may perform SCell additions or modification.

An RRC connection establishment (or reestablishment, resume) procedure may be used to establish (or reestablish, resume) an RRC connection. An RRC connection establishment procedure may comprise SRB1 establishment. The RRC connection establishment procedure may be used to transfer the initial NAS dedicated information message from a wireless device to E-UTRAN. The RRCConnectionReestablishment message may be used to re-establish SRB1.

A measurement report procedure may be to transfer measurement results from a wireless device to NG-RAN. The wireless device may initiate a measurement report procedure, for example, after successful security activation. A measurement report message may be employed to transmit measurement results.

FIG. 5A, FIG. 5B, FIG. 5C, and FIG. 5D show examples of architecture for uplink and downlink signal transmission. FIG. 5A shows an example for an uplink physical channel. The baseband signal representing the physical uplink shared channel may be processed according to the following processes, which may be performed by structures described below. These structures and corresponding functions are shown as examples, however, it is anticipated that other structures and/or functions may be implemented in various examples. The structures and corresponding functions may comprise, for example, one or more scrambling devices 501A and 501B configured to perform scrambling of coded bits in each of the codewords to be transmitted on a physical channel; one or more modulation mappers 502A and 502B configured to perform modulation of scrambled bits to generate complex-valued symbols; a layer mapper 503 configured to perform mapping of the complex-valued modulation symbols onto one or several transmission layers; one or more transform precoders 504A and 504B to generate complex-valued symbols; a precoding device 505 configured to perform precoding of the complex-valued symbols; one or more resource element mappers 506A and 506B configured to perform mapping of precoded complex-valued symbols to resource elements; one or more signal generators 507A and 507B configured to perform the generation of a complex-valued time-domain DFTS-OFDM/SC-FDMA signal for each antenna port; and/or the like.

FIG. 5B shows an example for performing modulation and up-conversion to the carrier frequency of the complex-valued DFTS-OFDM/SC-FDMA baseband signal, for example, for each antenna port and/or for the complex-valued physical random access channel (PRACH) baseband signal. For example, the baseband signal, represented as $s_1(t)$, may be split, by a signal splitter 510, into real and imaginary components, $Re\{s_1(t)\}$ and $Im\{s_1(t)\}$, respectively. The real component may be modulated by a modulator 511A, and the imaginary component may be modulated by a modulator 511B. The output signal of the modulator 511A and the output signal of the modulator 511B may be mixed by a mixer 512. The output signal of the mixer 512 may be input to a filtering device 513, and filtering may be employed by the filtering device 513 prior to transmission.

FIG. 5C shows an example structure for downlink transmissions. The baseband signal representing a downlink physical channel may be processed by the following processes, which may be performed by structures described below. These structures and corresponding functions are shown as examples, however, it is anticipated that other structures and/or functions may be implemented in various examples. The structures and corresponding functions may comprise, for example, one or more scrambling devices 531A and 531B configured to perform scrambling of coded bits in each of the codewords to be transmitted on a physical channel; one or more modulation mappers 532A and 532B configured to perform modulation of scrambled bits to generate complex-valued modulation symbols; a layer mapper 533 configured to perform mapping of the complex-valued modulation symbols onto one or several transmission layers; a precoding device 534 configured to perform precoding of the complex-valued modulation symbols on each layer for transmission on the antenna ports; one or more resource element mappers 535A and 535B configured to perform mapping of complex-valued modulation symbols for each antenna port to resource elements; one or more OFDM signal generators 536A and 536B configured to perform the generation of complex-valued time-domain OFDM signal for each antenna port; and/or the like.

FIG. 5D shows an example structure for modulation and up-conversion to the carrier frequency of the complex-valued OFDM baseband signal for each antenna port. For example, the baseband signal, represented as $s_1^{(p)}(t)$, may be split, by a signal splitter 520, into real and imaginary components, $Re\{s_1^{(p)}(t)\}$ and $Im\{s_1^{(p)}(t)\}$, respectively. The real component may be modulated by a modulator 521A, and the imaginary component may be modulated by a modulator 521B. The output signal of the modulator 521A and the output signal of the modulator 521B may be mixed by a mixer 522. The output signal of the mixer 522 may be input to a filtering device 523, and filtering may be employed by the filtering device 523 prior to transmission.

Figure 6:
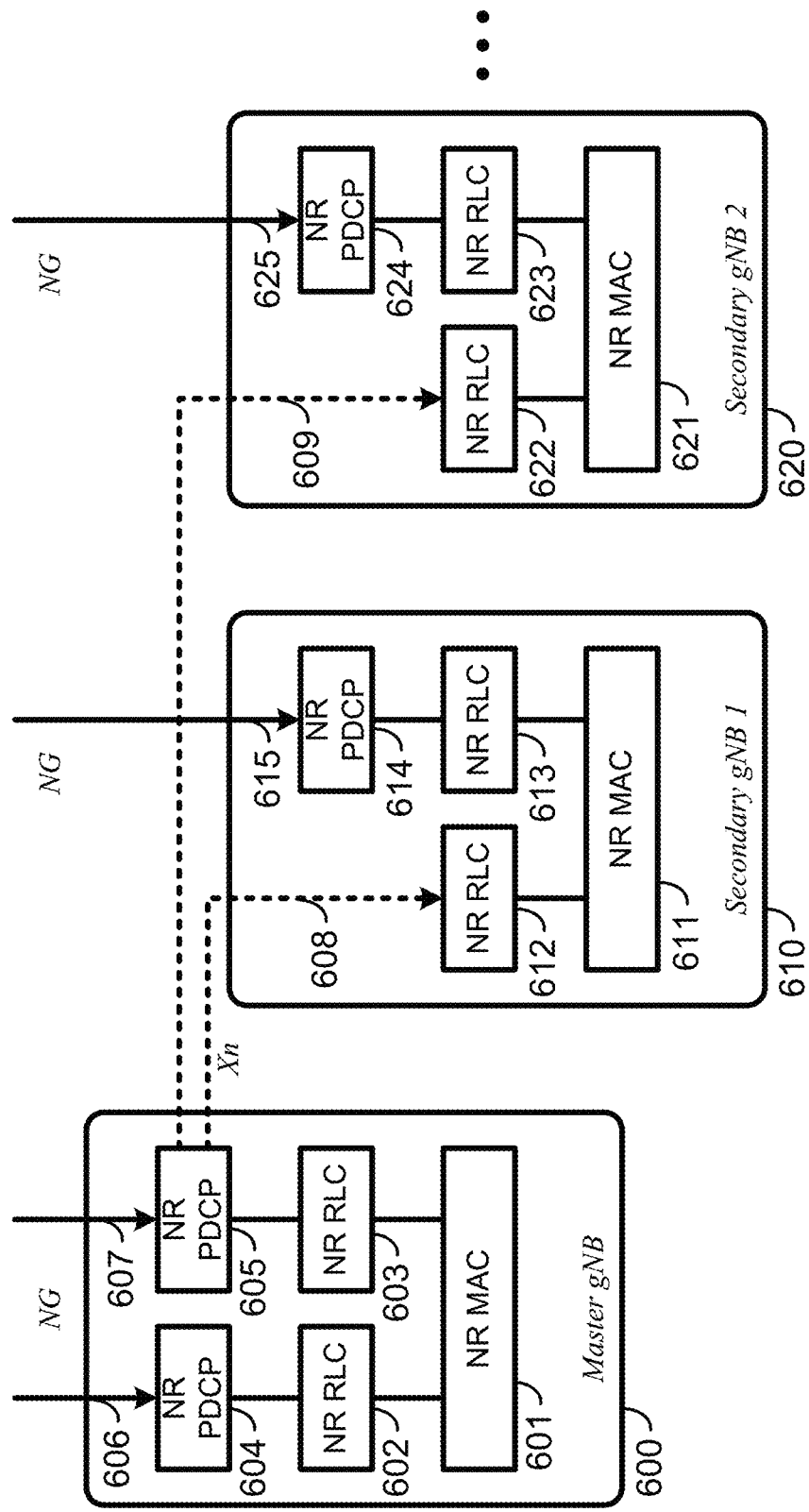
FIG. 6 shows an example protocol structure with multi-connectivity.
Figure 7:
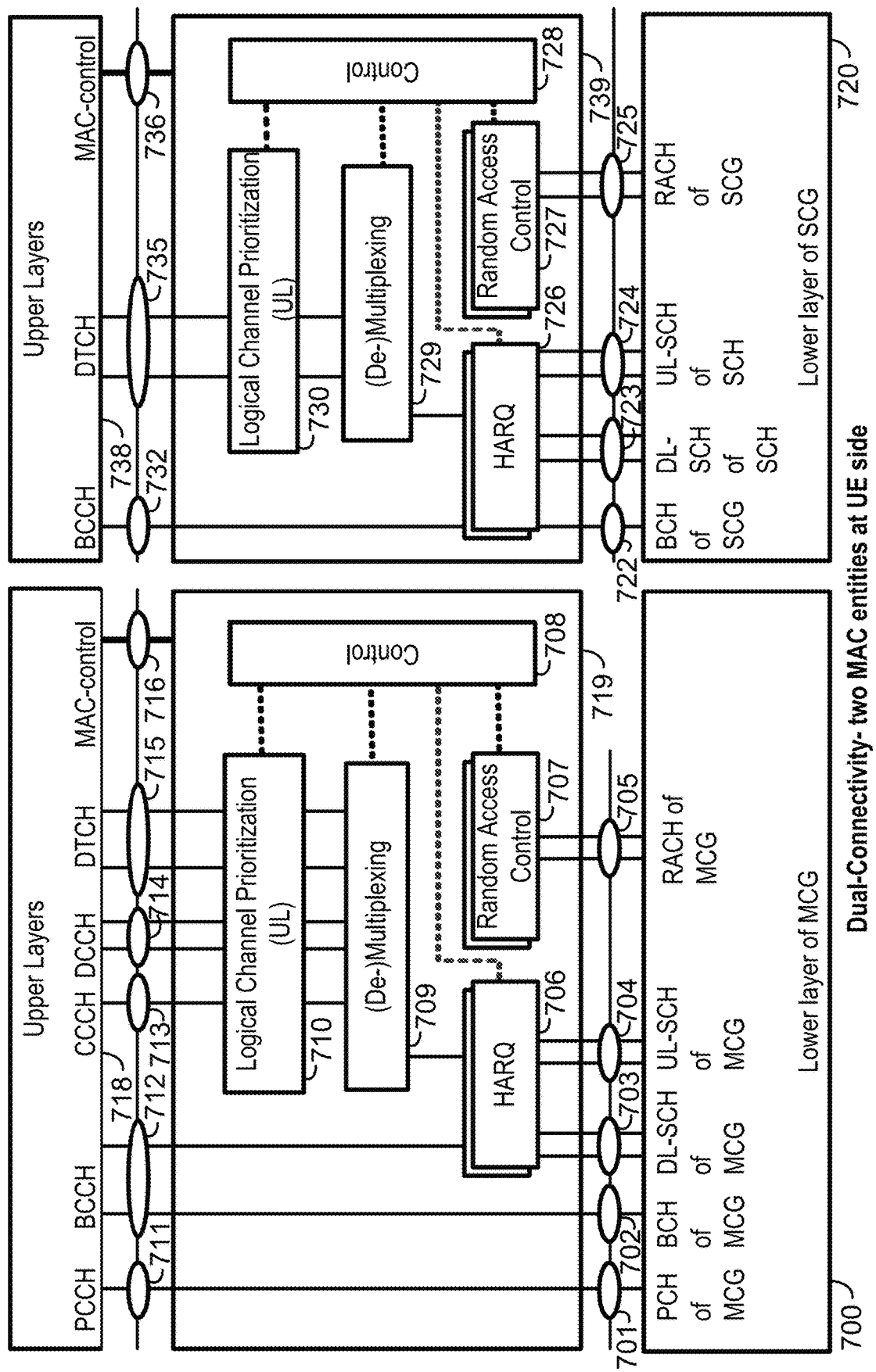
FIG. 7 shows an example protocol structure with carrier aggregation (CA) and dual connectivity (DC).

FIG. 6 and FIG. 7 show examples for protocol structures with CA and multi-connectivity. NR may support multi-connectivity operation, whereby a multiple receiver/transmitter (Rx/Tx) wireless device in RRC_CONNECTED may be configured to utilize radio resources provided by multiple schedulers located in multiple gNBs connected via a non-ideal or ideal backhaul over the Xn interface. gNBs involved in multi-connectivity for a certain wireless device may assume two different roles: a gNB may either act as a master gNB (e.g., 600) or as a secondary gNB (e.g., 610 or 620). In multi-connectivity, a wireless device may be connected to one master gNB (e.g., 600) and one or more secondary gNBs (e.g., 610 and/or 620). Any one or more of the Master gNB 600 and/or the secondary gNBs 610 and 620 may be a Next Generation (NG) NodeB. The master gNB 600 may comprise protocol layers NR MAC 601, NR RLC 602 and 603, and NR PDCP 604 and 605. The secondary gNB may comprise protocol layers NR MAC 611, NR RLC 612 and 613, and NR PDCP 614. The secondary gNB may comprise protocol layers NR MAC 621, NR RLC 622 and 623, and NR PDCP 624. The master gNB 600 may communicate via an interface 606 and/or via an interface 607, the secondary gNB 610 may communicate via an interface 615, and the secondary gNB 620 may communicate via an interface 625. The master gNB 600 may also communicate with the secondary gNB 610 and the secondary gNB 621 via interfaces 608 and 609, respectively, which may include Xn interfaces. For example, the master gNB 600 may communicate via the interface 608, at layer NR PDCP 605, and with the secondary gNB 610 at layer NR RLC 612. The master gNB 600 may communicate via the interface 609, at layer NR PDCP 605, and with the secondary gNB 620 at layer NR RLC 622.

FIG. 7 shows an example structure for the UE side MAC entities, for example, if a Master Cell Group (MCG) and a Secondary Cell Group (SCG) are configured. Media Broadcast Multicast Service (MBMS) reception may be included but is not shown in this figure for simplicity.

In multi-connectivity, the radio protocol architecture that a particular bearer uses may depend on how the bearer is set up. As an example, three alternatives may exist, an MCG bearer, an SCG bearer, and a split bearer, such as shown in FIG. 6. NR RRC may be located in a master gNB and SRBs may be configured as a MCG bearer type and may use the radio resources of the master gNB. Multi-connectivity may have at least one bearer configured to use radio resources provided by the secondary gNB. Multi-connectivity may or may not be configured or implemented.

For multi-connectivity, the wireless device may be configured with multiple NR MAC entities: e.g., one NR MAC entity for a master gNB, and other NR MAC entities for secondary gNBs. In multi-connectivity, the configured set of serving cells for a wireless device may comprise two subsets: e.g., the Master Cell Group (MCG) including the serving cells of the master gNB, and the Secondary Cell Groups (SCGs) including the serving cells of the secondary gNBs.

At least one cell in a SCG may have a configured UL component carrier (CC) and one of the UL CCs, for example, named PSCell (or PCell of SCG, or sometimes called PCell), may be configured with PUCCH resources. If the SCG is configured, there may be at least one SCG bearer or one split bearer. If a physical layer problem or a random access problem on a PSCell occurs or is detected, if the maximum number of NR RLC retransmissions has been reached associated with the SCG, or if an access problem on a PSCell during a SCG addition or a SCG change occurs or is detected, then an RRC connection re-establishment procedure may not be triggered, UL transmissions towards cells of the SCG may be stopped, a master gNB may be informed by the wireless device of a SCG failure type, and for a split bearer the DL data transfer over the master gNB may be maintained. The NR RLC Acknowledge Mode (AM) bearer may be configured for the split bearer. Like the PCell, a PSCell may not be de-activated. The PSCell may be changed with an SCG change (e.g., with a security key change and a RACH procedure). A direct bearer type may change between a split bearer and an SCG bearer, or a simultaneous configuration of an SCG and a split bearer may or may not be supported.

A master gNB and secondary gNBs may interact for multi-connectivity. The master gNB may maintain the RRM measurement configuration of the wireless device, and the master gNB may, (e.g., based on received measurement reports, and/or based on traffic conditions and/or bearer types), decide to ask a secondary gNB to provide additional resources (e.g., serving cells) for a wireless device. If a request from the master gNB is received, a secondary gNB may create a container that may result in the configuration of additional serving cells for the wireless device (or the secondary gNB decide that it has no resource available to do so). For wireless device capability coordination, the master gNB may provide some or all of the Active Set (AS) configuration and the wireless device capabilities to the secondary gNB. The master gNB and the secondary gNB may exchange information about a wireless device configuration, such as by employing NR RRC containers (e.g., inter-node messages) carried in Xn messages. The secondary gNB may initiate a reconfiguration of its existing serving cells (e.g., PUCCH towards the secondary gNB). The secondary gNB may decide which cell is the PSCell within the SCG. The master gNB may or may not change the content of the NR RRC configuration provided by the secondary gNB. In an SCG addition and an SCG SCell addition, the master gNB may provide the latest measurement results for the SCG cell(s). Both a master gNB and a secondary gNBs may know the system frame number (SFN) and subframe offset of each other by operations, administration, and maintenance (OAM) (e.g., for the purpose of discontinuous reception (DRx) alignment and identification of a measurement gap). If adding a new SCG SCell, dedicated NR RRC signaling may be used for sending required system information of the cell for CA, except, for example, for the SFN acquired from an MIB of the PSCell of an SCG.

FIG. 7 shows an example of dual-connectivity (DC) for two MAC entities at a wireless device side. A first MAC entity may comprise a lower layer of an MCG 700, an upper layer of an MCG 718, and one or more intermediate layers of an MCG 719. The lower layer of the MCG 700 may comprise, for example, a paging channel (PCH) 701, a broadcast channel (BCH) 702, a downlink shared channel (DL-SCH) 703, an uplink shared channel (UL-SCH) 704, and a random access channel (RACH) 705. The one or more intermediate layers of the MCG 719 may comprise, for example, one or more hybrid automatic repeat request (HARQ) processes 706, one or more random access control processes 707, multiplexing and/or de-multiplexing processes 709, logical channel prioritization on the uplink processes 710, and a control processes 708 providing control for the above processes in the one or more intermediate layers of the MCG 719. The upper layer of the MCG 718 may comprise, for example, a paging control channel (PCCH) 711, a broadcast control channel (BCCH) 712, a common control channel (CCCH) 713, a dedicated control channel (DCCH) 714, a dedicated traffic channel (DTCH) 715, and a MAC control 716.

A second MAC entity may comprise a lower layer of an SCG 720, an upper layer of an SCG 738, and one or more intermediate layers of an SCG 739. The lower layer of the SCG 720 may comprise, for example, a BCH 722, a DL-SCH 723, an UL-SCH 724, and a RACH 725. The one or more intermediate layers of the SCG 739 may comprise, for example, one or more HARQ processes 726, one or more random access control processes 727, multiplexing and/or de-multiplexing processes 729, logical channel prioritization on the uplink processes 730, and a control processes 728 providing control for the above processes in the one or more intermediate layers of the SCG 739. The upper layer of the SCG 738 may comprise, for example, a BCCH 732, a DCCH 714, a DTCH 735, and a MAC control 736.

Serving cells may be grouped in a TA group (TAG). Serving cells in one TAG may use the same timing reference. For a given TAG, a wireless device may use at least one downlink carrier as a timing reference. For a given TAG, a wireless device may synchronize uplink subframe and frame transmission timing of uplink carriers belonging to the same TAG. Serving cells having an uplink to which the same TA applies may correspond to serving cells hosted by the same receiver. A wireless device supporting multiple TAs may support two or more TA groups. One TA group may include the PCell and may be called a primary TAG (pTAG). In a multiple TAG configuration, at least one TA group may not include the PCell and may be called a secondary TAG (sTAG). Carriers within the same TA group may use the same TA value and/or the same timing reference. If DC is configured, cells belonging to a cell group (e.g., MCG or SCG) may be grouped into multiple TAGs including a pTAG and one or more sTAGs.

FIG. 8 shows example TAG configurations. In Example 1, a pTAG comprises a PCell, and an sTAG comprises an SCell1. In Example 2, a pTAG comprises a PCell and an SCell1, and an sTAG comprises an SCell2 and an SCell3. In Example 3, a pTAG comprises a PCell and an SCell1, and an sTAG1 comprises an SCell2 and an SCell3, and an sTAG2 comprises a SCell4. Up to four TAGs may be supported in a cell group (MCG or SCG), and other example TAG configurations may also be provided. In various examples, structures and operations are described for use with a pTAG and an sTAG. Some of the examples may be used for configurations with multiple sTAGs.

An eNB may initiate an RA procedure, via a PDCCH order, for an activated SCell. The PDCCH order may be sent on a scheduling cell of this SCell. If cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
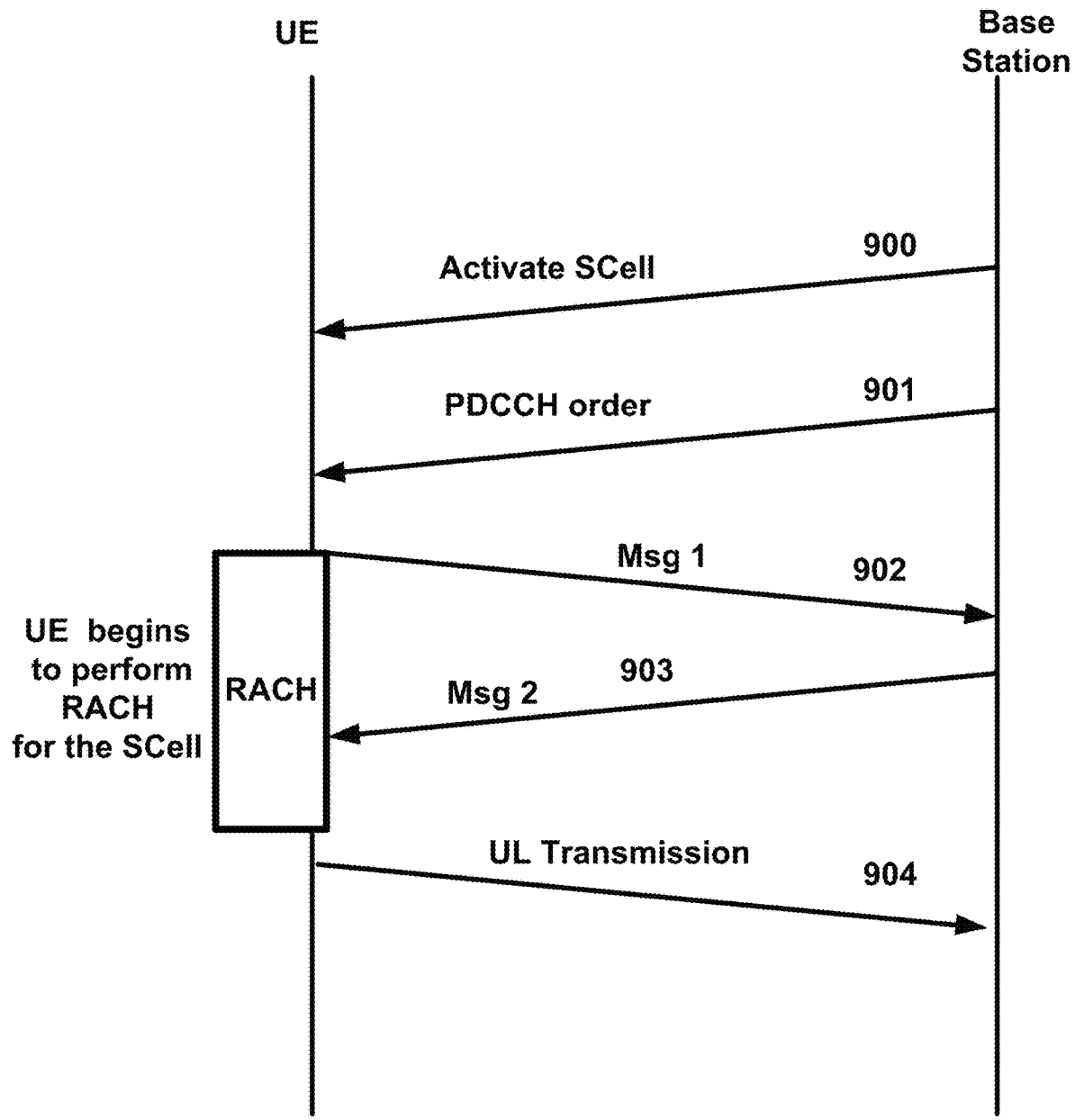
FIG. 9 shows example message flow in a random access process in a secondary TAG.

FIG. 9 shows an example of random access processes, and a corresponding message flow, in a secondary TAG. A base station, such as an eNB, may transmit an activation command 900 to a wireless device, such as a UE. The activation command 900 may be transmitted to activate an SCell. The base station may also transmit a PDDCH order 901 to the wireless device, which may be transmitted, for example, after the activation command 900. The wireless device may begin to perform a RACH process for the SCell, which may be initiated, for example, after receiving the PDDCH order 901. A wireless device may transmit to the base station (e.g., as part of a RACH process) a preamble 902 (e.g., Msg1), such as a random access preamble (RAP). The preamble 902 may be transmitted after or based on the PDCCH order 901. The wireless device may transmit the preamble 902 via an SCell belonging to an sTAG. Preamble transmission for SCells may be controlled by a network using PDCCH format 1A. The base station may send a random access response (RAR) 903 (e.g., Msg2 message) to the wireless device. The RAR 903 may be after or based on the preamble 902 transmission via the SCell. The RAR 903 may be addressed to a random access radio network temporary identifier (RA-RNTI) in a PCell common search space (CSS). If the wireless device receives the RAR 903, the RACH process may conclude. The RACH process may conclude, for example, after or based on the wireless device receiving the RAR 903 from the base station. After the RACH process, the wireless device may transmit an uplink transmission 904. The uplink transmission 904 may comprise uplink packets transmitted via the same SCell used for the preamble 902 transmission.

Timing alignment (e.g., initial timing alignment) for communications between the wireless device and the base station may be performed through a random access procedure, such as described above regarding FIG. 9. The random access procedure may involve a wireless device, such as a UE, transmitting a random access preamble and a base station, such as an eNB, responding with an initial TA command NTA (amount of timing advance) within a random access response window. The start of the random access preamble may be aligned with the start of a corresponding uplink subframe at the wireless device assuming NTA=0. The eNB may estimate the uplink timing from the random access preamble transmitted by the wireless device. The TA command may be derived by the eNB based on the estimation of the difference between the desired UL timing and the actual UL timing. The wireless device may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. If an eNB performs an SCell addition configuration, the related TAG configuration may be configured for the SCell. An eNB may modify the TAG configuration of an SCell by removing (e.g., releasing) the SCell and adding (e.g., configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In some examples, it may not be possible to change the TAG associated with an SCell, but rather, the SCell may need to be removed and a new SCell may need to be added with another TAG. For example, if there is a need to move an SCell from an sTAG to a pTAG, at least one RRC message, such as at least one RRC reconfiguration message, may be sent to the wireless device. The at least one RRC message may be sent to the wireless device to reconfigure TAG configurations, for example, by releasing the SCell and configuring the SCell as a part of the pTAG. If, for example, an SCell is added or configured without a TAG index, the SCell may be explicitly assigned to the pTAG. The PCell may not change its TA group and may be a member of the pTAG.

In LTE Release-10 and Release-11 CA, a PUCCH transmission is only transmitted on a PCell (e.g., a PSCell) to an eNB. In LTE-Release 12 and earlier, a wireless device may transmit PUCCH information on one cell (e.g., a PCell or a PSCell) to a given eNB. As the number of CA capable wireless devices increase, and as the number of aggregated carriers increase, the number of PUCCHs and the PUCCH payload size may increase. Accommodating the PUCCH transmissions on the PCell may lead to a high PUCCH load on the PCell. A PUCCH on an SCell may be used to offload the PUCCH resource from the PCell. More than one PUCCH may be configured. For example, a PUCCH on a PCell may be configured and another PUCCH on an SCell may be configured. One, two, or more cells may be configured with PUCCH resources for transmitting CSI, acknowledgment (ACK), and/or non-acknowledgment (NACK) to a base station. Cells may be grouped into multiple PUCCH groups, and one or more cell within a group may be configured with a PUCCH. In some examples, one SCell may belong to one PUCCH group. SCells with a configured PUCCH transmitted to a base station may be called a PUCCH SCell, and a cell group with a common PUCCH resource transmitted to the same base station may be called a PUCCH group.

A MAC entity may have a configurable timer, for example, timeAlignmentTimer, per TAG. The timeAlignmentTimer may be used to control how long the MAC entity considers the serving cells belonging to the associated TAG to be uplink time aligned. If a Timing Advance Command MAC control element is received, the MAC entity may apply the Timing Advance Command for the indicated TAG; and/or the MAC entity may start or restart the timeAlignmentTimer associated with a TAG that may be indicated by the Timing Advance Command MAC control element. If a Timing Advance Command is received in a Random Access Response message for a serving cell belonging to a TAG, the MAC entity may apply the Timing Advance Command for this TAG and/or start or restart the timeAlignmentTimer associated with this TAG. Additionally or alternatively, if the Random Access Preamble is not selected by the MAC entity, the MAC entity may apply the Timing Advance Command for this TAG and/or start or restart the timeAlignmentTimer associated with this TAG. If the timeAlignmentTimer associated with this TAG is not running, the Timing Advance Command for this TAG may be applied, and the timeAlignmentTimer associated with this TAG may be started. If the contention resolution is not successful, a timeAlignmentTimer associated with this TAG may be stopped. If the contention resolution is successful, the MAC entity may ignore the received Timing Advance Command. The MAC entity may determine whether the contention resolution is successful or whether the contention resolution is not successful.

FIG. 10A and FIG. 10B show examples for interfaces between a 5G core network (e.g., NGC) and base stations (e.g., gNB and eLTE eNB). A base station, such as a gNB 1020, may be interconnected to an NGC 1010 control plane employing an NG-C interface. The base station, for example, the gNB 1020, may also be interconnected to an NGC 1010 user plane (e.g., UPGW) employing an NG-U interface. As another example, a base station, such as an eLTE eNB 1040, may be interconnected to an NGC 1030 control plane employing an NG-C interface. The base station, for example, the eLTE eNB 1040, may also be interconnected to an NGC 1030 user plane (e.g., UPGW) employing an NG-U interface. An NG interface may support a many-to-many relation between 5G core networks and base stations.

FIG. 11A, FIG. 11B, FIG. 11C, FIG. 11D, FIG. 11E, and FIG. 11F are examples for architectures of tight interworking between a 5G RAN and an LTE RAN. The tight interworking may enable a multiple receiver/transmitter (Rx/Tx) wireless device in an RRC_CONNECTED state to be configured to utilize radio resources provided by two schedulers located in two base stations (e.g., an eLTE eNB and a gNB). The two base stations may be connected via a non-ideal or ideal backhaul over the Xx interface between an LTE eNB and a gNB, or over the Xn interface between an eLTE eNB and a gNB. Base stations involved in tight interworking for a certain wireless device may assume different roles. For example, a base station may act as a master base station or a base station may act as a secondary base station. In tight interworking, a wireless device may be connected to both a master base station and a secondary base station. Mechanisms implemented in tight interworking may be extended to cover more than two base stations.

A master base station may be an LTE eNB 1102A or an LTE eNB 1102B, which may be connected to EPC nodes 1101A or 1101B, respectively. This connection to EPC nodes may be, for example, to an MME via the S1-C interface and/or to an S-GW via the S1-U interface. A secondary base station may be a gNB 1103A or a gNB 1103B, either or both of which may be a non-standalone node having a control plane connection via an Xx-C interface to an LTE eNB (e.g., the LTE eNB 1102A or the LTE eNB 1102B). In the tight interworking architecture of FIG. 11A, a user plane for a gNB (e.g., the gNB 1103A) may be connected to an S-GW (e.g., the EPC 1101A) through an LTE eNB (e.g., the LTE eNB 1102A), via an Xx-U interface between the LTE eNB and the gNB, and via an S1-U interface between the LTE eNB and the S-GW. In the architecture of FIG. 11B, a user plane for a gNB (e.g., the gNB 1103B) may be connected directly to an S-GW (e.g., the EPC 1101B) via an S1-U interface between the gNB and the S-GW.

A master base station may be a gNB 1103C or a gNB 1103D, which may be connected to NGC nodes 1101C or 1101D, respectively. This connection to NGC nodes may be, for example, to a control plane core node via the NG-C interface and/or to a user plane core node via the NG-U interface. A secondary base station may be an eLTE eNB 1102C or an eLTE eNB 1102D, either or both of which may be a non-standalone node having a control plane connection via an Xn-C interface to a gNB (e.g., the gNB 1103C or the gNB 1103D). In the tight interworking architecture of FIG. 11C, a user plane for an eLTE eNB (e.g., the eLTE eNB 1102C) may be connected to a user plane core node (e.g., the NGC 1101C) through a gNB (e.g., the gNB 1103C), via an Xn-U interface between the eLTE eNB and the gNB, and via an NG-U interface between the gNB and the user plane core node. In the architecture of FIG. 11D, a user plane for an eLTE eNB (e.g., the eLTE eNB 1102D) may be connected directly to a user plane core node (e.g., the NGC 1101D) via an NG-U interface between the eLTE eNB and the user plane core node.

A master base station may be an eLTE eNB 1102E or an eLTE eNB 1102F, which may be connected to NGC nodes 1101E or 1101F, respectively. This connection to NGC nodes may be, for example, to a control plane core node via the NG-C interface and/or to a user plane core node via the NG-U interface. A secondary base station may be a gNB 1103E or a gNB 1103F, either or both of which may be a non-standalone node having a control plane connection via an Xn-C interface to an eLTE eNB (e.g., the eLTE eNB 1102E or the eLTE eNB 1102F). In the tight interworking architecture of FIG. 11E, a user plane for a gNB (e.g., the gNB 1103E) may be connected to a user plane core node (e.g., the NGC 1101E) through an eLTE eNB (e.g., the eLTE eNB 1102E), via an Xn-U interface between the eLTE eNB and the gNB, and via an NG-U interface between the eLTE eNB and the user plane core node. In the architecture of FIG. 11F, a user plane for a gNB (e.g., the gNB 1103F) may be connected directly to a user plane core node (e.g., the NGC 1101F) via an NG-U interface between the gNB and the user plane core node.

FIG. 12A, FIG. 12B, and FIG. 12C are examples for radio protocol structures of tight interworking bearers.

An LTE eNB 1201A may be an S1 master base station, and a gNB 1210A may be an S1 secondary base station. An example for a radio protocol architecture for a split bearer and an SCG bearer is shown. The LTE eNB 1201A may be connected to an EPC with a non-standalone gNB 1210A, via an Xx interface between the PDCP 1206A and an NR RLC 1212A. The LTE eNB 1201A may include protocol layers MAC 1202A, RLC 1203A and RLC 1204A, and PDCP 1205A and PDCP 1206A. An MCG bearer type may interface with the PDCP 1205A, and a split bearer type may interface with the PDCP 1206A. The gNB 1210A may include protocol layers NR MAC 1211A, NR RLC 1212A and NR RLC 1213A, and NR PDCP 1214A. An SCG bearer type may interface with the NR PDCP 1214A.

A gNB 1201B may be an NG master base station, and an eLTE eNB 1210B may be an NG secondary base station. An example for a radio protocol architecture for a split bearer and an SCG bearer is shown. The gNB 1201B may be connected to an NGC with a non-standalone eLTE eNB 1210B, via an Xn interface between the NR PDCP 1206B and an RLC 1212B. The gNB 1201B may include protocol layers NR MAC 1202B, NR RLC 1203B and NR RLC 1204B, and NR PDCP 1205B and NR PDCP 1206B. An MCG bearer type may interface with the NR PDCP 1205B, and a split bearer type may interface with the NR PDCP 1206B. The eLTE eNB 1210B may include protocol layers MAC 1211B, RLC 1212B and RLC 1213B, and PDCP 1214B. An SCG bearer type may interface with the PDCP 1214B.

An eLTE eNB 1201C may be an NG master base station, and a gNB 1210C may be an NG secondary base station. An example for a radio protocol architecture for a split bearer and an SCG bearer is shown. The eLTE eNB 1201C may be connected to an NGC with a non-standalone gNB 1210C, via an Xn interface between the PDCP 1206C and an NR RLC 1212C. The eLTE eNB 1201C may include protocol layers MAC 1202C, RLC 1203C and RLC 1204C, and PDCP 1205C and PDCP 1206C. An MCG bearer type may interface with the PDCP 1205C, and a split bearer type may interface with the PDCP 1206C. The gNB 1210C may include protocol layers NR MAC 1211C, NR RLC 1212C and NR RLC 1213C, and NR PDCP 1214C. An SCG bearer type may interface with the NR PDCP 1214C.

In a 5G network, the radio protocol architecture that a particular bearer uses may depend on how the bearer is setup. At least three alternatives may exist, for example, an MCG bearer, an SCG bearer, and a split bearer, such as shown in FIG. 12A, FIG. 12B, and FIG. 12C. The NR RRC may be located in a master base station, and the SRBs may be configured as an MCG bearer type and may use the radio resources of the master base station. Tight interworking may have at least one bearer configured to use radio resources provided by the secondary base station. Tight interworking may or may not be configured or implemented.

The wireless device may be configured with two MAC entities: e.g., one MAC entity for a master base station, and one MAC entity for a secondary base station. In tight interworking, the configured set of serving cells for a wireless device may comprise of two subsets: e.g., the Master Cell Group (MCG) including the serving cells of the master base station, and the Secondary Cell Group (SCG) including the serving cells of the secondary base station.

At least one cell in a SCG may have a configured UL CC and one of them, for example, a PSCell (or the PCell of the SCG, which may also be called a PCell), is configured with PUCCH resources. If the SCG is configured, there may be at least one SCG bearer or one split bearer. If one or more of a physical layer problem or a random access problem is detected on a PSCell, if the maximum number of (NR) RLC retransmissions associated with the SCG has been reached, and/or if an access problem on a PSCell during an SCG addition or during an SCG change is detected, then: an RRC connection re-establishment procedure may not be triggered, UL transmissions towards cells of the SCG may be stopped, a master base station may be informed by the wireless device of a SCG failure type, and/or for a split bearer the DL data transfer over the master base station may be maintained. The RLC AM bearer may be configured for the split bearer. Like the PCell, a PSCell may not be de-activated. A PSCell may be changed with an SCG change, for example, with security key change and a RACH procedure. A direct bearer type change, between a split bearer and an SCG bearer, may not be supported. Simultaneous configuration of an SCG and a split bearer may not be supported.

A master base station and a secondary base station may interact. The master base station may maintain the RRM measurement configuration of the wireless device. The master base station may determine to ask a secondary base station to provide additional resources (e.g., serving cells) for a wireless device. This determination may be based on, for example, received measurement reports, traffic conditions, and/or bearer types. If a request from the master base station is received, a secondary base station may create a container that may result in the configuration of additional serving cells for the wireless device, or the secondary base station may determine that it has no resource available to do so. The master base station may provide at least part of the AS configuration and the wireless device capabilities to the secondary base station, for example, for wireless device capability coordination. The master base station and the secondary base station may exchange information about a wireless device configuration such as by using RRC containers (e.g., inter-node messages) carried in Xn or Xx messages. The secondary base station may initiate a reconfiguration of its existing serving cells (e.g., PUCCH towards the secondary base station). The secondary base station may determine which cell is the PSCell within the SCG. The master base station may not change the content of the RRC configuration provided by the secondary base station. If an SCG is added and/or an SCG SCell is added, the master base station may provide the latest measurement results for the SCG cell(s). Either or both of a master base station and a secondary base station may know the SFN and subframe offset of each other by OAM, (e.g., for the purpose of DRx alignment and identification of a measurement gap). If a new SCG SCell is added, dedicated RRC signaling may be used for sending required system information of the cell, such as for CA, except, for example, for the SFN acquired from an MIB of the PSCell of an SCG.

FIG. 13A and FIG. 13B show examples for gNB deployment. A core 1301 and a core 1310 may interface with other nodes via RAN-CN interfaces. In a non-centralized deployment example, the full protocol stack (e.g., NR RRC, NR PDCP, NR RLC, NR MAC, and NR PHY) may be supported at one node, such as a gNB 1302, a gNB 1303, and/or an eLTE eNB or LTE eNB 1304. These nodes (e.g., the gNB 1302, the gNB 1303, and the eLTE eNB or LTE eNB 1304) may interface with one of more of each other via a respective inter-BS interface. In a centralized deployment example, upper layers of a gNB may be located in a Central Unit (CU) 1311, and lower layers of the gNB may be located in Distributed Units (DU) 1312, 1313, and 1314. The CU-DU interface (e.g., Fs interface) connecting CU 1311 and DUs 1312, 1312, and 1314 may be ideal or non-ideal. The Fs-C may provide a control plane connection over the Fs interface, and the Fs-U may provide a user plane connection over the Fs interface. In the centralized deployment, different functional split options between the CU 1311 and the DUs 1312, 1313, and 1314 may be possible by locating different protocol layers (e.g., RAN functions) in the CU 1311 and in the DU 1312, 1313, and 1314. The functional split may support flexibility to move the RAN functions between the CU 1311 and the DUs 1312, 1313, and 1314 depending on service requirements and/or network environments. The functional split option may change during operation (e.g., after the Fs interface setup procedure), or the functional split option may change only in the Fs setup procedure (e.g., the functional split option may be static during operation after Fs setup procedure).

Figure 14:
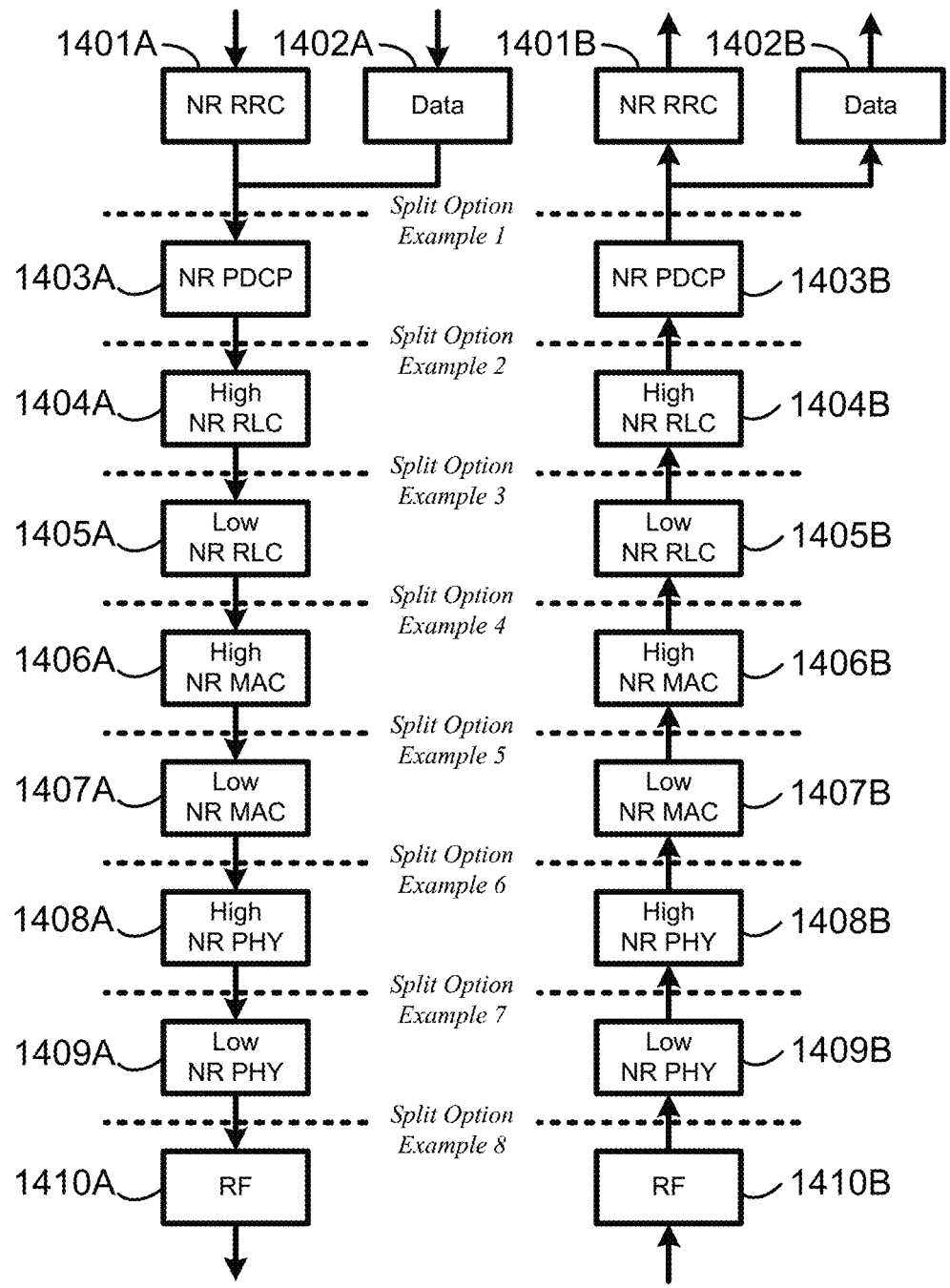
FIG. 14 shows functional split option examples of a centralized gNB deployment.

FIG. 14 shows examples for different functional split options of a centralized gNB deployment. Element numerals that are followed by "A" or "B" designations in FIG. 14 may represent the same elements in different traffic flows, for example, either receiving data (e.g., data 1402A) or sending data (e.g., 1402B). In the split option example 1, an NR RRC 1401 may be in a CU, and an NR PDCP 1403, an NR RLC (e.g., comprising a High NR RLC 1404 and/or a Low NR RLC 1405), an NR MAC (e.g., comprising a High NR MAC 1406 and/or a Low NR MAC 1407), an NR PHY (e.g., comprising a High NR PHY 1408 and/or a LOW NR PHY 1409), and an RF 1410 may be in a DU. In the split option example 2, the NR RRC 1401 and the NR PDCP 1403 may be in a CU, and the NR RLC, the NR MAC, the NR PHY, and the RF 1410 may be in a DU. In the split option example 3, the NR RRC 1401, the NR PDCP 1403, and a partial function of the NR RLC (e.g., the High NR RLC 1404) may be in a CU, and the other partial function of the NR RLC (e.g., the Low NR RLC 1405), the NR MAC, the NR PHY, and the RF 1410 may be in a DU. In the split option example 4, the NR RRC 1401, the NR PDCP 1403, and the NR RLC may be in a CU, and the NR MAC, the NR PHY, and the RF 1410 may be in a DU. In the split option example 5, the NR RRC 1401, the NR PDCP 1403, the NR RLC, and a partial function of the NR MAC (e.g., the High NR MAC 1406) may be in a CU, and the other partial function of the NR MAC (e.g., the Low NR MAC 1407), the NR PHY, and the RF 1410 may be in a DU. In the split option example 6, the NR RRC 1401, the NR PDCP 1403, the NR RLC, and the NR MAC may be in CU, and the NR PHY and the RF 1410 may be in a DU. In the split option example 7, the NR RRC 1401, the NR PDCP 1403, the NR RLC, the NR MAC, and a partial function of the NR PHY (e.g., the High NR PHY 1408) may be in a CU, and the other partial function of the NR PHY (e.g., the Low NR PHY 1409) and the RF 1410 may be in a DU. In the split option example 8, the NR RRC 1401, the NR PDCP 1403, the NR RLC, the NR MAC, and the NR PHY may be in a CU, and the RF 1410 may be in a DU.

The functional split may be configured per CU, per DU, per wireless device, per bearer, per slice, and/or with other granularities. In a per CU split, a CU may have a fixed split, and DUs may be configured to match the split option of the CU. In a per DU split, each DU may be configured with a different split, and a CU may provide different split options for different DUs. In a per wireless device split, a gNB (e.g., a CU and a DU) may provide different split options for different wireless devices. In a per bearer split, different split options may be utilized for different bearer types. In a per slice splice, different split options may be applied for different slices.

A new radio access network (new RAN) may support different network slices, which may allow differentiated treatment customized to support different service requirements with end to end scope. The new RAN may provide a differentiated handling of traffic for different network slices that may be pre-configured, and the new RAN may allow a single RAN node to support multiple slices. The new RAN may support selection of a RAN part for a given network slice, for example, by one or more slice ID(s) or NSSAI(s) provided by a wireless device or provided by an NGC (e.g., an NG CP). The slice ID(s) or NSSAI(s) may identify one or more of pre-configured network slices in a PLMN. For an initial attach, a wireless device may provide a slice ID and/or an NSSAI, and a RAN node (e.g., a gNB) may use the slice ID or the NSSAI for routing an initial NAS signaling to an NGC control plane function (e.g., an NG CP). If a wireless device does not provide any slice ID or NSSAI, a RAN node may send a NAS signaling to a default NGC control plane function. For subsequent accesses, the wireless device may provide a temporary ID for a slice identification, which may be assigned by the NGC control plane function, to enable a RAN node to route the NAS message to a relevant NGC control plane function. The new RAN may support resource isolation between slices. If the RAN resource isolation is implemented, shortage of shared resources in one slice does not cause a break in a service level agreement for another slice.

The amount of data traffic carried over networks is expected to increase for many years to come. The number of users and/or devices is increasing and each user/device accesses an increasing number and variety of services, for example, video delivery, large files, and images. This requires not only high capacity in the network, but also provisioning very high data rates to meet customers' expectations on interactivity and responsiveness. More spectrum may be required for network operators to meet the increasing demand Considering user expectations of high data rates along with seamless mobility, it is beneficial that more spectrum be made available for deploying macro cells as well as small cells for communication systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, if present, may be an effective complement to licensed spectrum for network operators, for example, to help address the traffic explosion in some examples, such as hotspot areas. Licensed Assisted Access (LAA) offers an alternative for operators to make use of unlicensed spectrum, for example, if managing one radio network, offering new possibilities for optimizing the network's efficiency.

Listen-before-talk (clear channel assessment) may be implemented for transmission in an LAA cell. In a listen-before-talk (LBT) procedure, equipment may apply a clear channel assessment (CCA) check before using the channel. For example, the CCA may utilize at least energy detection to determine the presence or absence of other signals on a channel to determine if a channel is occupied or clear, respectively. For example, European and Japanese regulations mandate the usage of LBT in the unlicensed bands. Apart from regulatory requirements, carrier sensing via LBT may be one way for fair sharing of the unlicensed spectrum.

Discontinuous transmission on an unlicensed carrier with limited maximum transmission duration may be enabled.

Some of these functions may be supported by one or more signals to be transmitted from the beginning of a discontinuous LAA downlink transmission. Channel reservation may be enabled by the transmission of signals, by an LAA node, after gaining channel access, for example, via a successful LBT operation, so that other nodes that receive the transmitted signal with energy above a certain threshold sense the channel to be occupied. Functions that may need to be supported by one or more signals for LAA operation with discontinuous downlink transmission may include one or more of the following: detection of the LAA downlink transmission (including cell identification) by wireless devices, time synchronization of wireless devices, and frequency synchronization of wireless devices.

DL LAA design may employ subframe boundary alignment according to LTE-A carrier aggregation timing relationships across serving cells aggregated by CA. This may not indicate that the eNB transmissions may start only at the subframe boundary. LAA may support transmitting PDSCH if not all OFDM symbols are available for transmission in a subframe according to LBT. Delivery of necessary control information for the PDSCH may also be supported.

LBT procedures may be employed for fair and friendly coexistence of LAA with other operators and technologies operating in unlicensed spectrum. LBT procedures on a node attempting to transmit on a carrier in unlicensed spectrum may require the node to perform a clear channel assessment to determine if the channel is free for use. An LBT procedure may involve at least energy detection to determine if the channel is being used. For example, regulatory requirements in some regions, for example, in Europe, specify an energy detection threshold such that if a node receives energy greater than this threshold, the node assumes that the channel is not free. Nodes may follow such regulatory requirements. A node may optionally use a lower threshold for energy detection than that specified by regulatory requirements. LAA may employ a mechanism to adaptively change the energy detection threshold, for example, LAA may employ a mechanism to adaptively lower the energy detection threshold from an upper bound. Adaptation mechanism may not preclude static or semi-static setting of the threshold. A Category 4 LBT mechanism or other type of LBT mechanisms may be implemented.

Various example LBT mechanisms may be implemented. For some signals and/or in some frequencies, no LBT procedure may performed by the transmitting entity. For example, Category 2 (e.g., LBT without random back-off) may be implemented. The duration of time that the channel is sensed to be idle before the transmitting entity transmits may be deterministic. For example, Category 3 (e.g., LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle, for example, before the transmitting entity transmits on the channel. For example, Category 4 (e.g., LBT with random back-off with a contention window of variable size) may be implemented. The transmitting entity may draw a random number N within a contention window. The size of contention window may be specified by the minimum and maximum value of N. The transmitting entity may vary the size of the contention window if drawing the random number N. The random number N may be used in the LBT procedure to determine the duration of time that the channel is sensed to be idle, for example, before the transmitting entity transmits on the channel.

LAA may employ uplink LBT at the wireless device. The UL LBT scheme may be different from the DL LBT scheme, for example, by using different LBT mechanisms or parameters. These differences in schemes may be due to the LAA UL being based on scheduled access, which may affect a wireless device's channel contention opportunities. Other considerations motivating a different UL LBT scheme may include, but are not limited to, multiplexing of multiple wireless devices in a single subframe.

LAA may use uplink LBT at the wireless device. The UL LBT scheme may be different from the DL LBT scheme, for example, by using different LBT mechanisms or parameters. These differences in schemes may be due to the LAA UL being based on scheduled access, which may affect a wireless device's channel contention opportunities. Other considerations motivating a different UL LBT scheme may include, but are not limited to, multiplexing of multiple wireless devices in a single subframe.

A DL transmission burst may be a continuous transmission from a DL transmitting node, for example, with no transmission immediately before or after from the same node on the same CC. An UL transmission burst from a wireless device perspective may be a continuous transmission from a wireless device, for example, with no transmission immediately before or after from the same wireless device on the same CC. A UL transmission burst may be defined from a wireless device perspective or from an eNB perspective. If an eNB is operating DL and UL LAA over the same unlicensed carrier, DL transmission burst(s) and UL transmission burst(s) on LAA may be scheduled in a TDM manner over the same unlicensed carrier. An instant in time may be part of a DL transmission burst or part of an UL transmission burst.

A base station may send, to a core network entity (e.g. MME, AMF, and/or the like) one or more beam identifiers of one or more beams (e.g. one or more CSI-RS beams, one or more SS beams, and/or the like). The one or more beams may be used by the base station to serve a wireless device. The core network entity may utilize the one or more beam identifiers for an efficient paging procedure for paging the wireless device, which may stay in area of the one or more beams for a long period of time (e.g. for a static wireless device and/or for a semi-static/nomadic wireless device). The base station may be able to save radio resources for a paging procedure and/or reduce overhead for transmitting paging messages multiple times via all beams, for example, if a paging message is transmitted via one or more selected beams, but not all beams, of a cell. A base station distributed unit (DU) (e.g. gNB-DU) may send, to a base station central unit (CU) (e.g. gNB-CU), one or more beam identifiers of one or more beams. The base station DU and the base station CU may be parts of a base station. The base station may comprise the base station CU and one or more base station DUs comprising the base station DU. The one or more beams may be used by the base station DU to serve a wireless device or a plurality of wireless devices. The base station CU may utilize the one or more beam identifiers for an efficient paging procedure for paging (e.g. RAN paging and/or core network paging) the wireless device, which may stay in area of the one or more beams for a long period of time (e.g. for a static wireless device and/or for a semi-static/nomadic wireless device). If a paging message is transmitted via one or more selected beams, the base station may be able to save radio resources for a paging procedure, and/or the base station may be able to reduce overhead for transmitting paging messages multiple times via all beams.

A base station may send, to a core network entity (CNE) (e.g. AMF and/or MME, via an N2 interface and/or via an S1 interface), a message (e.g. a UE context release request message and/or a UE context release complete message) indicating a context release of the wireless device. The context release message may comprise paging assistance elements, such as cell ID and beam identifiers. The base station may receive, from the CNE, a first paging message comprising a wireless device ID and the paging assistance information elements. The CNE may transmit the first paging message, for example, after or in response to receiving a data notification for the wireless device; transmit a control signaling and/or one or more data packets; and/or to transition an RRC state of the wireless device into an RRC connected state. The CNE may utilize the one or more beam identifiers for an efficient paging procedure for paging the wireless device. If a paging message (and/or a paging indication) is transmitted via one or more selected beams, the base station may be able to save radio resources for a paging procedure and reduce overhead, such as compared to transmitting paging messages multiple times via all beams (e.g. via multiple beams of a cell). An immediate response to the CNE may not be required, for example, based on the transmission of the paging message. A base station may send paging assistance information elements to the CNE, for example, because the base station may release the paging assistance information from memory (e.g., at the time of or after sending the paging assistance information elements). The CNE may send the same paging assistance information (and/or a subset of the paging assistance information) back to the base station for paging the wireless device, which may conserve resources.

A base station DU (e.g. gNB-DU) may send, to a base station CU (e.g. gNB-CU) (e.g., via an F1 interface), a message (e.g. a UE context release request message and/or a UE context release complete message) indicating a context release of the wireless device including paging assistance elements, such as cell ID and/or beam identifiers. The base station DU may receive, from the base station CU, a first paging message including a wireless device ID and the paging assistance information elements. The base station CU may transmit the first paging message in response to receiving data for the wireless device; to transmit a control signaling; and/or to transition an RRC state of the wireless device into an RRC connected state (e.g. from an RRC idle state or an RRC inactive state). The base station CU may utilize the one or more beam identifiers for an efficient paging procedure for paging the wireless device. If a paging message (and/or a paging indication) is transmitted via one or more selected beams, the base station DU may be able to save radio resources for a paging procedure and reduce overhead as compared to transmitting paging messages multiple times via all beams (e.g. via multiple beams of a cell). An immediate response to the base station CU may not be required based on the transmission of the paging message. A base station DU may send paging assistance information elements to the base station CU as the base station DU may release the paging assistance information from memory. The base station CU may send the same paging assistance information (and/or a subset of the paging assistance information) back to the base station DU for paging the wireless device, thereby saving resources. The base station CU may send the paging assistance information to the CNE (e.g., if the wireless device transitions to an RRC idle state), and/or the base station may receive the paging assistance information (and/or a subset of the paging assistance information) from the CNE (e.g. via a core network paging message).

A wireless network may support both single beam and multi-beam operations. In a multi-beam system, a base station may utilize a downlink (DL) beam sweep to provide coverage for DL synchronization signals (SSs) and common control channels. A wireless device may utilize a similar sweep for uplink (UL) SS as well. For single beam systems, a network may configure time-repetition within one SS block, which may comprise at least a primary synchronization signal (PSS), a secondary synchronization signal (SSS), and/or a physical broadcast channel (PBCH), in a wide beam. For multi-beam systems, the network may configure at least some of these signals and physical channels (e.g. a SS block) in multiple beams such that a wireless device identifies at least OFDM symbol index, slot index in a radio frame, and/or a radio frame number from an SS block.

A wireless device in a RRC_INACTIVE or RRC_IDLE mode/state may assume that an SS block may form an SS block set and/or an SS block set burst having a given periodicity. For multi-beam systems, the SS block may be transmitted in multiple beams, together forming an SS burst. If multiple SS bursts are needed to transmit beams, these SS bursts together may form an SS burst set. PSS/SSS/PBCH may be repeated to support cell selection/reselection and initial access procedures for a cell in a multi-beam system. Differences in the conveyed PRACH configuration implied by a tertiary synchronization signal (TSS) may occur on a beam basis within an SS burst. A base station may broadcast PRACH configurations per beam where the TSS may be utilized to imply the PRACH configuration differences, for example, if PBCH carries the PRACH configuration.

The base station may transmit, to a wireless device, one or more messages comprising configuration parameters of one or more cells. The configuration parameters may comprise parameters of a plurality of CSI-RS signal format and/or resources. Configuration parameters of a CSI-RS may indicate CSI-RS periodicity, CSI-RS subcarriers (e.g. resource elements), CSI-RS sequence, and/or other parameters. Some of the parameters may be combined. A plurality of CSI-RS signals may be configured. The one or more message may indicate the correspondence between SS blocks and CSI-RS signals. The one or more messages may be RRC connection setup messages, RRC connection resume messages, and/or RRC connection reconfiguration messages. A wireless device in a RRC_IDLE mode may not be configured with CSI-RS signals, may receive SS blocks, and/or may measure a pathloss based on SS signals. A wireless device in RRC-connected mode may be configured with CSI-RS signals and/or may measure pathloss based on CSI-RS signals. A wireless device in a RRC_INACTIVE mode may measure the pathloss based on SS blocks, such as if the wireless device moves to a different base station that has a different CSI-RS configuration compared with the anchor base station.

In multi-beam systems, a wireless network may configure different types of PRACH resources that may be associated with SS blocks and/or DL beams. A PRACH transmission occasion may include the time-frequency resource on which a wireless device may transmit a preamble using the configured PRACH preamble format with a single particular Tx beam and for which a base station performs PRACH preamble detection. One or more PRACH occasions may be used to cover beam non-correspondence. A base station may perform an Rx sweep, for example, during a PRACH occasion as a wireless device Tx beam alignment may be fixed during a single occasion. A PRACH burst may include a set of PRACH occasions allocated consecutively in time domain. A PRACH burst set may include a set of PRACH bursts to enable full Rx sweep.

There may be an association between SS blocks (DL signal/channel) and a PRACH occasion and/or a subset of PRACH preamble resources. A PRACH occasion may comprise a set of preambles. In multi beam operation, the base station may need to know which beam or set of beams it may use to send an RAR. The preambles may indicate the beam and/or the beam set.

A wireless network may configure partitioning and/or mappings in multi beam operation. The timing from SS block to the PRACH resource may be indicated in the MIB. Different TSS may be used for different timings such that the detected sequence within TSS may indicate the PRACH resource. The PRACH configuration may be specified as a timing relative to the SS block and may be given as a combination of the payload in the MIB and/or another broadcasted system information. An association between SS block and a subset of RACH resources and/or a subset of preamble indices may be configured so that TRP may identify the best DL beam for a wireless device according to a resource location and/or preamble index of received preamble. An association may be independent and/or at least either a subset of RACH resources. A subset of preamble indices may not be allowed to be associated with multiple SS blocks.

PRACH resources may be partitioned on an SS-blocks basis in multiple beams operation. There may be one to one and/or a many to one mapping between SS-blocks and PRACH occasions. A wireless device may detect a SS-block based on DL synchronization signals and/or differentiate SS-blocks based on the time index. The transmission of a PRACH preamble resource may be an indication informed by a wireless device to base station of the preferred SS-block in a one-to-one mapping of beam or beams used to transmit an SS-block and a specific PRACH occasion. The PRACH preamble resources of a single PRACH occasion may correspond to a specific SS-block and mapping, for example, which may be done based on the SS-block index. There may be a one to one mapping between an SS-block beam and a PRACH occasion. There may not be such mapping for the SS-block periodicity and the RACH occasion periodicity.

Depending on the base station capability (e.g. the beamforming architecture utilized), there may not be one to one mapping between a single SS-block and a single RACH occasion. For a beam or beams used for transmitting an SS-block and receiving (e.g., during a RACH occasion) that do not correspond directly, such as the base station forming receive beams that cover multiple SS-blocks beams, the preambles of a PRACH occasion may be divided between the different SS-blocks in a manner that a subset of PRACH preambles map to a specific SS-block.

A base station DL Tx beam may be associated with a subset of preambles for beam-specific PRACH resources. The beam specific PRACH preambles resources may be associated with DL Tx beams that may be identified by periodical beam and cell specific CSI-RS for L3 mobility, L2 beam management, and/or intra-cell mobility. A wireless device may detect the beams without an RRC configuration, such as by reading the beam configuration from a minimum SI (e.g., MIB/SIB).

The PRACH resource mapping to specific beams may use an SS-block association. Specific beams may be associated with the beams used for transmitting SS-blocks. A base station may transmit SS-block using one or multiple beams (e.g. for analog/hybrid beamforming), but individual beams may not be detected. From the wireless device perspective, this may be a single beam transmission. A base station may transmit CSI-RS (e.g. for mobility) using individual beams associated with a specific SS-block. A wireless device may detect individual beams based on the CSI-RS.

PRACH occasions may be mapped to corresponding SS-block. A set of PRACH preambles may be divided between beams. Multiple beams of an SS-block may be mapped to at least one PRACH occasion. If a PRACH occasion is configured with k preambles and a PRACH occasion is configured to be SS-block specific, the set of preambles may be used to indicate the specific SS-block, where k may be an arbitrary number or a predetermined value. There may be N PRACH occasions corresponding to N SS-blocks, where N may be an arbitrary number or a predetermined value. If multiple SS-blocks are mapped to a single PRACH occasion, the preambles may be divided between SS-blocks. The available preambles per SS-block may be k/N (k preambles, N SS-blocks), for example, depending on the number of SS-blocks. If k SS-block specific preambles are divided between CSI-RS beams in the corresponding PRACH occasions, the number of available preambles per beam may be determined by the k preambles divided by the number of beams.

The wireless device may indicate a preferred SS-block, but not the preferred individual DL Tx beam, to the base station, for example, if the preambles are partitioned in an SS-block specific manner. The network may configure mapping and/or partitioning of PRACH preamble resources to SS-blocks and/or to individual beams. A wireless device may determine the used partitioning of PRACH preambles, as much as possible, for example, based on the PRACH configuration.

Beam-specific PRACH configurations may be configurable, for example, if a base station uses analog Rx beamforming. A wireless device may send, for example, a preamble in a beam-specific time/frequency slot associated with one or multiple SS block transmissions. The base station may use the appropriate Rx beamforming, for example, if receiving the preamble in that time/frequency slot and/or the base station may use the corresponding DL beam, for example, if transmitting the RAR. Beam-specific PRACH configurations may allow the base station to direct its Rx beamforming in the direction of the same beam, for example, if monitoring the associated PRACH resources.

For multi-beam RACH, a wireless device may be under the coverage of a given DL beam (or a subset) in a cell due to the mapping between DL SS beams and a PRACH configuration, such as a time/frequency slot and/or preamble partitioning. The base station may send a RAR in a DL beam and/or the base station may perform an optimized beam sweeping procedure, for example, not transmitting the same RAR message in multiple beams.

A wireless network may support contention-free RACH with multi-beam operation and/or the wireless device may provide a dedicated RACH resource for the preamble transmission for handover, DL data arrival, and/or positioning and obtaining timing advance alignment for a secondary TAG. A wireless device may be configured to measure on one or more SS blocks and/or other RS in a neighboring cell for a handover. The source base station may signal a preferred beam index in a handover request to the target base station, for example, if one of the neighboring cell SS-block measurements triggers a handover request. The target base station may provide a beam-specific dedicated RACH resource, which may include a preamble, in the handover command. The target base station may provide a set of dedicated resources, for example, one for at least one SS-block in the handover command. The wireless device may transmit a message (e.g., Msg1) using the dedicated preamble corresponding to the preferred DL beam in the target cell.

A cell may be operated with one or more beams in a multi-antenna system. A beam may have a spatial direction and/or a beam may cover a part of a cell coverage area. A combination of one or more beam spatial areas may form a cell coverage area. A beam transmitting a synchronization signal and/or receiving a signal from a wireless device may be swept over a cell coverage area in a predetermined way. A synchronization signal index, a synchronization signal scheduling information, and/or a synchronization signal sequence information, may be used to identify a swept beam. A swept beam may broadcast one or more control information comprising at least one of: a system information, a master information, a PDCCH, a PRACH resource, a random access preamble information, a synchronization signal, a reference signal, and/or the like. A beam may transmit a reference signal such as CSI-RS. A beam may be identified by a reference signal (e.g. CSI-RS, DM-RS, and the like) index, a reference signal scheduling information, and/or a reference signal sequence information.

One or more beams may be managed via a set of L1/L2 procedures to acquire and maintain a set of transmission reception points (TRPs) and/or wireless device beams that may be used for DL and UL transmission/reception. These procedures may include beam determination (e.g. for TRP(s) or wireless device to select of its own Tx/Rx beam(s)), beam measurement (e.g. for TRP(s) or wireless device to measure characteristics of received beamformed signals), beam reporting (e.g. for wireless device to report information of beamformed signal(s) based on beam measurement), and/or beam sweeping (e.g. operation of covering a spatial area, with beams transmitted and/or received such as during a time interval in a predetermined way).

Tx/Rx beam correspondence at a TRP and a wireless device may comprise determining if a TRP Rx beam for an uplink reception is based on the wireless device's downlink measurement on the TRP's one or more Tx beams. The TRP may be able to determine a TRP Tx beam for the downlink transmission, for example, based on TRP's uplink measurement on the TRP's one or more Rx beams. Tx/Rx beam correspondence at a wireless device may comprise determining if the wireless device may be able to determine a Tx beam for the uplink transmission, for example, based on the wireless device's downlink measurement on the wireless device's one or more Rx beams. A wireless device may be able to determine a wireless device Rx beam for the downlink reception, for example, based on the TRP's indication which may be based on uplink measurement on the wireless device's one or more Tx beams. A capability indication of wireless device beam correspondence related information to TRP may be supported.

A number of DL L1/L2 beam management procedures (e.g. P-1, P-2, and P-3) may be supported within one or multiple TRPs. P-1 may be used to enable wireless device measurement on different TRP Tx beams to support selection of TRP Tx beams/wireless device Rx beam(s). Beamforming at a TRP may include an intra/inter-TRP Tx beam sweep from a set of different beams. Beamforming at a wireless device may include a wireless device Rx beam sweep from a set of different beams. P-2 may be used to enable wireless device measurement on different TRP Tx beams, for example, to possibly change inter/intra-TRP Tx beam(s) from a potentially smaller set of beams for beam refinement than in P-1. P-2 may be a special case of P-1. P-3 may be used to enable wireless device measurement on the same TRP Tx beam, for example, to change a wireless device Rx beam for a wireless device that uses beamforming. Network triggered aperiodic beam reporting may be supported under P-1, P-2, and/or P-3 related operations.

Wireless device measurement based on RS for beam management (at least CSI-RS) may performed for K beams, and/or a wireless device may report measurement results of N selected Tx beams, where K represents the total number of configured beams and K and/or N may not be a fixed number. Reporting information may comprise at least measurement quantities for N beam(s) and information indicating N DL Tx beam(s), if N<K. Specifically, if a wireless device is configured with K>1 non-zero power (NZP) CSI-RS resources, a wireless device may report N CRIs (CSI-RS Resource Indicator). A wireless device may be configured with high layer parameters for beam management, such as $N \geq 1$ reporting settings, $M \geq 1$ resource settings, the links between reporting settings and resource settings may be configured in the agreed CSI measurement setting, CSI-RS based P-1 & P-2 may be supported with resource and reporting settings, and/or P-3 may be supported with or without reporting setting. A reporting setting may include information indicating selected beam(s), L1 measurement reporting, time-domain behavior (e.g. aperiodic, periodic, semi-persistent), and/or frequency-granularity. Multiple frequency granularities may be supported. A resource setting may include time-domain behavior (e.g. aperiodic, periodic, semi-persistent), RS type (e.g. NZP CSI-RS), and/or at least one CSI-RS resource set with each CSI-RS resource set having $K \geq 1$ CSI-RS resources. Some parameters of K CSI-RS resources may have common attributes such as port number, time-domain behavior, density, and/or periodicity.

A wireless device may report information about TRP Tx beam(s) that may be received using selected wireless device Rx beam set(s). An Rx beam set may include to a set of wireless device Rx beams that may be used for receiving a DL signal. A wireless device may construct the Rx beam set. Each Rx beam in a wireless device Rx beam set may correspond to a selected Rx beam in each panel. For wireless devices with more than one wireless device Rx beam set, the wireless device may report TRP Tx beam(s) and/or an identifier of the associated wireless device Rx beam set per reported Tx beam. Different TRP Tx beams reported for the same Rx beam set may be received simultaneously at the wireless device. Different TRP Tx beams reported for different wireless device Rx beam set may not be received simultaneously at the wireless device.

A wireless device may report information about TRP Tx beam(s) on a per wireless device antenna group basis. A wireless device antenna group may include an antenna panel and/or subarray. For wireless devices with more than one wireless device antenna group, the wireless device may report TRP Tx beam(s) and/or an identifier of the associated wireless device antenna group per reported Tx beam. Different Tx beams reported for different antenna groups may be received simultaneously at the wireless device. Different Tx beams reported for the same wireless device antenna group may not be received simultaneously at the wireless device.

A wireless network may support beam reporting for L groups, where L>=1. Each group may refer to an Rx beam set and/or a wireless device antenna group. For each group L, the wireless device may report information indicating group, measurement quantities for $N_L$ beam(s) that may support L1 RSRP and CSI report (e.g., if CSI-RS is for CSI acquisition), and/or information indicating $N_L$ DL Tx beam(s). Group based beam reporting may be configurable per wireless device basis. Group based beam reporting may be turned off per wireless device basis, for example, if L=1 or $N_L$=1. Group identifiers may not be reported.

A wireless device may trigger mechanisms to recover from beam failure events. Beam failure events may occur, for example, if the quality of beam pair link(s) of an associated control channel falls low enough, such as by a comparison with a threshold and/or a time-out of an associated timer. Beam failure recovery may be triggered if a beam failure occurs. A base station may configure a wireless device with resources for UL transmission of signals for beam failure recovery. Configurations of resources may be supported, such as if the base station may be listening from all or partial directions, such as a random access region. UL transmission and/or resources to report beam failure may be located in the same time instance as the PRACH (e.g. resources orthogonal to PRACH resources) and/or at a time instance (which may be configurable for a wireless device) different from the PRACH. DL signal transmissions may be supported, for example, to allow the wireless device to monitor the beams for identifying new potential beams.

A wireless network may support beam management with and/or without beam-related indication. If a beam-related indication is provided, information pertaining to wireless device-side beamforming/receiving procedure used for CSI-RS-based measurement may be indicated through quasi co-location (QCL) to a wireless device. A wireless network may support using the same or different beams on control channel and the corresponding data channel transmissions.

A wireless device may be configured to monitor the PDCCH on M beam pair links simultaneously for PDCCH transmission supporting robustness against beam pair link blocking, where M≥1 and the maximum value of M may depend at least on wireless device capability. A wireless device may be configured to monitor the PDCCH on different beam pair link(s) in different PDCCH OFDM symbols. Parameters related to wireless device Rx beam setting for monitoring the PDCCH on multiple beam pair links may be configured by higher layer signaling, a MAC CE, and/or considered in the search space design. A wireless network may support indication of spatial QCL assumption between DL RS antenna port(s) and/or DL RS antenna port(s) for demodulation of DL control channel Candidate signaling methods for beam indication for a PDCCH (e.g. configuration method to monitor PDCCH) may include one or more of MAC CE signaling, RRC signaling, DCI signaling, specification-transparent, and/or implicit method. Indication may not be needed.

For reception of unicast DL data channel, a wireless network may support indication of spatial QCL assumption between DL RS antenna port(s) and DMRS antenna port(s) of DL data channel Information indicating the RS antenna port(s) may be indicated via DCI (downlink grants). The information may indicate the RS antenna port(s) which may be QCL-ed with DMRS antenna port(s). Different set of DMRS antenna port(s) for the DL data channel may be indicated as QCL with different set of RS antenna port(s). Indication may not be needed.

A CU-DU interface between CU and DU may be defined as an F1 interface. There may be transport networks with performances that may vary from high transport latency to low transport latency in deployment. For transport networks with higher transport latency, higher layer splits may be used. For transport networks with lower transport latency, lower layer splits may also be used and preferable to realize enhanced performance (e.g. centralized scheduling). A preferable option may be different between different types of transport networks, ranging from lower layer split for transport networks with lower transport latency to higher layer split for transport networks with higher transport latency. Within lower layer splits, there may be both demands to reduce transport bandwidth and demands to support efficient scheduling and advanced receivers.

Network interworking may be based on dual connectivity mechanisms. Network interworking may not include a particular functional split. Aggregation of PDCP functionalities for split bearers may be allowed.

The granularity of the CU/DU functional split may be per CU (e.g. each CU may a fixed split, and DUs may be configured to match this) and/or per DU (e.g. each DU may be configured with a different split). The choice of a DU split may depend on specific topology or backhaul support in an area. The CU/DU decision and/or coordination of the split may be configured. Additionally or alternatively, the split may be negotiated based on capabilities of the units (e.g. CU and DU) and/or deployment preference (e.g. based on backhaul topology). Additional split granularity options may include per wireless device (e.g. different wireless devices may have different service levels, or belong to different categories, that may be best served in different ways by the RAN e.g. a low rate IoT-type wireless device with no need for low latency may not necessarily require higher layer functions close to the RF), per bearer (e.g. different bearers may have different QOS requirements that may be best supported by different functionality mapping. For example, QCI=1 type bearer may require low delay but may not be SDU error sensitive, while eMBB may not be delay sensitive but may have challenging requirements on throughput and SDU error rate), and/or per slice (e.g. it may be expected that each slice may have at least some distinctive QOS requirements). Different functionality mapping may be suitable for each slice.

Per CU and per DU options may pertain to flexibility of network topology. Whether procedures may be required to handle the initial configuration (or O&M may be relied upon) may not be addressed, for example, during a study phase. In a per DU option, a CU may need to support different split levels in different interfaces. This may not be utilized for per CU operation. Further granularity (e.g. per wireless device, per bearer, per slice) may be based on QoS and latency requirements. Per wireless device, per bearer, and/or per slice options may imply that a particular instance of the interface between CU/DU may need to support multiple granularity levels simultaneously on the user plane. The baseline may be CU based or DU based.

Dynamicity may imply that the protocol distribution and the interface between the CU and DU may need to be reconfigured. If the switching occurs in CU-DU setup procedure (e.g. F1 interface setup procedure), the interface design may not be influenced largely as the split option may not be changed, for example, during operation. If the switching occurs during operation, there may be impact on complexity of interface.

Not all of the defined functional splits may allow for having RRM functions, such as call admission control and load balancing, in the CU controlling multiple DUs. This may allow for increased efficiency in inter-cell coordination for RRM functions such as the coordination of interference management, load balancing, and/or call admission control. The improved efficiency may be realized, for example, if the CU has a reliable and accurate understanding of the current environment at the DU. Conditions at the DU may comprise radio conditions, current processing capabilities, and/or current terrestrial capacity, such as for wireless or mesh backhauling.

Functional split Option 5, Option 6, Option 7 and Option 8 may allow for scheduling of data transmission in the CU. Centralized scheduling may provide benefits for interference management and/or coordinated transmission in multiple cells. This may require the CU to have an understanding of the state of the DU radio conditions than for CAC and other centralized RRM functions. Low latency/jitter transport and/or sufficient coordination of timing and reception of user plane data may be required. Centralization of RAN functions may have benefits such as reduced cost, improved scalability, more efficient inter-cell coordination for interference management, as well as improved mobility in ultra-dense deployments.

RRC related functions may be located in the CU. The RRC message between the base station and the wireless device may be transferred through the interface (e.g. F1 interface) between the CU and the DU. RRC messages may require a differentiated transport between CU and DU compared to data transport, e.g. in terms of robustness and delay.

F1-C and F1-U may provide C-plane and U-plane over F1 interface, respectively. A central unit (CU) may be a logical node that may include a subset of the base station functions as listed excepting those functions allocated exclusively to the distributed unit (DU). The CU may control the operation of DUs. A DU may be a logical node that may include, depending on the functional split option, a subset of the base station functions.

A F1AP ID may be allocated to uniquely identify a wireless device over the F1 interface within a CU and an associated DU. If a DU receives a F1AP ID, it may store it for the duration of the wireless device-associated logical F1-connection for this wireless device. The F1AP ID may be unique within the CU logical node and the associated DU logical node. The definition of the AP ID may be pending the decision on whether the DU may be connected to multiple CUs. Wireless device-associated signaling may be one or more F1AP messages associated to one wireless device. The one or more F1AP messages may use the wireless device-associated logical F1-connection for association of the message to the wireless device in DU and CU. The wireless device-associated logical F1-connection may use the identities of the F1AP ID. For a received wireless device associated F1AP message, the CU and DU may identify the associated wireless device based on the F1AP ID IE. The wireless device-associated logical F1-connection may exist before the F1 wireless device context is setup in a DU.

The F1 Setup procedure may exchange application level data needed for the DU and the CU to correctly interoperate on the F1 interface (e.g. CU-DU interface). This procedure may be the first F1AP procedure triggered after the TNL association becomes operational. The procedure may use non-wireless device associated signaling. This procedure may erase existing application level configuration data in the nodes and may replace it by the one received. CU overload state information may be cleared at the DU. If the DU and CU do not agree on retaining the wireless device contexts, this procedure may re-initialize the F1AP wireless device-related contexts and may erase related signaling connections in the nodes.

Paging occasion (PO) may comprise multiple time slots (e.g. subframes or OFDM symbols). Multiple time slots may enable transmission of paging using a different set of DL Tx beam(s) in each time slot and/or may enable repetition. Paging transmissions using multiple DL Tx beams may be enabled. For paging in multi-beam operation, beam sweeping may be supported for paging. For paging channel design for RRC idle state and/or RRC inactive state, paging messages may be scheduled by DCI (e.g. physical layer control message) carried by PDCCH and/or may be transmitted in an associated wireless network-PDSCH. For paging in multi-beam operation, beam sweeping may be performed in paging occasion.

Figure 18A:
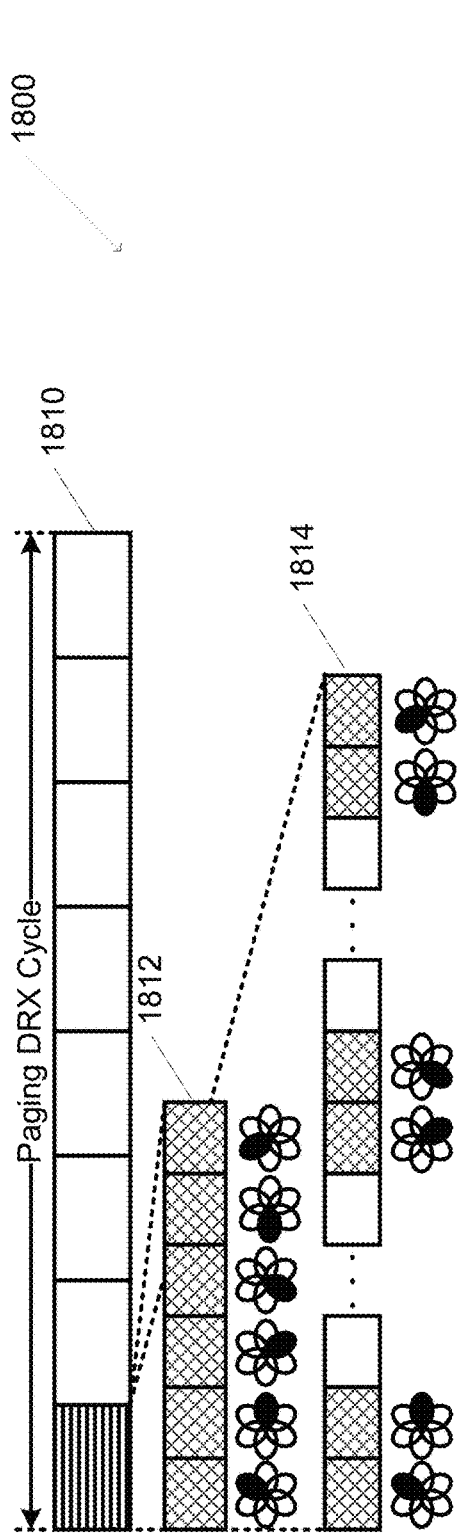
FIG. 18A and FIG. 18B show examples of beam based paging.
Figure 18B:
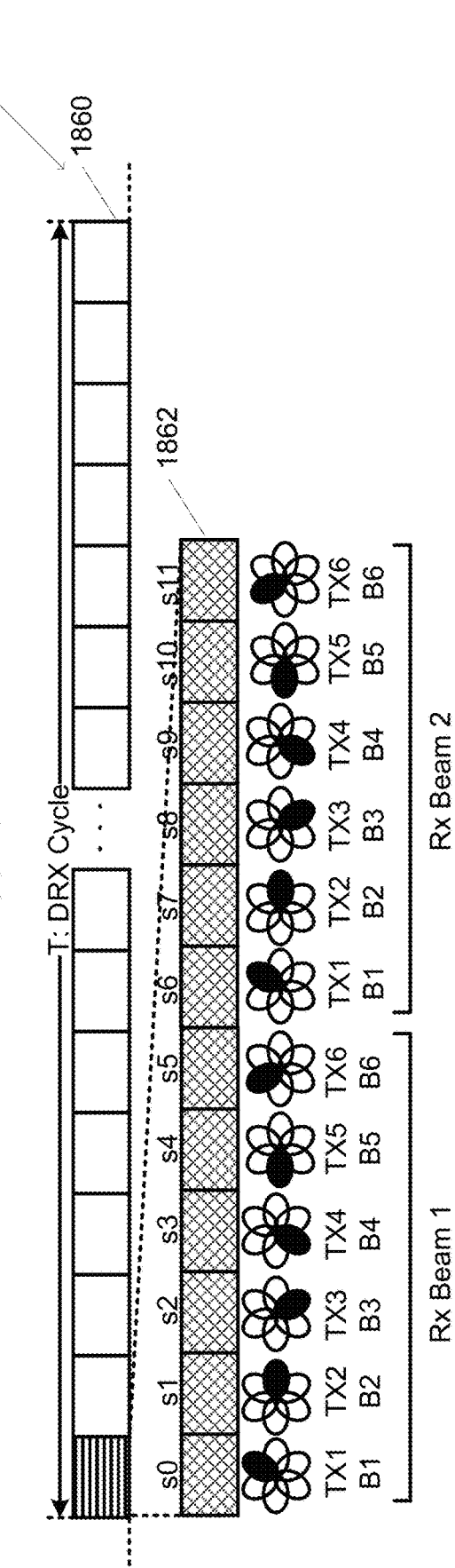

FIG. 18A shows an example 1800 of paging transmission using Tx beam sweeping in PO which may comprise multiple time slots. The example 1800 includes a paging DRX cycle 1810 with one or more PO. A PO may comprise one or more paging time slots 1812. The paging time slots 1812 may be contiguous. A PO may comprise one or more non-contiguous paging time slots 1814. Paging messages may be transmitted in each time slot using one or more Tx beams. The Tx beams used in each time slot may be distinct. Time slots in PO where paging may be transmitted may be consecutive. Paging may be transmitted in a time slot designated for paging using one or more Tx beams. Tx beam(s) used in each time slot designated for paging may be distinct. Paging may be transmitted in each time slot (designated for paging) using one or more Tx beams. FIG. 18B shows an example 1850 of a paging transmission using Tx beam sweeping and TX beam repetition in PO. Example 1850 comprises a DRX cycle 1860 having one or more PO. A PO may comprise one or more paging time slots 1862. Each paging time slot 1862 may be associated with at least one transmit beam. One or more paging time slot 1862 may be associated with one or more Rx beams. Example 1850 comprises Rx Beam 1 associated with Tx Beams 1-6 in time slots 0-5 and Rx Beam 2 associated with Tx Beams 1-6 in time slots 6-11. Tx beams may be repeated to enable Rx beam sweeping. Example 1850 comprises 6 Tx beams at the base station and 2 Rx beams at the wireless device. However, any number of beams may be utilized as appropriate.

An advantage of repetition of paging transmission from each Tx beam to enable Rx beam sweeping may be that wireless device may not need to wake up before the PO for Rx beam sweeping. However, repetition of paging transmission from each Tx beam to enable Rx beam sweeping may be expensive in terms of paging overhead. Additionally, different wireless devices may have different Rx beam capability that may complicate the design of PO, such as POs with different number of time slots and mapping of POs to wireless devices depending on wireless device Rx beam capability. It may be preferred that, for paging in multi-beam operation, only Tx beam sweeping may be performed in PO. Repetition of paging transmission from each Tx beam to enable Rx beam sweeping may lead to increase signaling overhead. Wireless devices may have different Rx beam capability. This may complicate the design of PO, for example if paging transmission from each Tx beam is repeated to enable Rx beam sweeping. For paging in multi-beam operation, Tx beam sweeping may be performed in paging occasion. Paging transmission from each Tx beam may not repeated for Rx beam sweeping at wireless device.

To receive a paging message transmitted using beam sweeping, a wireless device may monitor a number of time slots for paging. PO may comprise several time slots for Tx beam sweeping. This may lead to increased wireless device's power consumption. Monitoring multiple time slots in PO may lead to increased wireless device's power consumption. Wireless device power consumption may be reduced if the wireless device may determine an acceptable DL Tx beam using the broadcast signals, such as PSS/SSS/ PBCH, and/or monitor a time slot in PO corresponding to the acceptable DL Tx beam. As the wireless device may monitor broadcast signals to check if the wireless device is in the same cell, determining the acceptable DL Tx beam may not lead to additional complexity at wireless device.

To determine the time slot corresponding to acceptable DL Tx beam, the wireless device may utilize the mapping between one or more DL Tx beams and time slots in PO. Mapping between one or more DL Tx beams and time slots in PO may be implicit. The sequence in which DL Tx beams may be used for transmission of wireless network-PSS/SSS/ BCH may be same sequence in which DL Tx beams may be used for transmission of paging message in PO. A wireless device may only monitor a time slot corresponding to a acceptable DL Tx beam. For example, if the suitable DL Tx beam is Tx5, the wireless device may monitor only time slot S4, corresponding to the Tx5, for receiving paging. Mapping between one or more DL Tx beams and time slots in PO may be explicit signaled via system information. The wireless device may not need to monitor all time slots in paging occasion for receiving paging message. The wireless device may monitor the time slot in PO corresponding to its acceptable DL Tx beam. Mapping between the time slots in paging occasion and DL Tx beams may be explicitly or implicitly signaled to wireless device.

A wireless device may or may not support Rx beamforming. The wireless device may determine an Rx beam for receiving paging in PO for example if the wireless device supports multiple Rx beams. The wireless device may wake up in advance before the PO to monitor the broadcast signals, perform Rx beam sweeping, and/or determine a acceptable Rx beam, for example, if wireless device has N Rx beams and paging is transmitted using a Tx beam. The wireless device may use this Rx beam to receive paging in PO.

A base station may serve a wireless device via one or more cells. The base station may transmit and/or receive transport blocks (e.g. control signaling transport blocks and/or data signaling transport blocks) to and/or from the wireless device via radio resources of the one or more cells. The one or more cells may comprise a first cell. The base station may configure one or more beams of the first cell to serve the wireless device. The one or more beams may comprise one or more channel state information-reference signal (CSI-RS) beams and/or one or more synchronization signal (SS) beams. The one or more beams may comprise a first beam. The first beam may be a CSI-RS beam or an SS beam.

The base station may transmit, to the wireless device, beam configuration parameters for the one or more beams. The beam configuration parameters may be transmitted via at least one radio resource control (RRC) message (e.g. an RRC connection reconfiguration message, an RRC reconfiguration message, an RRC setup message, an RRC reestablishment message, an RRC resume message), at least one medium access control (MAC) layer message (e.g. a MAC control element), and/or at least one physical layer message (e.g. a downlink control indication (DCI)). The wireless device may measure beam quality (e.g. RSRP, RSRQ, and/or the like) of the one or more beams, and/or may report measurement results of beam quality of at least one of the one or more beams to the base station. The wireless device may use at least one of the one or more beams to transmit transport blocks (e.g. for control signaling and/or for data signaling). The wireless device may use at least one of the one or more beams to receive transport blocks (e.g. for control signaling and/or for data signaling).

The base station may receive, from the wireless device, one or more random access (RA) preambles via at least one of the one or more beams. The base station may transmit, to the wireless device, one or more RA response (RAR) messages via at least one of the one or more beams. At least one of the one or more beams may be chosen by the base station and/or the wireless device through a beam refinement procedure.

The base station may transmit, to the wireless device, a first message indicating an RRC connection release of the wireless device. The first message may be an RRC connection release message (e.g. an RRC release message). The first message may be transmitted via at least one of the one or more beams. The RRC connection release of the wireless device may be initiated by the base station for a variety of factors, such as no activity of the wireless device, congestion of the base station, system error, a release indication (e.g. a UE context release message) from the CNE, and/or the like. The RRC connection release of the wireless device may be initiated from a core network entity (e.g. AMF, MME, and/or the like) for a variety of factors, such as no activity of the wireless device, congestion of the core network entity, congestion of one or more core network entity like SMF or UPF, system error, a request from the wireless device via a NAS message, and/or the like.

Figure 15:
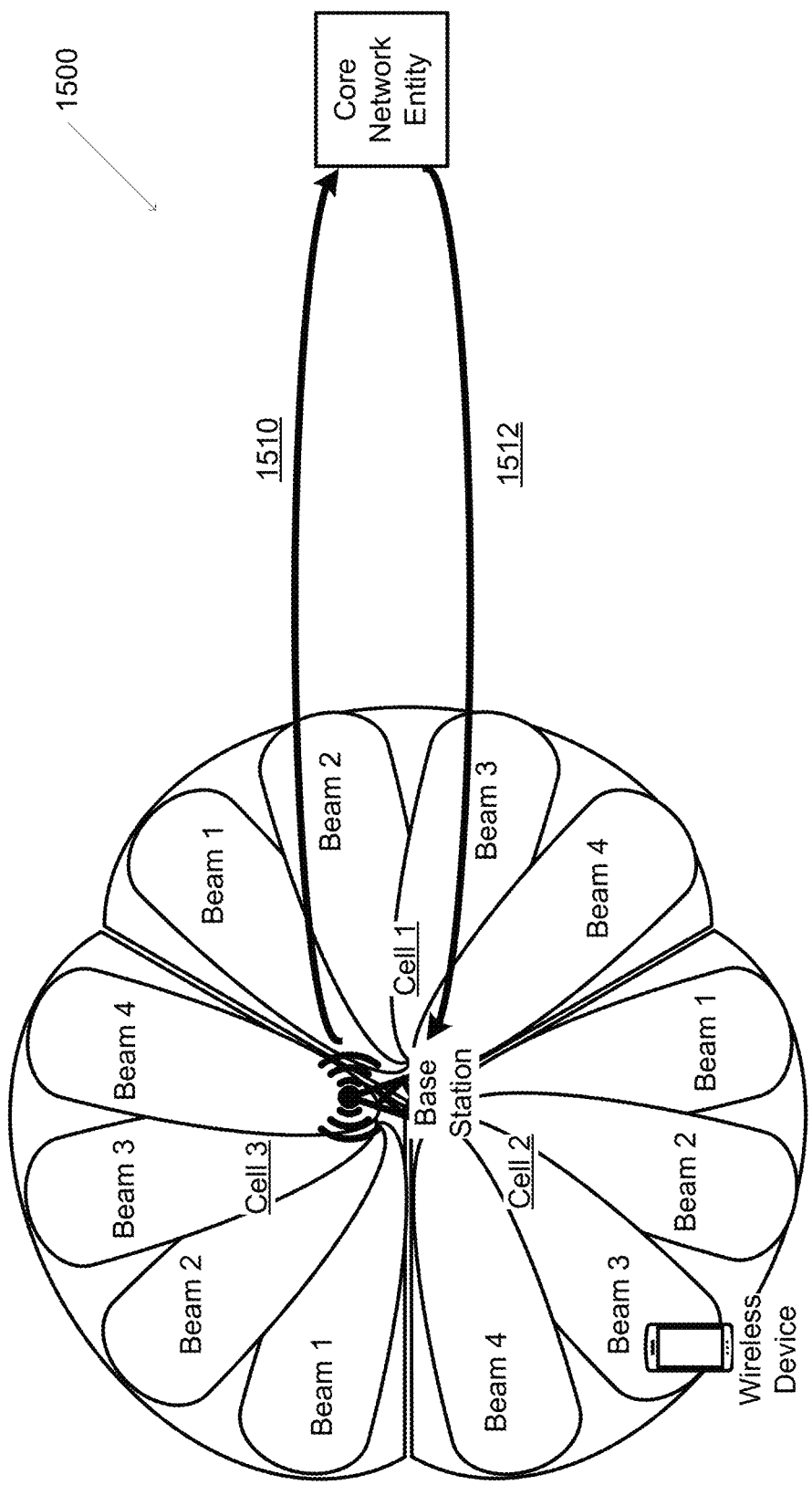
FIG. 15 shows an example of a paging message in a cell.

FIG. 15 shows an example 1500 of a paging message in a cell. A base station may have one or more cells. In example 1500, the base station has three cells, Cell 1, Cell 2, and Cell 3. Each of the cells has one or more beams. Each cell in example 1500 comprises four beams. The cells and beams may provide wireless coverage to a geographic area. A wireless device may be located in a cell and receive signals via a beam within the cell. Example 1500 comprises a wireless device located in Cell 2 and receiving signals from Beam 3. The base station may communicate with a core network entity, such as an AMF. The base station may send messages 1510 to the core network entity and receive messages 1512 sent by the core network entity. The messages 1510 may comprise a wireless device context release request and/or a complete message comprising a cell ID (e.g. Cell 2) for at least one cell and at least one beam index (e.g. Beam 3). The messages 1512 may comprise a paging message based on the cell ID and/or the at least one beam index.

The base station may transmit, to the core network entity, a wireless device context release request message indicating a request of releasing wireless device contexts, for the wireless device, related to an interface connection (e.g. an NG connection, an N2 connection, an N3 connection, an S1 connection, and/or the like) between the base station and the core network entity (e.g. control-plane core network entity) and/or between the base station and a user-plane core network entity (e.g. UPF, SMF, serving gateway, and/or the like), for example, if the RRC connection release is initiated by the base station. The wireless device context release request message may be transmitted after transmitting the first message to the wireless device. Based on the wireless device context release request message, the base station may receive a response message for the wireless device context release request message from the core network entity. The response message may be a wireless device context release command message. Based on the response message, the base station may transmit, to the core network entity, a wireless device context release complete message indicating a complete of release the wireless device contexts of the wireless device.

Communicating with the core network entity via the wireless device context release request message, the wireless device context release command message, and/or the wireless device context release complete message, the base station may release the wireless device contexts of the wireless device. The wireless device context release request message or the wireless device context release complete message may be a second message. The wireless device context release request message may be defined with a different name as a message indicating a request of releasing wireless device contexts, for the wireless device, related to an interface connection between the base station and the core network entity and/or between the base station and a user-plane core network entity. The wireless device context release complete message may be defined with a different name as a message indicating a complete of release the wireless device contexts of the wireless device.

The base station may receive a wireless device context release command message from the core network entity, for example, if the RRC connection release is initiated from the core network entity. Based on the wireless device context release command message, the base station may transmit, to the core network entity, a wireless device context release complete message indicating a complete of release the wireless device contexts of the wireless device. The base station may release the wireless device contexts of the wireless device by communicating with the core network entity via the wireless device context release command message and/or the wireless device context release complete message. The wireless device context release complete message may be transmitted after transmitting the first message to the wireless device. The first message may be transmitted to the wireless device based on receiving the wireless device context release command message from the core network entity.

The wireless device context release complete message may be a second message. The wireless device context release complete message may be defined with a different name as a message indicating a complete of release the wireless device contexts of the wireless device, related to an interface connection between the base station and the core network entity, and/or between the base station and a user-plane core network entity.

An interface (e.g. N2 and/or S1) message transmitted from the base station to the core network entity may be a second message, wherein the message comprising one or more configuration parameters for the wireless device. The second message (e.g. the wireless device context release request message, the wireless device context release complete message, the NG interface message, and/or the like) may comprise paging assistance information elements (IEs) comprising at least one of a first cell identifier of the first cell, a first beam index of the first beam of the first cell, a first time duration that the wireless device stayed at the first beam, and/or the like. The second message may comprise at least one of one or more cell identifiers of one or more cells of the base station, one or more beam indexes of the one or more beams of the first cell, one or more time durations that the wireless device stayed at the one or more beams, and/or the like. The first cell identifier may be a global cell identifier (e.g. NG-CGI, ECGI, 5G-CGI, and/or the like), a physical cell identifier (e.g. PCI), a cell identifier unique in a PLMN, a tracking area, a registration area, a base station, a base station DU, and/or the like.

The first beam index may comprise a CSI-RS index, for example, if the first beam is a CSI-RS beam. The first beam index may comprise an SS index, for example, if the first beam is an SS beam. The one or more beam indexes may be CSI-RS indices, for example, if the one or more beams are CSI-RS beams. The one or more beam indices may be SS indices, for example, if the one or more beams are SS beams. At least first one of the one or more beams may be a CSI-RS beam, and/or at least second one of the one or more beams may be a SS beam. The first beam may be a downlink beam and/or an uplink beam.

The second message may comprise one or more SS indices of one or more SS beams corresponding to at least one of the one or more beams, for example, if the one or more beams are CSI-RS beams. Coverage areas of the one or more SS beams may cover the coverage area of the one or more beams. The second message may comprise one or more candidate beam indices of one or more candidate beams that the wireless device may move to, for example, during its RRC idle state and/or RRC inactive state. The second message may comprise one or more cell identifier of one or more cells serving the one or more candidate beams.

The first beam may be a CSI-RS beam or an SS beam (lastly or recently) used to serve the wireless device. The base station may transmit transport blocks to the wireless device via the first beam (e.g. CSI-RS beam or SS beam) and/or may receive transport blocks from the wireless device via the first beam (e.g. CSI-RS beam or SS beam). The base station may determine the first beam based on one or more measurement report received from the wireless device. The base station may send the first beam identifier of the first beam to the core network entity via the second message, for example, if the base station determines that the quality of the first beam for the wireless device meets a quality threshold such as RSRP, RSRQ, and/or the like. The first beam may not serve the wireless device before releasing the wireless device contexts of the wireless device.

The paging assistance IEs may further comprise a first time duration that the wireless device stayed at the first beam if the wireless device has stayed at the first beam. The first time duration may indicate a time duration value (e.g. absolute time duration value such as seconds, minutes, hours, days, and/or the like; and/or a relative time duration indication such as short, medium, long, and/or the like), for example, during which the wireless device may have stayed at the first beam and/or was served via the first beam. The first time duration may be determined as a time duration between the first transport block transmission/reception, the first signaling via the first beam for the wireless device and the last transport block transmission/reception, and/or the last signaling via the first beam for the wireless device.

The paging assistance IEs may further comprise a time at which the base station communicated with the wireless device. The time may correspond to the base station and/or the core network entity determining (or estimating) whether the wireless device will still stay at the first beam, at the one or more beams, and/or at the first cell.

The core network entity may initiate a paging procedure for the wireless device based at least one the paging assistance IEs. The paging procedure may be initiated, for example, if the core network entity receives a downlink data notification from a user plane core network entity (e.g. SMF, UPF, serving gateway, and/or the like). The paging procedure may be initiated for other system causes, such as to transmit a notification (e.g. control signaling, user plane data, and/or control plane data) for one or more configuration update for the wireless device. For the initiating a paging procedure, the core network entity may send a paging message to one or more base stations in a tracking area and/or a registration area of the wireless device. The core network entity may send a paging message to the base station based at least on the paging assistance IEs received from the base station. The core network entity may send a paging message only to the base station based on the paging assistance IEs if it determines (e.g. based on a time duration since receiving the paging assistance IEs from the base station) that the wireless device may stay at a service area of the base station, for example, in a coverage area of the first cell, in a coverage area of the first beam, in one or more coverage area of the one or more beams. The core network entity may determine that the wireless device may stay at the service area of the base station based on one or more wireless device type information of the wireless device received from the wireless device or from a wireless device subscription information control network entity. The core network entity may determine that the wireless device may stay at the service area of the base station based on the first time duration of the paging assistance IEs and/or one or more time duration, of the paging assistance IEs, for example, during which the wireless device may have stayed at the one or more beams.

The base station may receive, from the core network entity, a first paging message for the wireless device. The first paging message may comprise a wireless device identifier of the wireless device and paging assistance data. The paging assistance data may comprise at least one of the first cell identifier of the first cell of one or more recommended cells for paging, at least one first beam index of at least one first beam of the first cell, and/or a time duration that the wireless device stayed at one of the at least one first beam. At least one first beam may comprise the first beam and/or the one or more beams of the paging assistance IEs. The at least one first beam index may indicate the at least one first beam (e.g. at least one downlink beam and/or at least one uplink beam) corresponding to the first beam (e.g. downlink or uplink beam). The at least one first beam index may comprise the first beam index of the first beam and/or the one or more beam indexes of the one or more beams. One or more elements of the paging assistance data may be determined based on the paging assistance IEs that the core network entity received from the base station. One or more elements of the paging assistance data may be of the paging assistance IEs. The at least one first beam index may comprise at least one of a first CSI-RS index and/or a first SS index.

Based on receiving the first paging message, the base station may determine at least one second beam for the paging based at least on the paging assistance data. The at least one second beam may comprise the at least one first beam. The at least one second beam may comprise the first beam of the first cell. The at least one second beam (e.g. downlink beam) may comprise at least one beam corresponding to the first beam (e.g. uplink or downlink beam) of the first cell. The at least one second beam may be of the first cell. The base station may take into account the time duration that the wireless device stayed at one of the at least one first beam, for example, if the base station determines the at least one second beam. The base station may determine that the wireless device may stay at the first cell for paging the wireless device, for example, if the time duration is longer than a threshold.

The paging assistance data may further comprise the time (e.g., time duration (for example, 2400 secs or any other time) since the wireless device context release, the RRC connection release, and/or the RRC release of the wireless device) (e.g., absolute time value (for example, 8 h 35 m 21 s today or any other time) at the time of the wireless device context release, the RRC connection release, and/or the RRC release of the wireless device) at which the base station communicated with the wireless device. The base station may use the time to determine (or estimate) whether the wireless device will still stay at the first beam, at the one or more beams, and/or at the first cell. The base station may transmit a second paging message via all cells and all beams of the base station, for example, if a time duration longer than a threshold has passed. Based on the time duration passed since the time at which the base station communicated with the wireless device, the base station may determine an area for paging.

The base station may determine, at least based on the paging assistance data, a paging area to transmit a second paging message, such as whether the base station transmits a second paging message via only the first beam of the first cell, via only the one or more beams of the first cell, via only the at least one second beam, via only the at least one first beam, via only a coverage area of the first cell, via a whole service area of the base station, via some beams of the first cell, via some cells of the base stations, via a tracking area of the wireless device, via a registration area of the wireless device, and/or the like.

Based on determining the paging area to transmit a paging message for the wireless device, the base station may transmit a second paging message (e.g. paging occasion) via the paging area. Based on determining the at least one second beam, the base station may transmit a second paging message via the at least one second beam. The at least one second beam may be an CSI-RS beam or an SS beam. The at least one second beam may be at least one of sweeping beams of the first cell. The at least one second beam may comprise the first beam. The second paging message may be a paging occasion and/or a paging indication. The second paging message may be transmitted via a radio resource configured for paging for each beam. At a beam of the at least one second beam, a paging time slot may be used to transmit the second paging message (e.g. paging occasion). The base station may transmit the second paging message only via the paging area, and/or only via the at least one second beam.

The wireless device may transmit a random access preamble to the base station, for example, if the wireless device receives the second paging message transmitted only via the paging area, and/or only via the at least one second beam. The base station may increase an area for paging of the wireless device, for example, if the base station does not receive a random access preamble based on the second paging message in a threshold time duration. The base station may transmit the third paging message via all beams of the first cell or via all cell of the base station if it fails in paging the wireless device with the second paging message. The base station may transmit the third paging message via a coverage area of the first cell, via a whole service area of the base station, via some beams of the first cell, via some cells of the base stations, via a tracking area of the wireless device, via a registration area of the wireless device, and/or the like, for example if the base station fails in paging the wireless device with the second paging message.

Figure 16:
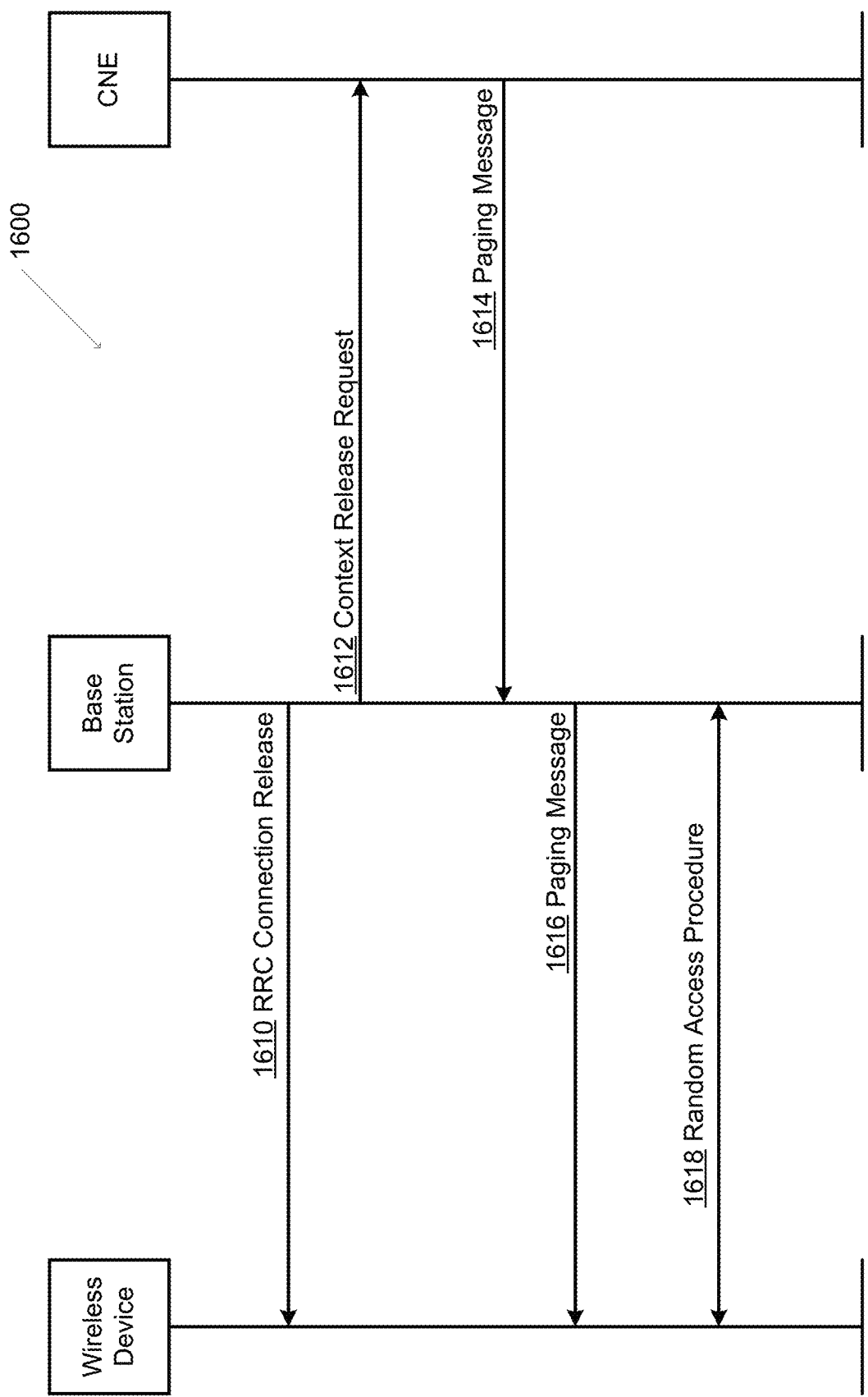
FIG. 16 shows an example of paging.

FIG. 16 shows an example of paging. Example 1600 comprises, at time 1610, a base station sending a message to a wireless device. The message may be a RRC connection release message. At time 1612, the base station may send a message to a central network entity, such as an AMF. The message may comprise a wireless device context release request or wireless device context release complete message. The message may comprise at least one beam index. At time 1614, the central network entity may send a message to the base station. The message may comprise a paging message. The paging message may comprise the at least one beam index. At time 1616, the base station may send a paging message to the wireless device. The paging message may be sent to the wireless device on the at least one beam identified by the at least one beam index. At time 1618, the wireless device and/or base station may communicate with each other, for example, during a random access procedure.

A base station may transmit, to a wireless device, a first message indicating a radio resource control (RRC) connection release of the wireless device. The base station may release a context of the wireless device based on the RRC connection release of the wireless device. The base station may send, to a core network entity, a second message indicating a wireless device context release for the wireless device based on releasing the context. The second message may comprise paging assistance information elements (IEs) comprising at least one of a first cell identifier of a first cell, a first beam index of a first beam of the first cell, and/or a first time duration that the wireless device stayed at the first beam. The base station may receive, from the core network entity, a paging message based at least on the paging assistance IEs. The beam index may comprise at least one of a channel state information-reference signal (CSI-RS) index and/or a synchronization signal (SS) index. The base station may determine the first beam based at least on a CSI-RS beam (lastly) used to serve the wireless device, a SS beam (lastly) used to serve the wireless device, and/or a measurement report received from the wireless device.

A base station may receive, from a core network entity, a first paging message for a wireless device. The first paging message may comprise a wireless device identifier of the wireless device and/or paging assistance data. The paging assistance data may comprise at least one of a first cell identifier of a first cell of one or more recommended cells for paging, at least one first beam index of at least one first beam of the first cell, and/or a time duration that the wireless device stayed at one of the at least one first beam. The base station may determine, based on the first paging message, at least one second beam for the paging based at least on the paging assistance data. The base station may transmit a second paging message via (only) the at least one second beam. The base station may receive, from the wireless device, a random access (RA) preamble based on the second paging message. The at least one first beam index may comprise at least one of a first channel state information-reference signal (CSI-RS) index and/or a first synchronization signal (SS) index.

Figure 17:
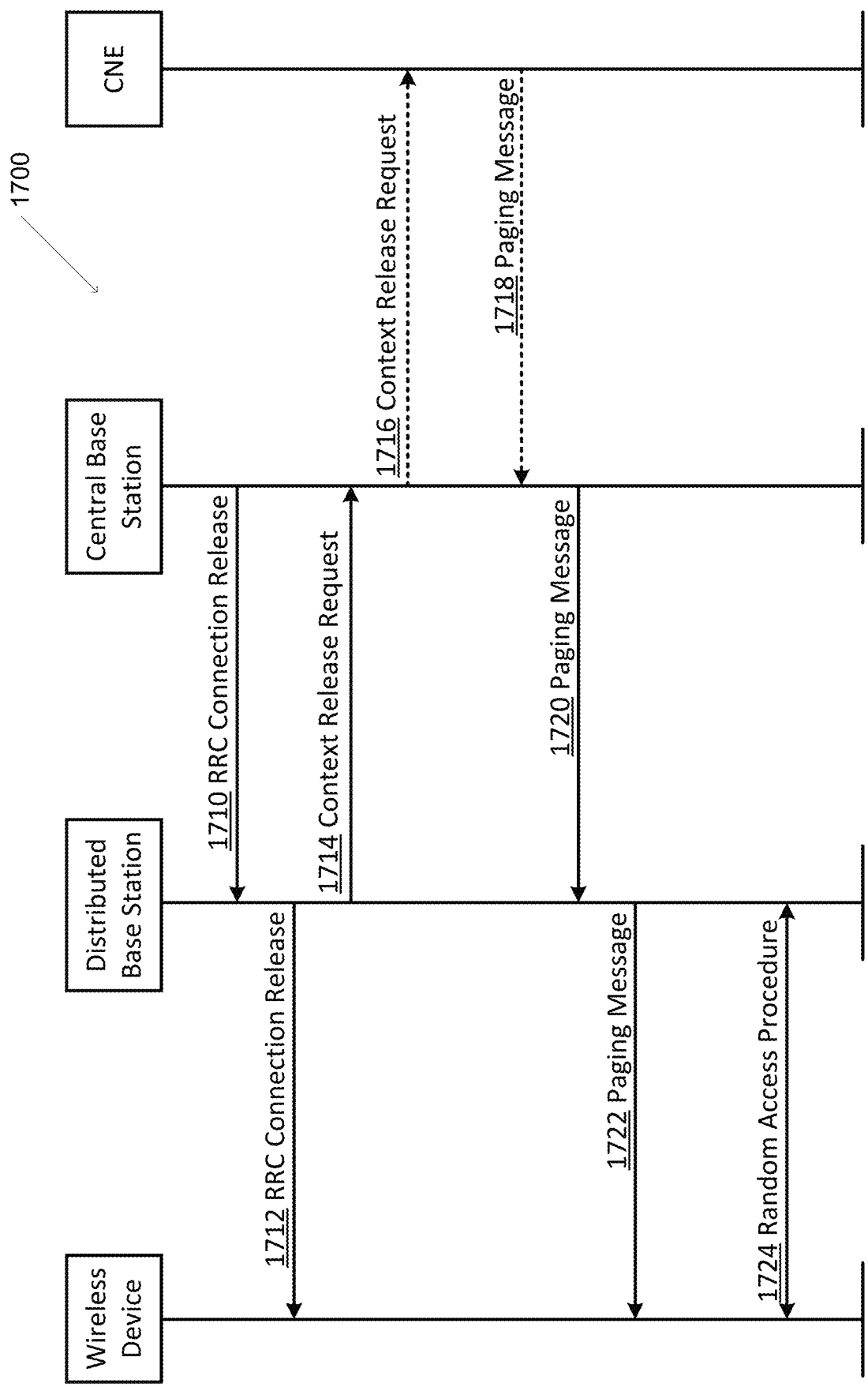
FIG. 17 shows an example of paging with a distributed base station.

FIG. 17 shows an example of paging. Example 1700 comprises, at time 1710, a central base station (CU) sending a message to a distributed base station (DU) The message may be a RRC connection release message. At time 1712, the DU may send a message to the wireless device. The message may be the RRC connection release message. At time 1714, the DU may send a message to the CU. The message may comprise a wireless device context release request or wireless device context release complete message. The message may comprise at least one beam index. At time 1716, the CU may send a message to a central network entity, such as an AMF. The message may comprise the wireless device context release request or wireless device context release complete message. The message may comprise the at least one beam index. At time 1718, the central network entity may send a message to the CU. The message may comprise a paging message. The paging message may comprise the at least one beam index. At time 1720, the CU may send a paging message to the DU. The paging message may be a RAN paging message originating from the CU and/or a core paging message originating from the central network entity. The paging message may be based on and/or comprise the at least one beam index. At time 1722, a paging message may be sent from the DU to the wireless device. The paging message may be sent to the wireless device on the at least one beam identified by the at least one beam index. At time 1724, the wireless device and/or DU may communicate with each other, for example, during a random access procedure.

A base station may comprise a base station central unit (CU) and one or more base station distributed units (DUs). A base station DU of the one or more base station DUs may serve at least one cell (e.g. the first cell). The base station CU may provide at least a radio resource control (RRC) functionality and/or a packet data convergence protocol (PDCP) layer functionality. The base station DU may provide at least a radio link control (RLC) layer functionality, a medium access control (MAC) layer functionality, and/or a physical (PHY) layer functionality.

An F1 interface (e.g. a logical direct interface) may be setup between the base station CU and the base station DU. The F1 interface may comprise a user plane interface and/or a control plane interface. RRC messages may be transmitted from the base station CU to a wireless device or from a wireless device to the base station CU via the base station DU. Data packets may be transmitted from the base station CU to a wireless device or from a wireless device to the base station CU via the base station DU. Data packets transmitted over the F1 interface may be PDCP layer packets. RRC messages transmitted over the F1 interface may be conveyed by an F1 interface message, and/or the RRC messages conveyed by the F1 interface message may be one or more PDCP layer packets associated with one or more signaling radio bearers.

A base station DU may transmit, to a wireless device, one or more beam configuration parameters of at least one beam (e.g. CSI-RS beam and/or SS beam) of a first cell. The base station DU may receive, from a base station CU, an RRC message (e.g. an RRC connection reconfiguration message, an RRC reconfiguration message, an RRC setup message, an RRC reestablishment message, an RRC resume message) comprising the one or more beam configuration parameters, and/or may forward/transmit the RRC message to the wireless device. The base station DU may transmit the one or more beam configuration parameters via at least one medium access control (MAC) layer message (e.g. a MAC control element) and/or at least one physical layer message (e.g. a downlink control indication (DCI)). The one or more beam configuration parameters may comprise a first beam index of a first beam of the at least one beam. The first beam may be a CSI-RS beam or an SS beam. The base station DU may receive, from the wireless device, transport blocks via the first beam. The base station DU may transmit, to the wireless device, transport blocks via the first beam. The base station DU may receive, from the wireless device, transport blocks via the first beam. The base station DU may receive, from a base station CU, a first message indicating a wireless device radio resource release (e.g. wireless device context release; e.g. a UE context release message and/or a UE context release command message) for the wireless device. The first message may be transmitted for an RRC state transition of the wireless device from an RRC connected state to an RRC idle state or an RRC inactive state. The base station DU may send, to the base station CU based on the first message, a second message indicating a wireless device radio resource release completion (e.g. UE context release request and/or UE context release complete) for the wireless device. The second message comprising at least one of a first cell identifier of the first cell, a first beam index of the first beam, and/or a first time duration that the wireless device stayed at the first beam. The second message may be a UE context release request message and/or a UE context release complete message. The second message may comprise the paging assistance IEs (e.g. transmitted from the base station to the CNE).

The base station DU may forward, to the wireless device, an RRC connection release message (e.g. an RRC release message) received from the base station CU. The RRC connection release message may indicate, to the wireless device, an RRC state transition towards an RRC idle state and/or an RRC inactive state. The RRC connection release message may be associated with the first message and/or the second message.

The base station DU may forward, to the wireless device, an RRC connection suspend message received from the base station CU. The RRC connection suspend message may indicate, to the wireless device, an RRC state transition towards an RRC inactive state. The RRC connection release message may be associated with the first message and/or the second message. For RRC connection suspend, the base station DU may keep wireless device context parameters at least for an F1 connection for the wireless device, such as radio bearer configuration parameters, logical channel configuration parameters, security parameters, and/or the like. The base station CU may keep wireless device context parameters at least for an F1 connection for the wireless device, such as radio bearer configuration parameters, logical channel configuration parameters, security parameters, and/or the like, for example for RRC connection suspend.

The base station CU may transmit, to a core network entity (e.g. via a UE context release request message and/or a UE context release complete message; via N2/S1 interface), one or more elements (e.g. the paging assistance IEs) of the second message, such as a first cell identifier of the first cell, a first beam index of the first beam, and/or a first time duration that the wireless device stayed at the first beam. The core network may use the one or more elements for a core network paging for the wireless device.

The base station DU may receive, from the base station CU, a paging message configured based at least on the one or more elements of the second message. The paging message may be an RAN paging message (e.g. initiated by the base station CU or a neighbor base station) or a core network paging message (e.g. initiated from a core network entity). The paging message may comprise the paging assistance data. The base station CU may transmit the RAN paging message in response to receiving data and/or control signaling (e.g. downlink NAS message) for the wireless device; after or in response to receiving a RAN paging message from a neighboring base station (e.g. an anchor base station for the wireless device in the RRC inactive state); and/or to transition an RRC state of the wireless device to an RRC connected state. The base station CU may transmit the core network paging message after or in response to receiving a core paging message from the CNE. The paging message may comprise at least one of the first cell identifier, the first beam index, and/or the first time duration, for example, during which the wireless device may have stayed at the first beam.

The wireless device context release may comprise releasing one or more radio resources configured for the wireless device and/or keeping one or more parameters for at least one packet flow of the wireless device.

A base station DU may receive, from a base station CU, a first paging message for a wireless device. The first paging message may comprise a wireless device identifier of the wireless device and/or paging assistance data comprising at least one of: a first cell identifier of a first cell of one or more recommended cells for paging and/or at least one first beam index of at least one first beam of the first cell. The first paging message may be for an RAN paging (e.g. initiated by a base station) for the wireless device in an RRC inactive state or for a core network paging (e.g. initiated by the core network entity) for the wireless device in an RRC idle state. The at least one first beam may be a CSI-RS beam or SS beam.

The base station CU may determine one or more elements of the paging assistance data based on a beam via which the wireless device transmitted a random access preamble. The base station CU may determine one or more elements of the paging assistance data based on a measurement report received from the wireless device, for example, during an RRC connected state of the wireless device. The measurement report may comprise received signal qualities of one or more CSI-RS beams and/or one or more SS beams, such as RSRP, RSRQ, average RSRP, average RSRQ, and/or the like.

The base station CU may determine to transmit the paging message to the base station DU based on a time duration since receiving the paging assistance IEs from the base station DU. The base station CU may determine the paging assistance data based on the paging assistance IEs received from the base station DU and/or a time duration since receiving the paging assistance IEs from the base station DU.

The base station CU may determine one or more elements of the paging assistance data based on one or more beams via which the base station may transmit transport packets to the wireless device and/or may receive transport packets from the wireless device. The base station CU may determine the paging assistance data (e.g. transmitted to the base station DU) based on the paging assistance IEs received from the base station DU. The at least one first beam may be of the one or more beams and/or may be an adjacent beam of the one or more beams. The base station CU may determine one or more elements of the paging assistance data based on one or more reported beam indexes of one or more reported beams that the base station CU received from the base station DU, for example, if an RRC state of the wireless device is changed to an RRC inactive state or an RRC idle state. The base station CU may determine one or more elements of the paging assistance data based on one or more received beam indexes that the base station CU received from a core network entity via a core network paging message for a core network paging procedure for the wireless device. The base station CU may determine one or more elements of the paging assistance data based on one or more second received beam indexes that the base station CU received from a neighboring base station via an RAN paging message for an RAN paging procedure for the wireless device.

The base station DU may transmit, based on the first paging message, a second paging message via (e.g. only) the at least one first beam based at least on the paging assistance data. The second paging message may be for an RAN paging or a core network paging for the wireless device. Based on the second paging message, the base station DU may receive a random access preamble from the wireless device. The base station DU may increase an area for paging of the wireless device for example if the base station DU does not receive a random access preamble based on the second paging message in a threshold time duration. The base station DU may transmit the third paging message via all beams and/or via multiple beams of the first cell and/or via all cells of the base station DU, for example, if it fails in paging the wireless device with the second paging message (e.g., if the base station DU does not receive a random access preamble from the wireless device in a threshold time period).

The base station DU may report the failure to the base station CU and/or the base station CU may increase an area for paging of the wireless device, for example, if the base station DU does not receive a random access preamble based on the second paging message in a threshold time duration. The base station CU may transmit the third paging message via all beams of all cell of the base station CU, for example, if it fails in paging the wireless device with the second paging message.

A wireless device may be a static device (e.g. a fixed sensor device, a fixed controlled device a V2X infrastructure, a traffic light, manufacturing equipment, an IoT device, etc.) and/or a semi-static device (e.g. a nomadic device, a slowly moving device, a device moving limited area, etc.). A base station and/or the wireless device may determine to transition the RRC state of the wireless device into an RRC idle state or an RRC inactive state, for example, if the wireless device has no data to transmit/receive. The RRC state transitioned to by the wireless device may be based on the time remaining until the next data transmit/receive by the wireless device. If the wireless device has no data to transmit/receive for a long period of time (e.g. for 24 hours or any other duration) and/or requires a very low battery consumption (e.g. requires 10 year battery life time or any other duration), a base station and/or the wireless device may determine to transition to the RRC idle state. If the wireless device has no data to transmit/receive for an intermediate period of time (e.g. for 1 hour or any other duration) and/or requires low battery consumption (e.g. requires 6 month battery life time or any other duration), a base station and/or the wireless device may determine to transition to the RRC idle state.

A base station may determine that the wireless device may stay in the same beam coverage area where the wireless device stayed at the time of transitioning to an RRC idle state or to an RRC inactive state, for example, if a wireless device as a static device and/or a semi-static device. If a base station requires to page (e.g. wake up) the wireless device (e.g. for data transmission), the base station may transmit a paging indication via only beam(s) that served the wireless device, for example, if the wireless device transition to an RRC idle state or an RRC inactive state. In this way, the base station may save radio resources by not transmitting paging indications via unnecessary beams and/or may reduce interference by transmitting paging indications via unnecessary beams. Transmitting a paging indication via limited beam(s) for a static/semi-static wireless device may be enabled by sharing beam information (e.g. last serving beam information) between a DU and a CU and/or between a base station and a core network entity (e.g. AMF, MME).

Figure 19:
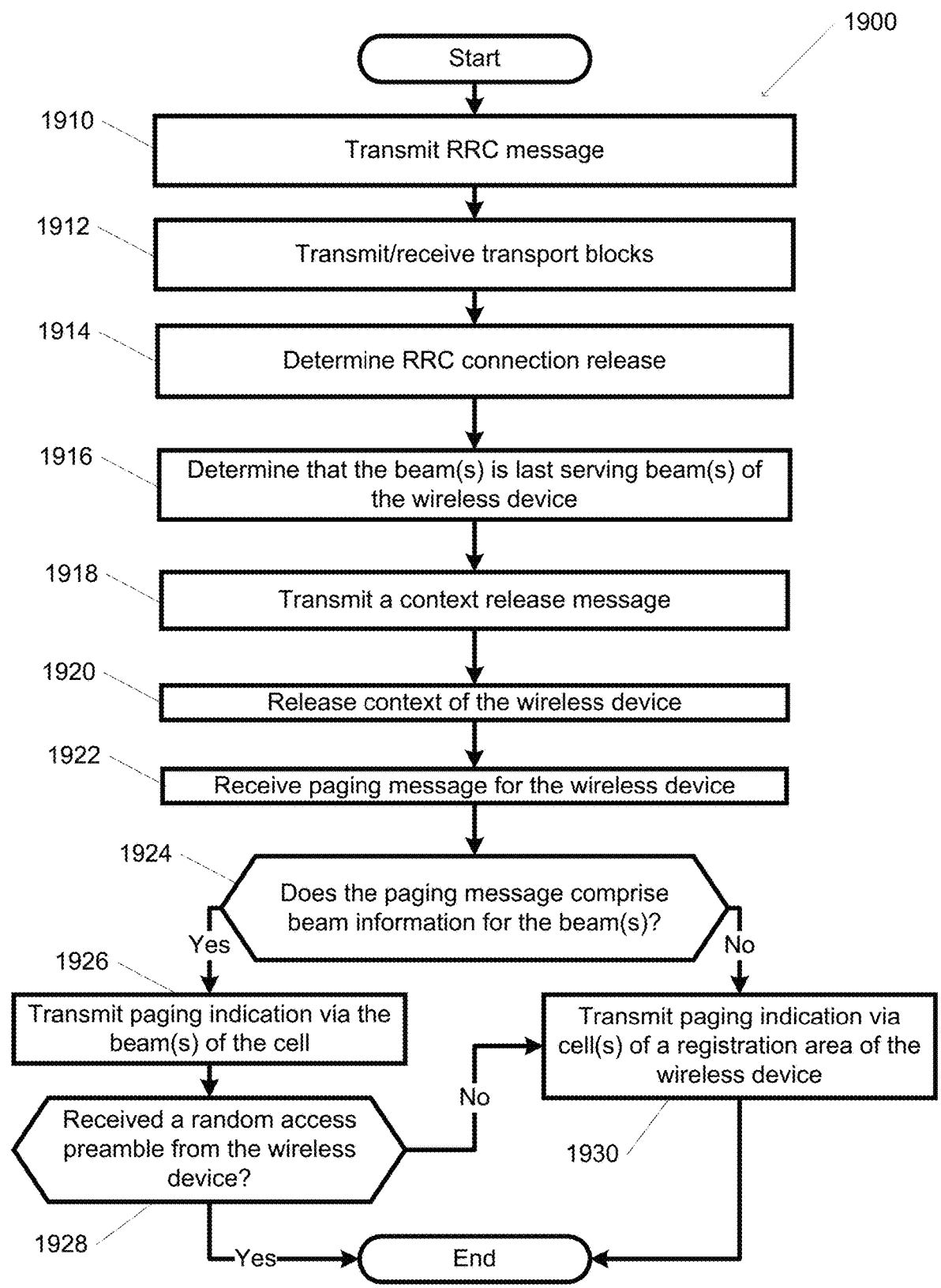
FIG. 19 shows an example of sending paging messages.

FIG. 19 shows an example 1900 of sending paging messages. Example 1900 comprises transmitting (1910) a RRC message. The RRC message may be sent by a base station to a wireless device and may comprise configuration parameters for one or more beams of a cell. Transport blocks may be transmitted and/or received (1912). The transport blocks may be transmitted and received by the base station and/or wireless device and may be communicated via the beams. The base station may determine (1914) to release the RRC connection with the wireless device. The base station may determine (1914) a release of the RRC connection by transmitting a RRC release message to the wireless device, receiving a context release command from a core network entity, and/or determine a connection failure of the wireless device. The base station may transmit (1918) a context release message. The context release message may be sent to a core network entity. The context release message may comprise a context release complete message. The context release message may comprise paging assistance information comprising beam information of the beam(s) of the cell associated with the wireless device. The base station may release (1920) the context of the wireless device. The base station may receive (1922) a paging message for the wireless device. The release of the wireless device context and the receipt of the paging message may not be correlated in time or in action. If the paging message comprises (1924) beam information for the beams, the base station may transmit (1926) at least one paging indication via the beams identified in the beam information. If the base station does not receive (1928) a random access preamble from the wireless device or if the paging message does not comprise (1924) beam information, the base station may transmit (1930) a paging indication via the cell(s) of a registration area of the wireless device. In this way, the base station may determine if a disconnected wireless device may be paged based on stored beam information/idle state, that is, if beam information for the wireless device has been stored the base station may just use the identified beams (or beams in proximity) without the need to page the entire cell.

Figure 20:
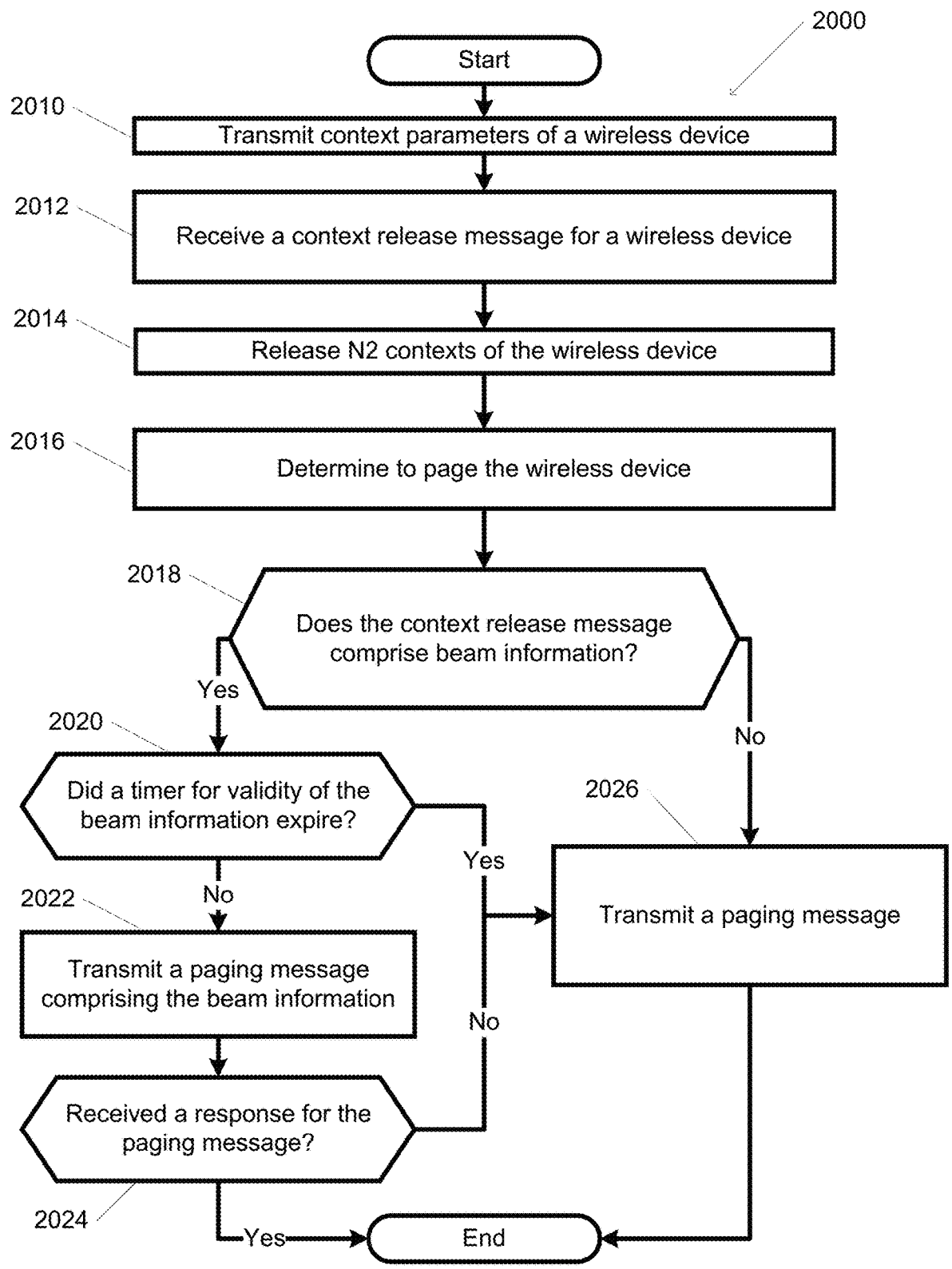
FIG. 20 shows an example of sending paging messages.

FIG. 20 shows an example 2000 of sending paging messages. Example 2000 comprises transmitting (2010) context parameters of a wireless device. The context parameters may be transmitted from a core network entity to a base station. The core network entity may receive (2012) a context release message for a wireless device. The context release message may be received based on transmitting a context release command to the base station. The context release message may be received based on a connection failure of the wireless device. The context release message may be received based on a lack of data to transmit to the wireless device. The core network entity may release (2014) N2 contexts of the wireless device. The contexts of the wireless device may be released by the base station. The core network entity may determine (2016) to page the wireless device. The paging determination may be based on receiving a data notification for the wireless device, a control signaling to transmit to the wireless device, and/or determining to change an RRC state of the wireless device to an RRC connected state. If the context release message comprises (2018) beam information and a beam information timer has not expired (2020), the core network entity may transmit a paging message to the base station. The paging message may comprise the beam information. The beam information may comprise the last serving beams in the cell for the wireless device. If the context release message does not comprise (2018) the beam information, if the beam information validity timer has expired (2020), and/or if the core network entity does not receive (2024) a response to the paging message, a paging message may be sent to a base station(s) serving cell(s) of a registration area. The registration area may be for the wireless device.

Figure 21:
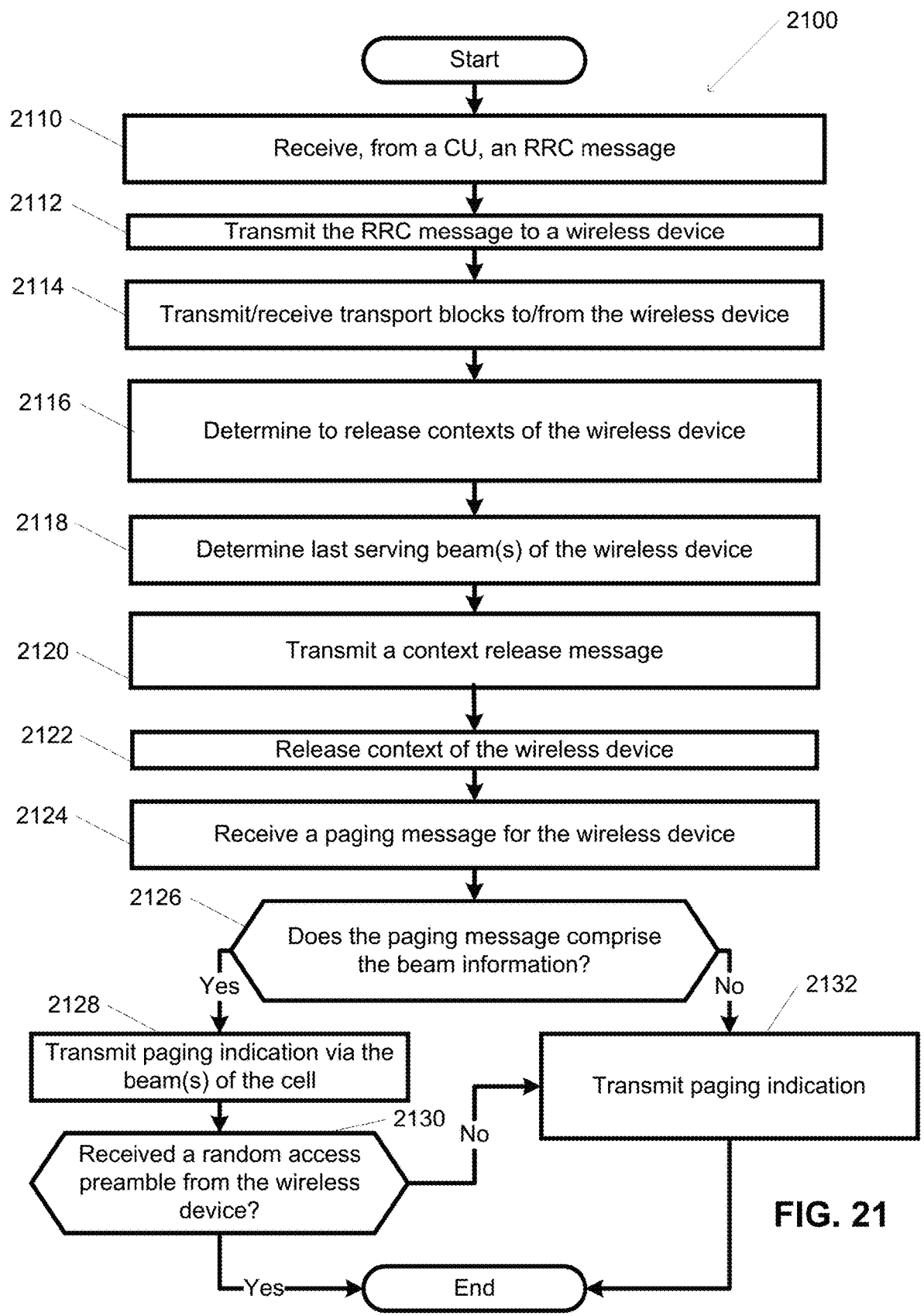
FIG. 21 shows an example of sending paging messages.

FIG. 21 shows an example 2100 of sending paging messages. Example 2100 comprises receiving, by a DU and from a CU, a RRC message. The RRC message may comprise configuration parameters of beam(s) of a cell for a wireless device. The DU may transmit (2112) the RRC message to a wireless device. Transport blocks may be transmitted and/or received (2114) between the DU and the wireless device via one or more beams. The DU may determine (2116) to release contexts of the wireless device. The determination may be based on transmitting a context release request message to the CU, receiving a context release command from the CU, and/or detecting a connection failure of the wireless device. The DU may determine (2118) the last serving beams of the wireless device. The DU may transmit, to the CU, a context release message. The context release message may comprise a context release request message and/or a context release complete message. The context release message may comprise paging assistance information comprising beam information of the beam(s) of the cell for the wireless device. The context of the wireless device may be released (2122). The DU may receive (2124), from the CU, a paging message for the wireless device. The paging message may be a core network paging message and/or a RAN paging message. If the paging message comprises (2126) the beam information, a paging indication may be transmitted (2128) via the indicated beams of the cell. If the DU does not receive (2130) a random access preamble from the wireless device and/or if the paging message does not comprise (2126) the beam information, the DU may transmit (2132) a paging indication. The paging indication may be transmitted for a RAN paging area if the wireless device is in an inactive (e.g. RRC inactive) state. The paging indication may be transmitted for a registration area of the wireless device, for example, if the wireless device is in an idle (e.g. RRC idle) state.

Figure 22:
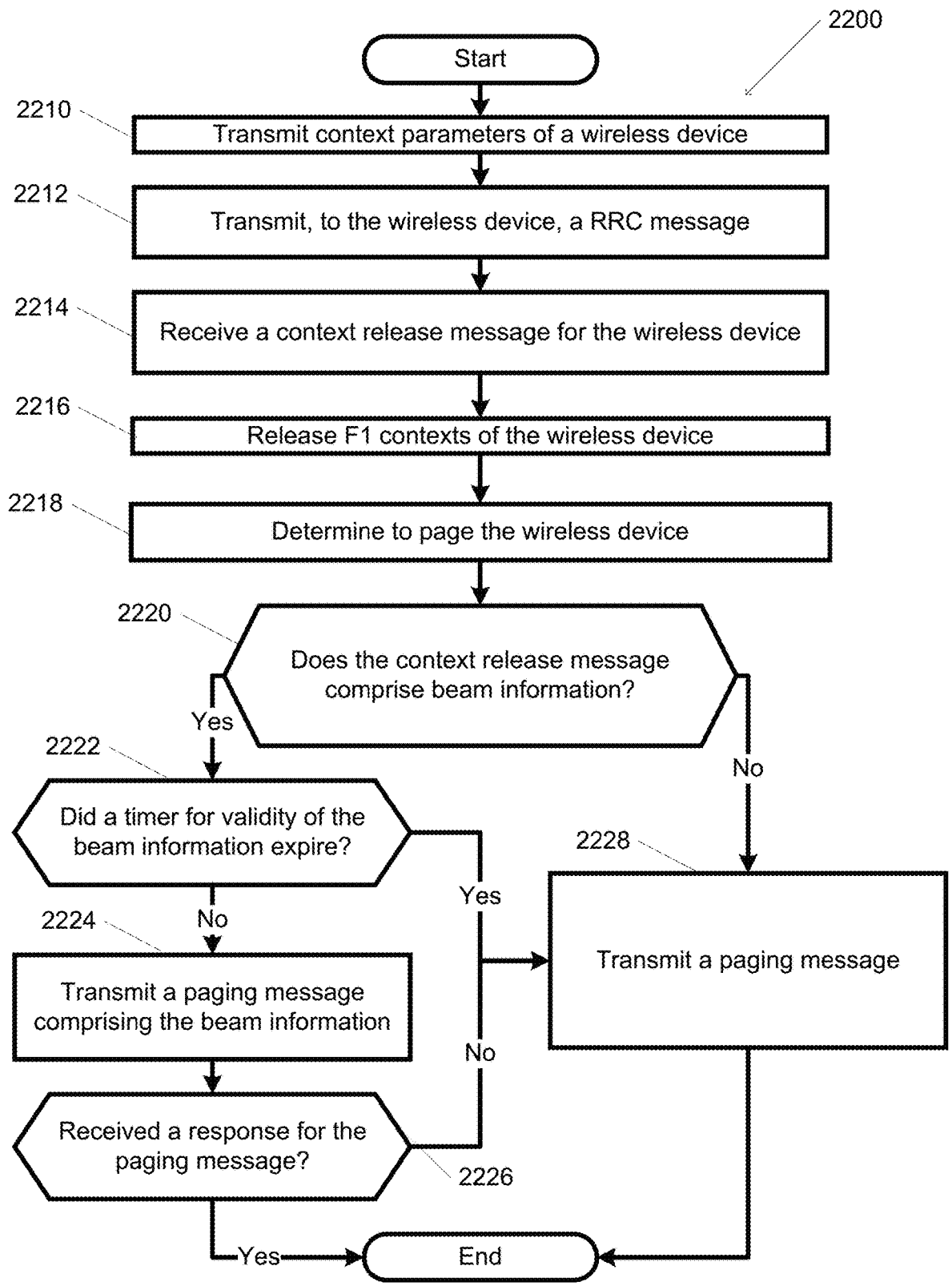
FIG. 22 shows an example of sending paging messages.

FIG. 22 shows an example 2200 of sending paging messages. Example 2200 comprises a CU transmitting (2210), to a DU, context parameters for a wireless device. The DU may transmit (2212) a RRC message to the wireless device. The RRC message may comprise configuration parameters of beam(s) of a cell for the wireless device. The CU may receive (2214), from the DU, a context release message for the wireless device. The context release message may be based on transmitting a UE context release command to the DU, a connection failure of the wireless device, and/or a lack of data to transmit for the wireless device. The context release message may comprise an indication of the last serving beams of a cell for the wireless device. The CU may release (2216) F1 contexts of the wireless device with the DU. The CU may determine (2218) to page the wireless device. The paging may be a RAN page and/or a core network page based on the state of the wireless device. The determination to page the wireless device may be based on receiving data for the wireless device, having a control signaling to transmit to the wireless device, a core network paging message from a core network entity, and/or a determination to change a state of the wireless device. Changing the state of a wireless may comprise changing from an RRC idle state or an RRC inactive state to an RRC connected state. If the context release message comprised (2220) beam information and a beam information validity timer has not expired (2222), a paging message may be transmitted (2224) to the DU. The paging message may comprise the beam information. If the context release message does not comprise (2220) the beam information, the beam information validity timer has expired (2222), or the CU does not receive (2226) a response to the paging message, a paging message may be transmitted (2228). The paging message may be transmitted to the DU and/or base station serving cells of a RAN paging area and/or a registration area of the wireless device.

Example 1

A method comprising: receiving, by a base station from a wireless device via at least one beam of a cell, one or more transport blocks; transmitting, by the base station to a core network entity, a message indicating a context release of the wireless device, wherein the context release is based on a release of a connection of the wireless device, wherein the message comprises paging assistance information elements comprising: a cell identifier of the cell; and at least one beam index of the at least one beam of the cell; receiving, by the base station from the core network entity, a first paging message comprising: a wireless device identifier of the wireless device; and the paging assistance information elements; and transmitting, by the base station via the at least one beam and based on the first paging message, a second paging message.

Example 2

The method of example 1, further comprising releasing, by the base station and based on the release of the connection of the wireless device, a context of the wireless device.

Example 3

The method of example 1, wherein the transmitting the second paging message is via a radio interface.

Example 4

The method of example 1, wherein the at least one beam index comprises at least one of: a channel state information-reference signal index; or a synchronization signal index.

Example 5

The method of example 1, wherein the release of the connection of the wireless device comprises a transmission, by the base station to the wireless device, a radio resource control connection message indicating radio resource control connection release.

Example 6

The method of example 1, further comprising transmitting, by the base station to the wireless device, a radio resource control connection reconfiguration message comprising beam configuration parameters of the at least one beam.

Example 7

The method of example 1, further comprising: receiving, by the base station from the wireless device via the at least one beam, one or more random access preambles; and determining, by the base station and based on the receiving the one or more random access preambles, the paging assistance information elements.

Example 8

The method of example 1, wherein the transmitting the message indicating the context release of the wireless device is via an interface between the base station and the core network entity, and wherein the interface comprises at least one of an NG interface, an N2 interface, and an S1 interface.

Example 9

The method of example 1, wherein the core network entity comprises at least one of: an access and mobility management function; or a mobility management function.

Example 10

The method of example 1, wherein the context release of the wireless device comprises at least one of: a first interface connection release of a first interface between the base station and a control plane core network entity; or a second interface connection release of a second interface between the base station and a user plane core network entity.

Example 11

The method of example 1, further comprising: receiving, by the base station from the core network entity, a command message commanding the context release of the wireless device; and releasing, by the base station and based on the command message, the connection of the wireless device.

Example 12

The method of example 1, further comprising: receiving, by the base station from the core network entity, a command message commanding the context release of the wireless device; and transmitting, by the base station to the core network entity and based on the command message, the message indicating the context release of the wireless device.

Example 13

A method comprising: receiving, by a base station distributed unit from a wireless device via at least one beam of a first cell, one or more transport blocks; receiving, by the base station distributed unit from a base station central unit, a first message indicating a context release for the wireless device; sending, by the base station distributed unit to the base station central unit and based on the first message, a second message indicating a context release completion for the wireless device, wherein the second message comprises: a first cell identifier of the first cell; and at least one beam index of the at least one beam; receiving, by the base station distributed unit from the base station central unit, a paging message configured based on the second message.

Example 14

The method of example 13, further comprising: receiving, by the base station distributed unit from the base station central unit, a second message indicating a second context release of the wireless device; and transmitting, by the base station distributed unit to the base station central unit and based on the second message, a third message comprising the at least one beam index of the at least one beam.

Example 15

The method of example 13, further comprising: receiving, by the base station distributed unit from the base station central unit, a paging message comprising: a wireless device identifier of the wireless device; and paging assistance information elements; and transmitting, by the base station distributed unit via the at least one beam and based on the paging message, the paging message.

Example 16

The method of example 15, further comprising transmitting, by the base station distributed unit, a first message to the base station central unit prior to receiving the paging message.

Example 17

A method comprising: receiving, by a base station from a wireless device via a first beam of a first cell, one or more transport blocks; transmitting, by the base station to the wireless device and based on receiving the one or more transport blocks, a first message indicating a radio resource control connection release of the wireless device; sending, by the base station to a core network entity and based on the radio resource control connection release, a second message indicating a context release for the wireless device, wherein the second message comprises paging assistance information elements comprising: a first cell identifier of the first cell; and a first beam index of the first beam; and receiving, by the base station from the core network entity, a paging message that is based on the paging assistance information elements.

Example 18

The method of example 17, further comprising releasing, by the base station and based on releasing a connection of the wireless device, a context of the wireless device.

Example 19

The method of example 17, further comprising transmitting, by the base station to the wireless device, a second paging message.

Example 20

The method of example 17, wherein the transmitting the second message is via an interface between the base station and the core network entity, wherein the interface comprises at least one of an NG interface, an N2 interface, or an S1 interface.

Figure 23:
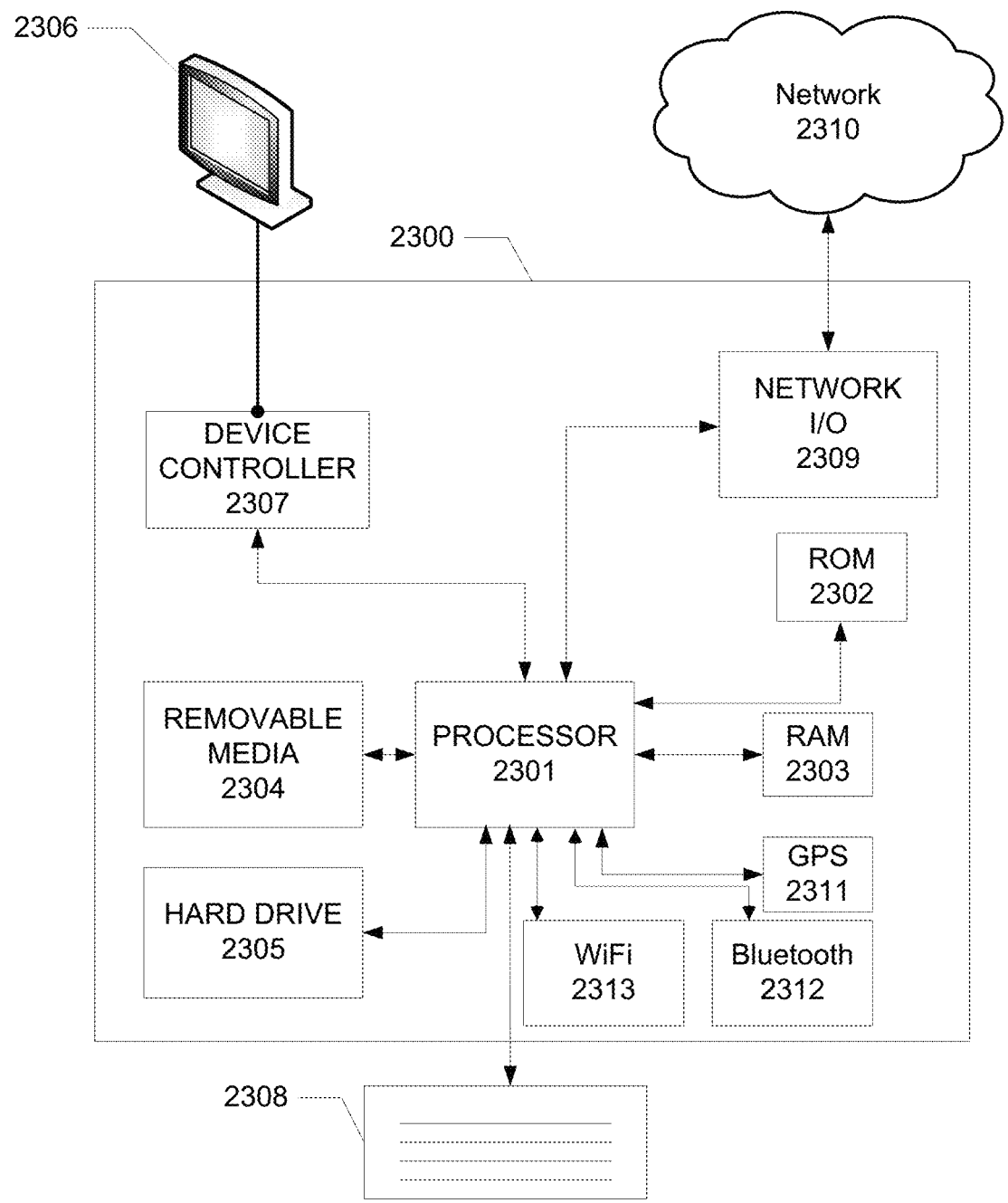
FIG. 23 shows example elements of a computing device that may be used to implement any of the various devices described herein.

FIG. 23 shows general hardware elements that may be used to implement any of the various computing devices discussed herein, including, e.g., the base station 401, the wireless device 406, or any other base station, wireless device, or computing device described herein. The computing device 2300 may comprise one or more processors 2301, which may execute instructions stored in the random access memory (RAM) 2303, the removable media 2304 (such as a Universal Serial Bus (USB) drive, compact disk (CD) or digital versatile disk (DVD), or floppy disk drive), or any other desired storage medium. Instructions may also be stored in an attached (or internal) hard drive 2305. The computing device 2300 may also comprise a security processor (not shown), which may execute instructions of one or more computer programs to monitor the processes executing on the processor 2301 and any process that requests access to any hardware and/or software components of the computing device 2300 (e.g., ROM 2302, RAM 2303, the removable media 2304, the hard drive 2305, the device controller 2307, a network interface 2309, a GPS 2311, a Bluetooth interface 2312, a WiFi interface 2313, etc.). The computing device 2300 may comprise one or more output devices, such as the display 2306 (e.g., a screen, a display device, a monitor, a television, etc.), and may comprise one or more output device controllers 2307, such as a video processor. There may also be one or more user input devices 2308, such as a remote control, keyboard, mouse, touch screen, microphone, etc. The computing device 2300 may also comprise one or more network interfaces, such as a network interface 2309, which may be a wired interface, a wireless interface, or a combination of the two. The network interface 2309 may provide an interface for the computing device 2300 to communicate with a network 2310 (e.g., a RAN, or any other network). The network interface 2309 may comprise a modem (e.g., a cable modem), and the external network 2310 may comprise communication links, an external network, an in-home network, a provider's wireless, coaxial, fiber, or hybrid fiber/coaxial distribution system (e.g., a DOCSIS network), or any other desired network. Additionally, the computing device 2300 may comprise a location-detecting device, such as a global positioning system (GPS) microprocessor 2311, which may be configured to receive and process global positioning signals and determine, with possible assistance from an external server and antenna, a geographic position of the computing device 2300.

The example in FIG. 23 may be a hardware configuration, although the components shown may be implemented as software as well. Modifications may be made to add, remove, combine, divide, etc. components of the computing device 2300 as desired. Additionally, the components may be implemented using basic computing devices and components, and the same components (e.g., processor 2301, ROM storage 2302, display 2306, etc.) may be used to implement any of the other computing devices and components described herein. For example, the various components described herein may be implemented using computing devices having components such as a processor executing computer-executable instructions stored on a computer-readable medium, as shown in FIG. 23. Some or all of the entities described herein may be software based, and may co-exist in a common physical platform (e.g., a requesting entity may be a separate software process and program from a dependent entity, both of which may be executed as software on a common computing device).

One or more features of the disclosure may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features of the disclosure, and such data structures are contemplated within the scope of computer executable instructions and computer-usable data described herein.

Many of the elements in examples may be implemented as modules. A module may be an isolatable element that performs a defined function and has a defined interface to other elements. The modules may be implemented in hardware, software in combination with hardware, firmware, wetware (e.g., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and complex programmable logic devices (CPLDs). Computers, microcontrollers, and microprocessors may be programmed using languages such as assembly, C, C++ or the like. FPGAs, ASICs, and CPLDs may be programmed using hardware description languages (HDL), such as VHSIC hardware description language (VHDL) or Verilog, which may configure connections between internal hardware modules with lesser functionality on a programmable device. The above mentioned technologies may be used in combination to achieve the result of a functional module.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, wireless local area networks, wireless personal area networks, wireless ad hoc networks, wireless metropolitan area networks, wireless wide area networks, global area networks, space networks, and any other network using wireless communications. Any device (e.g., a wireless device, a base station, or any other device) or combination of devices may be used to perform any combination of one or more of steps described herein, including, e.g., any complementary step or steps of one or more of the above steps.

Although examples are described above, features and/or steps of those examples may be combined, divided, omitted, rearranged, revised, and/or augmented in any desired manner Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

What is claimed is:

1. A method comprising:
sending, by a base station to a core network entity, paging assistance information, associated with a wireless device, that comprises:
a cell identifier of a cell; and
at least one beam index of at least one beam of the cell;
receiving, by the base station from the core network entity, a first paging message comprising:
a wireless device identifier of the wireless device; and
the paging assistance information; and
sending, by the base station via the at least one beam and based on the first paging message, a second paging message associated with the wireless device.

2. The method of claim 1, further comprising releasing, by the base station and based on a release of a connection of the wireless device, a context associated with the wireless device,
wherein the sending the paging assistance information comprises sending a message that comprises: the paging assistance information and an indication indicating context release.

3. The method of claim 1, wherein the at least one beam index comprises at least one of:
a channel state information-reference signal index; or
a synchronization signal index.

4. The method of claim 1, further comprising sending, by the base station to the wireless device, a radio resource control connection message indicating a radio resource control connection release,
wherein the sending the paging assistance information is based on the radio resource control connection release.

5. The method of claim 1, further comprising sending, by the base station to the wireless device, a radio resource control connection reconfiguration message comprising one or more beam configuration parameters of the at least one beam.

6. The method of claim 1, further comprising:
receiving, by the base station from the wireless device via the at least one beam, one or more random access preambles; and
determining, by the base station and based on receiving the one or more random access preambles, the paging assistance information.

7. The method of claim 1, wherein the sending the paging assistance information comprises sending the paging assistance information via an interface between the base station and the core network entity, wherein the interface comprises at least one of: an NG interface, an N2 interface, or an S1 interface.

8. The method of claim 1, wherein the core network entity comprises at least one of:
an access and mobility management function (AMF) device; or
a mobility management function (MMF) device.

9. The method of claim 1, wherein the sending the paging assistance information comprises sending a message that comprises: the paging assistance information and an indication indicating a context release associated with the wireless device, and
wherein the context release associated with the wireless device comprises at least one of:
a first interface connection release of a first interface between the base station and the core network entity; or
a second interface connection release of a second interface between the base station and a user plane core network entity.

10. The method of claim 1, further comprising:
receiving, by the base station from the core network entity, a command message indicating a context release associated with the wireless device; and
releasing, by the base station and based on the command message, a connection of the wireless device.

11. The method of claim 1, further comprising:
receiving, by the base station from the core network entity, a command message indicating a context release associated with the wireless device,
wherein the sending the paging assistance information comprises sending, by the base station to the core network entity and based on the command message, a message that comprises: the paging assistance information and an indication indicating the context release.

12. The method of claim 1, wherein the paging assistance information comprises paging assistance information elements comprising at least one of:
the cell identifier of the cell;
at least one beam identifier;
a first beam index of a first beam of the cell;
a first time duration during which the wireless device is associated with the first beam; or
a second time duration during which the base station communicated with the wireless device.

13. A method comprising:
sending, by a base station to a core network entity, a first message indicating a context release associated with a wireless device, wherein the first message comprises paging assistance information comprising:
a cell identifier of a cell; and
a beam index of a beam of the cell; and
wherein the sending the first message is based on at least one of:
a radio resource control connection release; or
an indication indicating the context release; and
receiving, by the base station from the core network entity, a paging message that is based on the paging assistance information.

14. The method of claim 13, further comprising:
receiving the indication indicating the context release,
wherein the first message comprises an indication indicating a context release completion associated with the wireless device.

15. The method of claim 13, further comprising:
receiving, from a base station central unit, a second message indicating a second context release associated with the wireless device; and
sending, to the base station central unit and based on the second message, a third message comprising the beam index of the beam.

16. The method of claim 13, wherein:
the paging message comprises:
a wireless device identifier of the wireless device; and
the paging assistance information; and
the method further comprises sending, by the base station via the beam, a second paging message.

17. The method of claim 13, further comprising sending, to a base station central unit and prior to receiving the paging message, a second message.

18. The method of claim 13, further comprising:
receiving, from the wireless device via the beam, at least one transport block; and
sending, to the wireless device and based on receiving the at least one transport block, a second message indicating the radio resource control connection release.

19. The method of claim 13, further comprising releasing, by the base station and based on releasing a connection of the wireless device, a context associated with the wireless device.

20. The method of claim 13, wherein the sending the first message comprises sending the first message via an interface between the base station and the core network entity, wherein the interface comprises at least one of: an NG interface, an N2 interface, or an S1 interface.

21. A computing device comprising:
one or more processors; and
memory storing instructions that, when executed by the one or more processors, cause the computing device to:
send, to a core network entity, paging assistance information associated with a wireless device, that comprises:
a cell identifier of a cell; and
at least one beam index of at least one beam of the cell;
receive, from the core network entity, a first paging message comprising:
a wireless device identifier of the wireless device; and
the paging assistance information; and
send, via the at least one beam and based on the first paging message, a second paging message associated with the wireless device.

22. The computing device of claim 21, wherein the instructions, when executed by the one or more processors, cause the computing device to release, based on a release of a connection of the wireless device, a context associated with the wireless device, and
wherein the instructions, when executed by the one or more processors, cause the computing device to send the paging assistance information by sending a message that comprises: the paging assistance information and an indication indicating context release.

23. The computing device of claim 21, wherein the at least one beam index comprises at least one of:
a channel state information-reference signal index; or
a synchronization signal index.

24. The computing device of claim 21, wherein the instructions, when executed by the one or more processors, cause the computing device to:
send, to the wireless device, a radio resource control connection message indicating a radio resource control connection release; and
send the paging assistance information by sending, based on the radio resource control connection release, the paging assistance information.

25. The computing device of claim 21, wherein the instructions, when executed by the one or more processors, cause the computing device to send, to the wireless device, a radio resource control connection reconfiguration message comprising one or more beam configuration parameters of the at least one beam.

26. The computing device of claim 21, wherein the instructions, when executed by the one or more processors, cause the computing device to:
receive, from the wireless device via the at least one beam, one or more random access preambles; and
determine, based on receiving the one or more random access preambles, the paging assistance information.

27. The computing device of claim 21, wherein the instructions, when executed by the one or more processors, cause the computing device to send the paging assistance information by sending the paging assistance information via an interface between the computing device and the core network entity, wherein the interface comprises at least one of: an NG interface, an N2 interface, or an S1 interface.

28. The computing device of claim 21, wherein the core network entity comprises at least one of:
an access and mobility management function (AMF) device; or
a mobility management function (MMF) device.

29. The computing device of claim 21, wherein the instructions, when executed by the one or more processors, cause the computing device to send the paging assistance information by sending a message that comprises: the paging assistance information and an indication indicating a context release associated with the wireless device, and
wherein the context release associated with the wireless device comprises at least one of:
a first interface connection release of a first interface between the computing device and the core network entity; or
a second interface connection release of a second interface between the computing device and a user plane core network entity.

30. The computing device of claim 21, wherein the instructions, when executed by the one or more processors, cause the computing device to:
receive, from the core network entity, a command message indicating a context release associated with the wireless device; and
release, based on the command message, a connection of the wireless device.

31. The computing device of claim 21, wherein the instructions, when executed by the one or more processors, cause the computing device to:
receive, from the core network entity, a command message indicating a context release associated with the wireless device; and
send the paging assistance information by sending, to the core network entity and based on the command message, a message that comprises: the paging assistance information and an indication indicating the context release.

32. The computing device of claim 21, wherein the paging assistance information comprises paging assistance information elements comprising at least one of:
the cell identifier of the cell;
at least one beam identifier;
a first beam index of a first beam of the cell;
a first time duration during which the wireless device is associated with the first beam; or
a second time duration during which the computing device communicated with the wireless device.

33. The computing device of claim 21, wherein the computing device comprises at least one of:
a base station;
a base station central unit; or
a base station distributed unit.

34. A computing device comprising:
one or more processors; and
memory storing instructions that, when executed by the one or more processors, cause the computing device to:
send, to a core network entity, a first message indicating a context release associated with a wireless device, wherein the first message comprises paging assistance information comprising:
a cell identifier of a cell; and
a beam index of a beam of the cell; and
wherein the instructions, when executed by the one or more processors,
cause the computing device to send the first message by sending the first message based on at least one of:
a radio resource control connection release; or
an indication indicating the context release; and
receive, from the core network entity, a paging message that is based on the paging assistance information.

35. The computing device of claim 34, wherein the instructions, when executed by the one or more processors, cause the computing device to:
receive the indication indicating the context release, and
wherein the first message comprises an indication indicating a context release completion associated with the wireless device.

36. The computing device of claim 34, wherein the instructions, when executed by the one or more processors, cause the computing device to:
receive, from a base station central unit, a second message indicating a second context release associated with the wireless device; and
send, to the base station central unit and based on the second message, a third message comprising the beam index of the beam.

37. The computing device of claim 34, wherein the paging message comprises:
a wireless device identifier of the wireless device; and
the paging assistance information; and
wherein the instructions, when executed by the one or more processors, cause the computing device to send, via the beam, a second paging message.

38. The computing device of claim 34, wherein the instructions, when executed by the one or more processors, cause the computing device to send, to a base station central unit and prior to receiving the paging message, a second message.

39. The computing device of claim 34, wherein the instructions, when executed by the one or more processors, cause the computing device to:
receive, from the wireless device via the beam, at least one transport block; and
send, to the wireless device and based on receiving the at least one transport block, a second message indicating the radio resource control connection release.

40. The computing device of claim 34, wherein the instructions, when executed by the one or more processors, cause the computing device to release, based on releasing a connection of the wireless device, a context associated with the wireless device.

41. The computing device of claim 34, wherein the instructions, when executed by the one or more processors, cause the computing device to send the first message by sending the first message via an interface between the computing device and the core network entity, wherein the interface comprises at least one of: an NG interface, an N2 interface, or an S1 interface.

42. The computing device of claim 34, wherein the computing device comprises at least one of:
a base station;
a base station central unit; or
a base station distributed unit.

* * * * *

UNITED STATES PATENT AND TRADEMARK OFFICE
CERTIFICATE OF CORRECTION

PATENT NO. : 11,240,780 B2
APPLICATION NO. : 16/843420
DATED : February 1, 2022
INVENTOR(S) : Park et al.

It is certified that error appears in the above-identified patent and that said Letters Patent is hereby corrected as shown below:

On the Title Page

Page 3, Column 1, item (56) Other Publications, Line 9:
Delete "Apr. 15, 2019-Extented" and insert --Apr. 15, 2019-Extended-- therefor Page 5, Column 2, item (56) Other Publications, Line 31:
Delete "Dormat" and insert --Dormant-- therefor Page 8, Column 1, item (56) Other Publications, Line 54:
Delete "mutli-CC" and insert --multi-CC-- therefor Page 10, Column 2, item (56) Other Publications, Line 12:
Delete "Remaing" and insert --Remaining-- therefor In the Drawings Sheet 7 of 23, Fig. 7, Reference Numeral 723, Lines 1-4:
Delete "DL-SCH of SCH" and insert --DL-SCH of SCG-- therefor Sheet 7 of 23, Fig. 7, Reference Numeral 724, Lines 1-3:
Delete "UL-SCH of SCH" and insert --UL-SCH of SCG-- therefor In the Specification Column 7, Detailed Description of Embodiments, Line 60:
After "selection", insert --.--

Column 12, Detailed Description of Embodiments, Line 34:
Delete "534" and insert --535-- therefor Signed and Sealed this
Twenty-seventh Day of June, 2023

Katherine Kelly Vidal
*Director of the United States Patent and Trademark Office*

CERTIFICATE OF CORRECTION (continued)
U.S. Pat. No. 11,240,780 B2

Column 12, Detailed Description of Embodiments, Line 37:
Delete "535A and 535B" and insert --536A and 536B-- therefor Column 12, Detailed Description of Embodiments, Line 40:
Delete "536A and 536B" and insert --537A and 537B-- therefor Column 13, Detailed Description of Embodiments, Line 14:
Delete "621" and insert --620-- therefor Column 15, Detailed Description of Embodiments, Line 50:
Delete "PDDCH" and insert --PDCCH-- therefor Column 15, Detailed Description of Embodiments, Line 54:
Delete "PDDCH" and insert --PDCCH-- therefor Column 16, Detailed Description of Embodiments, Line 16:
Delete "NTA" and insert --$N_{TA}$-- therefor Column 16, Detailed Description of Embodiments, Line 19:
Delete "NTA=0." and insert --$N_{TA}$=0.-- therefor Column 20, Detailed Description of Embodiments, Line 67:
Delete "1312, 1312," and insert --1312, 1313,-- therefor Column 22, Detailed Description of Embodiments, Line 37:
After "demand", insert --.--

Column 27, Detailed Description of Embodiments, Line 57:
After "beam-specific", delete "¶"

Column 28, Detailed Description of Embodiments, Line 28:
After "DL", delete "¶"

Column 31, Detailed Description of Embodiments, Line 47:
After "channel", insert --.--

Column 31, Detailed Description of Embodiments, Line 56:
After "channel", insert --.--

Column 39, Detailed Description of Embodiments, Line 8:
Delete "lEs" and insert --IEs-- therefor Column 39, Detailed Description of Embodiments, Line 46:
Delete "lEs." and insert --IEs.-- therefor CERTIFICATE OF CORRECTION (continued)
U.S. Pat. No. 11,240,780 B2

Column 44, Detailed Description of Embodiments, Line 43:
Delete "lEs" and insert --IEs-- therefor Column 52, Detailed Description of Embodiments, Line 16:
Delete "Lab VIEWMathScript." and insert --LabVIEWMathScript.-- therefor Column 52, Detailed Description of Embodiments, Lines 64-65:
After "manner", insert --.--

In the Claims

Column 57, Claim 34, Line 12:
After "processors,", delete "¶"